US012641459B2

(12) United States Patent
Tofighbakhsh et al.

(10) Patent No.: US 12,641,459 B2
(45) Date of Patent: May 26, 2026

(54) PROBE-AS-A-SERVICE IN A SLICE FOR A CELLULAR NETWORK

(71) Applicant: Boost SubscriberCo L.L.C., Englewood, CO (US)

(72) Inventors: Mostafa Tofighbakhsh, Cupertino, CA (US); Charles William Ergen, Littleton, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 276 days.

(21) Appl. No.: 18/542,478

(22) Filed: Dec. 15, 2023

(65) Prior Publication Data

US 2025/0203412 A1    Jun. 19, 2025

(51) Int. Cl.
*H04W 24/08*       (2009.01)
*H04L 43/12*        (2022.01)

(52) U.S. Cl.
CPC ............. *H04W 24/08* (2013.01); *H04L 43/12* (2013.01)

(58) Field of Classification Search
CPC ...... G06N 20/00; G06N 20/10; H04L 41/145; H04L 43/00; H04L 43/06; H04L 43/12; H04L 43/16; H04L 43/18; H04W 8/005; H04W 16/18; H04W 24/02; H04W 24/08; H04W 24/10; H04W 36/0083; H04W 40/24; H04W 52/365; H04W 72/54
See application file for complete search history.

(56) References Cited

U.S. PATENT DOCUMENTS

2019/0372879 A1* 12/2019 Poe ..................... H04L 43/0876
2020/0178093 A1*  6/2020 Peng ............... H04W 36/00838
(Continued)

FOREIGN PATENT DOCUMENTS

CN        112929187 A  *  6/2021   ............... G06N 3/08
CN        119865437 A  *  4/2025   ............. G06N 20/00
(Continued)

OTHER PUBLICATIONS

Zhang et al., "Network Slice Management Method, Device and System," Machine English translation of CN 112929187, Clarivate Analytics, pp. 1-11 (Year: 2025).*
(Continued)

*Primary Examiner* — Thomas R Cairns
(74) *Attorney, Agent, or Firm* — Lowenstein Sandler LLP

(57) ABSTRACT
Technologies for providing probes-as-services to customers of a cellular network are described. One method receives, from a customer, a request for a probe-as-a-service in a slice of the cellular network, the slice being associated with the customer. The method generates a set of probe collectors to collect network analytic data associated with the slice of the cellular network. Using the set of probe collectors, the method collects input data (e.g., user data usage, events, metrics, counters, logs, etc.). The method aggregates the input data from each of the plurality of data sources in the cellular network to obtain combined data. The method generates, using at least one artificial intelligence (AI)/ machine learning (ML) model, the network analytic data based on the combined data. The method provides the network analytic data to an application associated with the customer.

20 Claims, 31 Drawing Sheets

(56)          References Cited

U.S. PATENT DOCUMENTS

| | | | | |
|---|---|---|---|---|
| 2023/0079052 A1* | 3/2023 | Bega | H04W 24/08 | |
| | | | 709/224 | |
| 2024/0284236 A1* | 8/2024 | Hafeez | H04W 28/0226 | |
| 2025/0047564 A1* | 2/2025 | Zhang | H04W 24/02 | |
| 2025/0111223 A1* | 4/2025 | Fu | G06N 20/00 | |

FOREIGN PATENT DOCUMENTS

| | | | | |
|---|---|---|---|---|
| EP | 4254895 A1 * | 10/2023 | | H04L 41/16 |
| WO | WO-2024156375 A1 * | 8/2024 | | H04W 24/02 |
| WO | WO-2025079115 A1 * | 4/2025 | | G06N 20/00 |

OTHER PUBLICATIONS

Zhang et al., "Method for Obtaining Encrypted Short Video Experience Index Data and Related Device," Machine English translation of CN 119865437, Clarivate Analytics, pp. 1-23 (Year: 2025).*

* cited by examiner

Enterprise private 5G probe as service Layered Model                    900

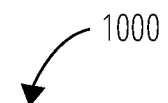

1000

RECEIVE, FROM A CUSTOMER, A REQUEST FOR A PROBE-AS-A-SERVICE IN THE CELLULAR NETWORK, THE REQUEST COMPRISING A PROBE TEMPLATE ASSOCIATED WITH THE PROBE-AS-A-SERVICE, THE PROBE TEMPLATE COMPRISING A PLURALITY OF PROGRAMMABLE PARAMETERS, WHEREIN A FIRST PARAMETER OF THE PLURALITY OF PROGRAMMABLE PARAMETERS SPECIFIES A SET OF ONE OR MORE PROBE COLLECTORS, WHEREIN A SECOND PARAMETER OF THE PLURALITY OF PROGRAMMABLE PARAMETERS SPECIFIES A MACHINE LEARNING (ML) MODEL, WHEREIN A THIRD PARAMETER OF THE PLURALITY OF PROGRAMMABLE PARAMETERS SPECIFIES A NORTHBOUND APPLICATION 1002

↓

COLLECT, USING THE SET OF PROBE COLLECTORS, INPUT DATA FROM A PLURALITY OF PROBE AGENTS PROGRAMMED BY THE SET OF PROBE COLLECTORS, EACH PROBE AGENT LOCATED AT LEAST ONE OF AN INFRASTRUCTURE RESOURCE OF THE CELLULAR NETWORK, A SENSOR ASSOCIATED WITH THE CELLULAR NETWORK, OR A USER EQUIPMENT (UE) CONNECTED TO THE CELLULAR NETWORK 1004

↓

GENERATE, USING THE ML MODEL, OBSERVATION DATA BASED ON THE INPUT DATA, WHEREIN THE OBSERVATION DATA COMPRISES AT LEAST ONE OF A KEY PERFORMANCE INDICATOR (KPI) OR A STATE OF THE AT LEAST ONE OF THE INFRASTRUCTURE RESOURCE, THE SENSOR, OR THE UE 1006

↓

PROVIDE THE OBSERVATION DATA TO THE NORTHBOUND APPLICATION 1008

FIG. 10

Radio Access Network (RAN) 1120

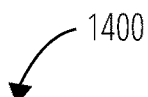
1400

RECEIVE, FROM A CUSTOMER, A REQUEST FOR A PROBE-AS-A-SERVICE IN A SLICE OF THE CELLULAR NETWORK, THE SLICE BEING ASSOCIATED WITH THE CUSTOMER 1402

GENERATE A SET OF PROBE COLLECTORS TO COLLECT NETWORK ANALYTIC DATA ASSOCIATED WITH THE SLICE OF THE CELLULAR NETWORK 1404

COLLECT, USING THE SET OF PROBE COLLECTORS, INPUT DATA FROM EACH OF A PLURALITY OF DATA SOURCES IN THE CELLULAR NETWORK, WHEREIN THE INPUT DATA COMPRISES AT LEAST ONE OF USER DATA USAGE, EVENTS, METRICS, COUNTERS, LOGS, TRACES, ALARMS, CONFIGURATION DATA, FLOW DATA, STATE INFORMATION, ERROR MESSAGES, DEVICE DATA, OR LOGICAL RESOURCE DATA OF ONE OR MORE NETWORK RESOURCES OF THE SLICE 1406

AGGREGATE THE INPUT DATA FROM EACH OF THE PLURALITY OF DATA SOURCES IN THE CELLULAR NETWORK TO OBTAIN COMBINED DATA 1408

GENERATE, USING AT LEAST ONE ARTIFICIAL INTELLIGENCE (AI)/MACHINE LEARNING (ML) MODEL, THE NETWORK ANALYTIC DATA BASED ON THE COMBINED DATA 1410

PROVIDE THE NETWORK ANALYTIC DATA TO AN APPLICATION ASSOCIATED WITH THE CUSTOMER 1412

FIG. 14

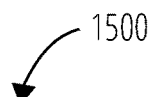

1500

RECEIVE, FROM A CUSTOMER, A REQUEST FOR A PROBE-AS-A-SERVICE IN A DEDICATED SLICE OF THE CELLULAR NETWORK HAVING DEDICATED RESOURCES, WHEREIN THE DEDICATED SLICE IS ASSOCIATED WITH THE CUSTOMER AND REPRESENTS A BEHAVIOR FOR OTHER SLICES OF THE CELLULAR NETWORK 1502

COLLECT, USING A SET OF PROBE COLLECTORS, INPUT DATA FROM EACH OF A PLURALITY OF DATA SOURCES IN THE CELLULAR NETWORK, WHEREIN THE INPUT DATA COMPRISES AT LEAST ONE OF USER DATA USAGE, EVENTS, METRICS, COUNTERS, LOGS, TRACES, ALARMS, CONFIGURATION DATA, FLOW DATA, STATE INFORMATION, ERROR MESSAGES, DEVICE DATA, OR LOGICAL RESOURCE DATA OF ONE OR MORE NETWORK RESOURCES OF THE DEDICATED SLICE 1504

AGGREGATE THE INPUT DATA FROM EACH OF THE PLURALITY OF DATA SOURCES IN THE CELLULAR NETWORK TO OBTAIN COMBINED DATA 1506

GENERATE, USING AT LEAST ONE ARTIFICIAL INTELLIGENCE (AI)/MACHINE LEARNING (ML) MODEL, OBSERVATION DATA BASED ON THE COMBINED DATA 1508

PROVIDE THE OBSERVATION DATA TO A NORTHBOUND APPLICATION ASSOCIATED WITH THE CUSTOMER 1510

RECEIVE, FROM THE NORTHBOUND APPLICATION, A POLICY ASSOCIATED WITH THE DEDICATED RESOURCE TO BE ENFORCED TO MODIFY OPERATION OF THE DEDICATED SLICE 1512

FIG. 15

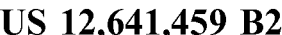

1600

RECEIVE, FROM A CUSTOMER, A REQUEST FOR A PROBE-AS-A-SERVICE IN A CELLULAR NETWORK HAVING NETWORK RESOURCES 1602

COLLECT, USING A SET OF PROBE COLLECTORS, INPUT DATA FROM EACH OF A PLURALITY OF DATA SOURCES IN THE CELLULAR NETWORK, WHEREIN THE INPUT DATA COMPRISES AT LEAST ONE OF LOCATION INFORMATION OR BEHAVIOR INFORMATION CORRELATED TO THE NETWORK RESOURCES  1604

GENERATE, USING AT LEAST ONE ARTIFICIAL INTELLIGENCE (AI)/MACHINE LEARNING (ML) MODEL, OBSERVATION DATA BASED ON THE INPUT DATA  1606

PROVIDE THE OBSERVATION DATA TO A NORTHBOUND APPLICATION ASSOCIATED WITH THE CUSTOMER 1608

FIG. 16

PROBE-AS-A-SERVICE IN A SLICE FOR A CELLULAR NETWORK

BACKGROUND

Telecommunication networks, such as cellular networks, have various resources that produce data and metadata concerning operations of the cellular network. A customer, such as an enterprise customer, of a cellular network does not have access to the data and metadata generated by the network resources of the cellular network. However, these customers could benefit from obtaining the data in a meaningful and insightful way to manage usage or configuration of these network resources, including private network and private user data in the cellular network.

One type of cellular network is a Fifth generation (5G) wireless network. In a 5G wireless network, a 5G Standalone Core Network (5G SA core) is responsible for managing and routing data traffic, providing various network resources and services, and supporting the core functionalities of a 5G network. The term "SA" stands for "Stand-Alone," indicating that this core network operates independently of any existing 4G (LTE) infrastructure. 5G wireless networks have the promise to provide higher throughput, lower latency, and higher availability compared with previous global wireless standards. A combination of control and user plane separation (CUPS) and multi-access edge computing (MEC), which allows compute and storage resources to be moved from a centralized cloud location to the "edge" of a network and closer to end user devices and equipment, may enable low-latency applications with millisecond response times. A control plane may include a part of a network that controls how data packets are forwarded or routed. The control plane may be responsible for populating routing tables or forwarding tables to enable data plane functions. A data plane (or forwarding plane) may include a part of a network that forwards and routes data packets based on control plane logic. Control plane logic may also identify packets to be discarded and packets to which a high quality of service should apply. 5G wireless user equipment (UE) may communicate over both a lower frequency Sub-6 GHz band between 410 MHz and 7125 MHz and a higher frequency mm Wave band between 24.25 GHz and 52.6 GHz. As described above, various resources and services of the 5G wireless network are not accessible to a customer for optimizing usage and configuration of these resources in a meaningful and insightful way.

BRIEF DESCRIPTION OF THE DRAWINGS

The present disclosure is illustrated by way of example, and not by way of limitation, in the figures of the accompanying drawings.

FIG. 10 is a flow diagram of a method of operating a probe-as-a-service associated with a customer of a cellular network according to at least one embodiment.

FIG. 14 is a flow diagram of a method of operating a probe-as-a-service associated with a customer of a cellular network according to at least one embodiment.

FIG. 15 is a flow diagram of a method of operating a probe-as-a-service associated with a customer of a cellular network according to at least one embodiment.

FIG. 16 is a flow diagram of a method of operating a probe-as-a-service associated with a customer of a cellular network according to at least one embodiment.

DETAILED DESCRIPTION

Figure 1:
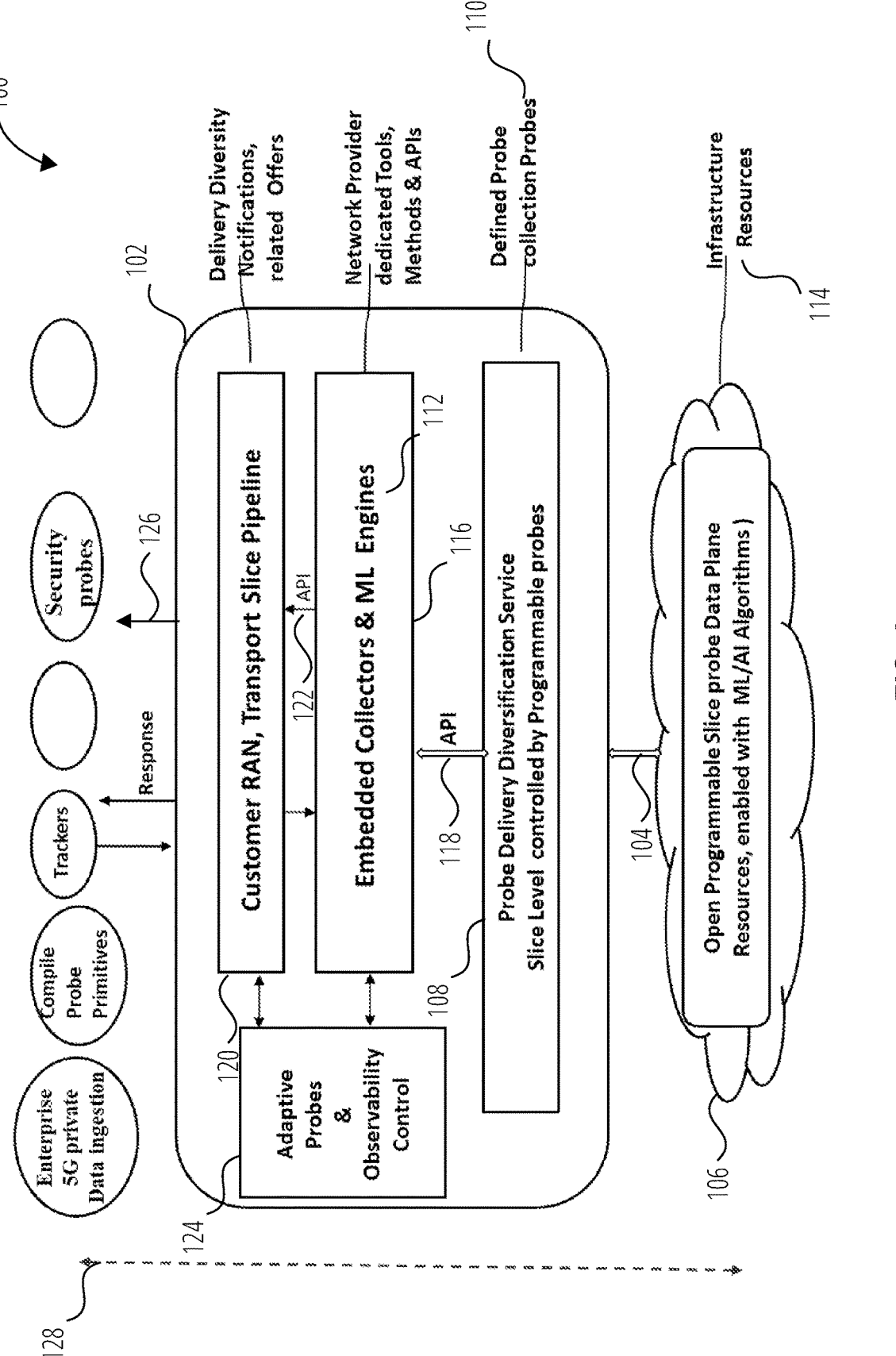
FIG. 1 is a block diagram of a probe-as-a-service platform including a probe controller according to at least one embodiment.

Technologies for providing probes-as-services to customers of a telecommunications network, such as a cellular network (e.g., 5G wireless network, 6G wireless network) are described. The following description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or presented in simple block diagram format to avoid obscuring the present disclosure unnecessarily. Thus, the specific details set forth are merely exemplary. Particular implementations may vary from these exemplary details and still be contemplated to be within the scope of the present disclosure.

There are new and emerging applications with time-sensitive features that could provide a lot more context to their own customers. However, as described above, an enterprise customer of a cellular network does not have access to the data and metadata generated by the resources of the cellular network. Conventionally, some data can be provided to an enterprise customer using a log file. This data would not be considered a real-time measurement context of the cellular network for any dynamic control of the underlying resources by the enterprise customer. Conventionally, there are no mechanisms to enable a customer to obtain data in a meaningful and insightful way to manage usage or configuration of network resources in the cellular network.

Aspects and embodiments of the present disclosure address the above and other deficiencies by providing a probe-as-a-service platform that provides a probe-as-a-service to a customer of a cellular network. Aspects and embodiments of the present disclosure can provide a logical probe-as-a-service for third-party applications (e.g., 5G northbound applications) executing in connection with the cellular network. Aspects and embodiments of the present disclosure can enable third-party enterprise applications to leverage O-RAN-centric wireless networks to get additional insights for verticals such as health care, Vehicle-to-Everything (V2X), Extended Reality (XR), immersive applications, or the like. V2X is a term used in the automotive and transportation industry to describe communication technology that allows vehicles to communicate with various elements of the surrounding environment. This includes communication between vehicles (V2V), between vehicles and infrastructure (V2I), between vehicles and pedestrians (V2P), and more. V2X technology is designed to enhance road safety, traffic efficiency, and overall transportation systems by enabling vehicles to share information about their status, location, and intentions with other vehicles and infrastructure. XR is a term that encompasses virtual reality (VR), augmented reality (AR), mixed reality (MR), and other immersive technologies that combine the physical and digital worlds to create immersive and interactive experiences. These technologies are used in various applications, including gaming, training and simulation, healthcare, education, architecture, and more. The probe-as-a-service can collect data and provide insights as a real-time measurement context of the cellular network to the various applications. The various applications can use the real-time measurement context of the cellular network for dynamic control of one or more resources or services of the cellular network. A customer can use the insight data (i.e., the real-time measurement context) provided by the probe-as-a-service. In particular, aspects and embodiments of the present disclosure can provide a real-time measurement context to one or more network slices serving an enterprise's ecosystem of smart connectivity.

Aspects and embodiments of the present disclosure can provide specialized virtualized artificial intelligence or machine learning (AI/ML)-enabled probes-as-services to third-party enterprise applications in different verticals. A probe-as-a-service can play a role in addressing a variety of vertical applications that need mission-critical insights from the cellular networks that serves them. Aspects and embodiments of the present disclosure can help these new and emerging applications with time-sensitive features by providing more context (e.g., real-time context) to their downstream customers.

It should be noted that 5G and emerging 6G network architectures are based on the concept of virtual network functions. Aspects and embodiments of the present disclosure can cause the virtual network functions to use run-time probes to collect data from data sources in the cellular network and interact with additional embedded AI/ML models. The data sources can be raw counters, logs, events, metrics, traces, alarms, configuration data, flow data, state information, error messages, or the like. A probe agent located at these data sources can be used to collect data items that are aggregated, filtered, or further processed before being input into the AI/ML models.

Aspects and embodiments of the present disclosure can obtain input data for the AI/ML model(s) using probe templates, and the AI/ML model(s) can provide output data, such as key performance indicators (KPIs) or states of network resources of the cellular network. The KPIs and states can be aggregated by higher interfaces, transfer functions, third-party applications, or the like. These applications can be serving their own verticals, leveraging the network primitives and probe functions in the probe-as-a-service. For example, a monetizable application of a 5G wireless network needs to collect measured sensor information from the 5G wireless network to provide insights into the services they provide to their respective customers. In some cases, there can be a first probe-as-a-service for an XR application, a second probe-as-a-service for a V2X application, a third probe-as-a-service for a manufacturing application, a fourth probe-as-a-service for a healthcare application, and the like. The respective probe-as-a-service can be leveraged to provide insights into the respective services they provide to their respective customers. The probe-as-a-service platform can provide these applications with real-time or near-real-time measured data. The real-time or near-real-time measurements can be collected using embedded run-time probe agents, network primitives at the network functions, or the like. The probe-as-a-service platform can utilize the AI/ML inferences' virtual switch function to accelerate coordinated measurements among the distributed probe agents and provide a real-time or near-real-time response to northbound applications via their application programming interfaces (APIs) exposed on the northbound of the probe-as-a-service platform.

The probe templates can assist the applications to be aware of what data context could be available to collect, as well as the AI/ML methods available to process the collected data for observation. It is through these probe templates that the applications can populate their context aware intents, and the probe-as-a-service platform can respond to them accordingly to their set parameters in the probe templates. For example, a collective logical radio probe-as-a-service can operate as a monetization platform to serve third-party 5G enterprise applications. In this context, the probe-as-a-service can be broken down into fundamental measurement primitive components, allowing third-party applications to mix and match APIs and probe template components into a single service chain to meet their needs. An observability application, which may need to compute a set of real-time or near-real-time KPIs or an observability function, obtains one or more probe templates for generating appropriate live network data sets or counters from data stores (e.g., data lakes) through the observability platform northbound interface. The observability application can use the API for collecting appropriate data probes, counters, logs, and events for controlling and monitoring the real-time desired probes and KPIs for a period of time set by the probe template. The probe-as-a-service platform can provide additional synchronization and scheduling or probe functions that can bring back additional context for the time-sensitive verticals. In at least one embodiment, the probe template can be populated with natural language from a customer, and a probe controller can have natural language processing to process the natural language to define the set of programmable parameters for a probe-as-a-service. The probe template can be considered expanded sets of APIs for collecting specific data, aggregating data from disparate sources, obtaining specific insight data from the collected data, and providing the insight data to one or more northbound applications that use the insight data for additional operations, such as presenting on a dashboard, inputs to an analytics engine, output alerts and notifications, etc.

FIG. 1 is a block diagram of a probe-as-a-service platform 100 including a probe controller according to at least one embodiment. The probe controller 102 can collect, process, and enrich input data 104 in real-time or near-real-time. The probe controller 102 can use various transform functions, aggregators, or the like, to join data from various data sources, and persist them in time-series databases (TSDBs). For example, an external sensor can collect first data, and second data can be collected from network resources of a cellular network 106. The second data can be part of a slice within the cellular network 106. The different types of data sources can be data probes, counters, logs, events, or mechanisms used in computing and system monitoring. The probe controller 102 can gather information and determine insights about the behavior and performance of network resources in a cellular network, including software systems and applications.

As described herein, the probe controller 102 can provide one or more probes-as-services in the cellular network 106. The probe controller 102 can receive, from a customer (e.g., enterprise customer), a request for a probe-as-a-service 108 in the cellular network 106. The probe-as-a-service 108 can provide a probe delivery diversification service. The diversification service can be provided at a slice level 128. For example, a first slice can be controlled by a first set of programmable probe collectors, and a second slice can be controlled by a second set of programmable probe collectors, described in more detail below. The probe controller can provide a first probe-as-a-service with the first set of programmable probe collectors to the first slice and a second probe-as-a-service with the second set of programmable probe collectors to the second slice.

In at least one embodiment, the request can include a probe template associated with the probe-as-a-service. The probe template can have a set of programmable parameters that specify various aspects of the probe-as-a-service. For example, a first parameter of a probe template can specify a set of one or more probe collectors 110 to collect input data 104. A second parameter of the probe template can specify one or more ML models (e.g., ML engines provided by a network provider) to process the input data 104 to obtain observation data. The second parameter can specify other network provider dedicated tools, methods, and APIs to other functions to process the input data 104. A third parameter of the probe template can specify a northbound application to receive the observation data, notifications associated with the observation data, alarms associated with the observation data, or the like, via APIs 126. In some cases, the northbound application can include or be a dashboard, a transfer function, an analytics application, or a second ML model. The third parameter could also specify a related offer associated with the observation data.

In at least one embodiment, the probe template can include probe policies that define how the ML model(s) are used and how to automate actions by pushing derived policies to the data sources and transformers for adaptive enrichments. For example, the probe template can specify a set of probe collectors 110, each of which can control or program a set of probe agents. Each probe agent is located at an infrastructure resource 114 of the cellular network 106, a sensor associated with the cellular network 106 (not illustrated in FIG. 1), or a UE connected to the cellular network 106 (not illustrated in FIG. 1). In at least one embodiment, a probe agent is a software component, code, or other mechanism used in computing and system monitoring to collect information about the behavior and performance of a network resource, such as an infrastructure resource 114, a sensor, a UE, or the like. The probe agent can be a hardware circuit, a software probe, a virtual probe, or the like. The probe agent can collect specific data points or metrics from various parts of a system. The probe agent can collect information from a counter, a log, an event, a stored metric, a trace, an alarm, configuration data, flow data, state information, error messages, or the like. For example, the probe agent can collect metrics like central processing unit (CPU) usage, memory usage, network traffic, disk input/output (I/O), etc. The probe agent can continuously sample or measure, at a specified rate in the probe template, these metrics and make them available for monitoring and analysis. The probe agents can be used for understanding the current state and health of network resources of the cellular network 106. A counter, for example, is a type of metric used to keep track of cumulative values over time, such as to count events or occurrences. The counter can be useful for measuring the frequency or rate of events and can provide insights into trends and patterns. A log, for example, can be a textual record generated by the respective resource. The log can capture important information, events, and actions taken by a system. Logs are often used for troubleshooting, auditing, and monitoring. They can contain various types of data, including timestamps, error messages, user actions, and more. An event can be a discrete occurrence or incident that has significance within the resource. Events can represent various types of activities, such as user interactions, system state changes, or errors. Metrics can be quantitative measurements or values that provide insight into the performance, health, or state of a system or application. They can include CPU utilization, memory usage, network bandwidth, response time, and more. Metrics can typically be collected over time to track trends and detect anomalies. Traces can be detailed records of individual transactions or events within a system. They include information about the sequence of actions taken, timestamps, and data associated with each event. Traces can be valuable for diagnosing performance issues and understanding the flow of data or requests through a system. Alarms or alerts can be notifications triggered when specific conditions or thresholds are met. For example, an alarm might be raised when CPU usage exceeds a certain threshold or when a security breach is detected. Alarms are used to notify administrators or automated systems of significant events. Configuration data can include settings, parameters, and configuration files that define how a system or application should behave. It can encompass network configurations, application settings, hardware settings, and more. Changes to configuration data can have a significant impact on system behavior. Flow data, often used in network monitoring, can represent the records of data flows between network devices. It includes information about source and destination IP addresses, port numbers, protocols, and the amount of data transferred. Flow data is useful for analyzing network traffic patterns. State information can represent the current state or condition of a system or application. It includes variables, flags, and data structures that capture the system's status. State information is crucial for maintaining context and continuity in distributed systems. Audit logs can be records of actions and activities performed by users or systems. They are often used for security and compliance purposes, providing a detailed history of who did what and when. Audit logs are crucial for investigating security incidents and maintaining accountability. Performance counters can be specialized metrics that focus on system performance and resource utilization. They can include CPU cycles, memory paging rates, disk I/O operations, and network packet rates. Performance counters are used for fine-grained performance analysis. In network analysis, packet captures (or packet traces) can contain raw network packets, including their headers and payloads. Packet captures are used to inspect network traffic at a granular level, diagnose network issues, and investigate security incidents. Error messages can be notifications generated by systems or applications to indicate that something has gone wrong or an unexpected condition has been encountered. Error messages often contain diagnostic information to help troubleshoot issues. These data items play essential roles in monitoring, troubleshooting, and optimizing systems, networks, and applications. The choice of which data items to collect and analyze depends on the specific goals and requirements of the monitoring and analysis tasks.

In at least one embodiment, the probe template includes probe policies. The set of probe collectors can program the probe agents according to the probe policies. It should be noted that APIs 118 and APIs 122 can be internal interfaces, whereas the APIs 126 can be external interfaces. The APIs 126 can be referred to as northbound application programming interfaces (northbound APIs).

Once the various probe agents collect and provide the input data 104 to the set of probe collectors 110, the input data 104 can be input into the ML model(s) 112. The ML model(s) 112 can generate observation data based on the input data 104. The observation data can include a key performance indicator (KPI) or a state of the at least one of the infrastructure resource 114, the sensor, or the UE. For example, a probe agent can collect log data and the ML model(s) 112 can be part of a method or tool that processes and searches through the log data for insights. The probe controller 102 can provide the observation to a northbound application, as specified in the probe template. In at least one embodiment, the probe controller 102 can include a user interface or representational state transfer (REST) APIs for both on-demand and programmatic pull or push queries by a customer. The probe controller 102 can expose inferred insights, historical metrics, and decisions through multi-dimensional abstraction models to northbound applications, such as a dashboard.

In at least one embodiment, the probe controller 102 can provide APIs to enable customizable self-defined probe collectors and/or probe agents, which can also be wrapped in APIs for further programmability. In at least one embodiment, the probe controller 102, including the APIs and their functionalities, can be packaged in a Near-Real-Time Radio Intelligent Controller (Near-RT RIC). A Near-RT RIC is a key component in the architecture of modern 5G (and beyond) mobile networks, specifically within the context of open, software-defined, and virtualized network architectures. "Near-Real-Time" means that the controller operates with minimal latency or delay, allowing for rapid decision-making and control of radio resources. In 5G and future networks, low latency is crucial for supporting applications like autonomous vehicles, augmented reality, and ultra-reliable communication. The Near-RT RIC is specifically designed to operate with very low latency, often in the order of milliseconds, to ensure that it can respond quickly to changing network conditions and traffic demands. It is a key component in enhancing the performance and efficiency of the radio access network in 5G and future networks. The Near-RT RIC can be thought of as part of the broader movement towards open and virtualized network architectures, such as O-RAN (Open Radio Access Network), where network functions are disaggregated, and software-driven controllers play a central role in optimizing and managing network resources. It helps network operators adapt to the dynamic and diverse requirements of modern wireless communication while improving the overall performance and efficiency of the network. In at least one embodiment, the probe controller 102, including the APIs and their functionalities, can be packaged in a non-RT-RIC.

In at least one embodiment, as illustrated in FIG. 1, the probe-as-a-service 108 can interact with other processing blocks, such as an embedded collectors and ML engines block 116 via APIs 118. The block 116 can include embedded collectors, such as the set of probe collectors 110, aggregators, or other functions, that can aggregate or process the input data 104, and one or more ML model(s) 112 that can infer insights or observations about the input data 104. The block 116 can include other network provider tools, methods, or APIs for further processing the input data 104. The block 116 can interact with block 120, including a customer RAN or a transport slice pipeline, via APIs 122. The block 120 can include logic or functionality to deliver diversity notifications, related offers, alarms, or other observation data to the northbound application(s). In at least one embodiment, the probe controller 102 can include a block 124 that provides adaptive probes and observability control of block 116 and block 120. The control provided by the block 124 can be set forth in the probe template, as described herein.

In at least one embodiment, as illustrated in FIG. 1, the infrastructure resources 114 can be data plane resources, user plane resources, or the like. Also, the infrastructure resource 114 can be resources provided at a slice level. The probe controller 102 can provide open and programmable probe agents in the infrastructure resources 114 to collect input data 104 that is further processed by AI/ML methods of the block 116, as described herein.

In at least one embodiment, the probe controller 102 can receive a request for a custom probe-as-a-service from a customer. The request can be compiled into a set of network analytic data probes that depict aggregated intelligence to serve the custom probe definition required by the customer. The probe-as-a-service 108 can be used in various use cases. The following are some examples.

In at least one embodiment, the probe-as-a-service 108 can be used for a logical radio resource abstraction for an enterprise with dedicated northbound applications. In some embodiments, the northbound application can contain centralized log management and analysis tools to process and search through large volumes of logs for additional insights, debugging, optimizations, or the like. In some embodiments, the northbound application can contain event-driven systems and architectures that rely on events to trigger specific actions or processes. Events can be logged for monitoring and analysis, and they are also a fundamental concept in event-driven programming and event sourcing.

In at least one embodiment, the probe-as-a-service 108 can be used to spin up "probe services" for enterprise slices, user data usages, events, devices, and logic resources of the cellular network 106.

In at least one embodiment, the probe-as-a-service 108 can be used for accepting feedback from customer applications for more efficient resource usage, security alerts, and controls in the cellular network 106 (e.g., private 5G wireless network).

In at least one embodiment, the probe-as-a-service 108 can be used for enhanced notifications to an enterprise utilizing predictive planning alerts and/or algorithms with the network provider's AI/ML models.

In at least one embodiment, the probe-as-a-service 108 can be used for optimizing customers' dedicated slices and enforcing their policies for their own dedicated resources.

In at least one embodiment, the probe-as-a-service 108 can be used for providing priority for users (e.g., emergency responders) in the event their devices misbehave on the measured probes. The users can be users, devices, robots, drones, etc. Certain devices, like robots and drones, may need to be monitored for appropriate behavior.

In at least one embodiment, the probe-as-a-service 108 can be used for device-level probes such as for location and behavior boundaries correlated with network-provided resources. The probe-as-a-service 108 can be used for other similar and dissimilar use cases that are not necessarily described herein.

In at least one embodiment, a probe template can be populated with natural language from a customer, and a probe controller can have natural language processing to process the natural language to define the set of programmable parameters for a probe-as-a-service. The probe template could have any of the following examples of demands in the requests:

1. Show me all the UEs active on Slice X, Y
2. Show me all the video or voice or data packet data unit (PDU) sessions on specific slice
3. Slice level Probe as a Service provides for customized self-defined probes
4. Provide Real Time Analytics from defined Probes at atomic level
5. Enable Dedicated Enterprise 5G probes mapped to their optimization policies
6. Load balancing among executing logical probes against available slices
7. Utilize probes to Track enterprise customers specific Device Behaviors
8. Enable Dedicated 5G Enterprise Data collection from slice user planes as a services
9. Putting Enterprise customers in charge of their 5G private Data PDU sessions within RAN slices In response to the demands in the requests, the probe controller 102 can compile probe collectors into logic slice configurations and expose probe state analytics to enterprises via northbound applications (e.g., dashboards).

The following examples include functions and features that the probe controller 102 can provide in the respective probe-as-a-service:

Oversee the behaviors of enterprise slices (end-to-end (E2E) slices) with their own defined probes Oversee private user plane data extracted from their PDUs meta data insights Autonomous abstraction of custom probes for additional notifications and Alerts Network provider's slice profile and its configuration settings can perform a closed feedback loop with enterprise dedicated probe applications The probe-as-a-service 108 can include other functions and features than these examples. The probe templates can specify a dynamic probing flow for the probe-as-a-service 108. An example dynamic probing flow of the probe-as-a-service platform 100 is described below with respect to FIG. 2.

Figure 2:
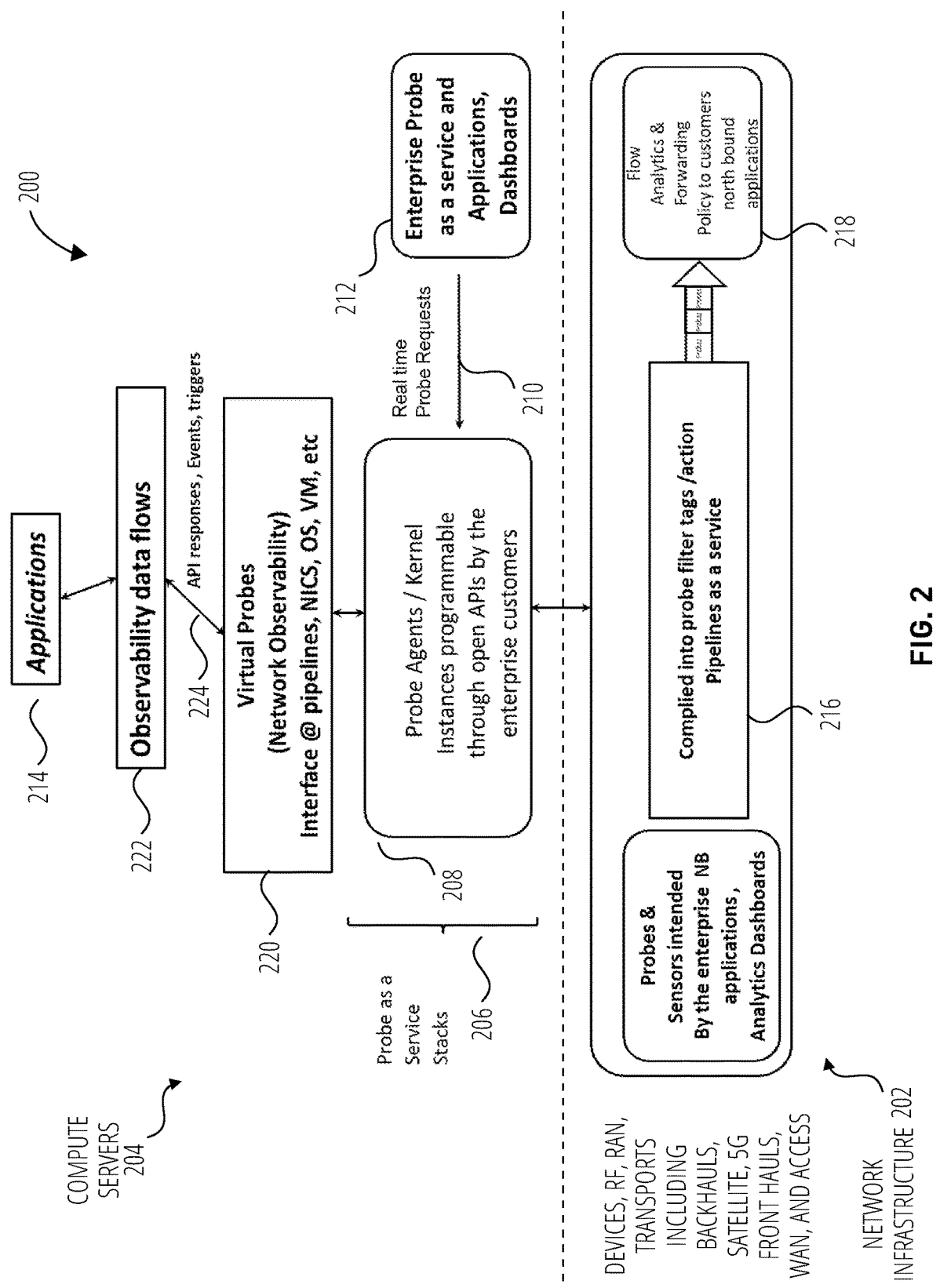
FIG. 2 is a flow diagram of a dynamic probing flow of the probe-as-a-service platform according to at least one embodiment.

FIG. 2 is a flow diagram of a dynamic probing flow 200 of the probe-as-a-service platform 100 according to at least one embodiment. The dynamic probing flow 200 can be separated into operations in a network infrastructure 202 and compute servers 204. As part of the network infrastructure 202, there can be devices, sensors, test equipment, UEs, a dedicated transport resource in a backhaul interface (e.g., backhaul link) or a fronthaul interface (e.g., fronthaul link), a dedicated radio frequency (RF) resource instance, customer radio access network (RAN) data, a transport slice pipeline, secure signaling session data, a Radio Unit (RU), a radio access network (RAN) resource, etc. On the compute servers 204, a probe-as-a-service stack 206 can include probe agents 208 that are programmable through open APIs by an enterprise customer. The probe agents 208 can be kernel instances that are programmable through the APIs. The probe-as-a-service stack 206 can provide an enterprise probe-as-a-service 212 via a user interface (UI) to the enterprise customer. The UI can be part of or separate from an enterprise application (e.g., dashboard, analytic application, etc.). The probe-as-a-service stack 206 can receive real-time probe requests 210 via the enterprise probe-as-a-service 212. The probe-as-a-service stack 206 can program the probe agents 208 located at the various places in the network infrastructure 202. The network infrastructure 202 can include probe agents and sensors intended to collect and process data to be used by northbound applications 214. In one embodiment, the enterprise application that uses the enterprise probe-as-a-service 212 is a northbound application. In another embodiment, the enterprise application submitting the real-time probe requests 210 is different than a northbound application that uses the collected real-time data context. In at least one embodiment, the probe agents 208 can be compiled into probe filter tags and actions in pipelines of the network infrastructure 202 (block 216). The probe agents 208 can be used to define flow analytics and forwarding probe policies to the corresponding enterprise northbound applications (block 218).

As described above, the probe-as-a-service stack 206 can use probe agents 208 in the network infrastructure 202. The probe-as-a-service stack 206 can also use virtual probes 220 (also referred to herein as probe agents) in the compute servers 204. The virtual probes 220 can provide network observability at various interfaces, such as at various pipelines in the compute servers 204, network interface cards (NICs) or virtual NICs, operating systems, virtual machines, etc. The collected data from the probe agents 208 and the virtual probes 220 can be processed by one or more AI/ML inference models to obtain observation data 224 in one or more observability data flows 222 to one or more northbound applications 214. The observation data 224 can be provided as API responses, events, triggers, alarms, or the like.

In at least one embodiment, the probe-as-a-service stack 206 can receive the probe template in a request. The probe-as-a-service stack 206 can receive the probe template or the request via a Northbound API. The probe-as-a-service stack 206 can receive the input data from the probe agents 208 via a set of APIs, each API being associated with the respective probe agent. The input data can include counters, logs, events, metrics, traces, alarms, configuration data, flow data, state information, error messages, etc. The northbound applications 214 can include a dashboard, a transfer function, an analytics application, or one or more AI/ML models to further process the observation data 224.

In at least one embodiment, the cellular network is a 5G wireless network and the customer is an enterprise customer of the 5G wireless network. Devices can connect to the 5G wireless network as a private network, instead of using a wireless local area network (WLAN). The probe agents 208 can be located at various devices, sensors, test equipment, UEs, a dedicated transport resource in a backhaul link or a fronthaul link, a dedicated RF resource instance, customer RAN data, a transport slice pipeline, secure signaling session data, a RU resource, or a RAN resource in the network infrastructure 202. The virtual probes 220 can be located at various infrastructure resources of the 5G wireless network.

During operation, the probe-as-a-service stack 206 can receive a real-time probe request 210 from the enterprise customer. The request could include a custom probe definition being requested by the enterprise customer. The custom probe definition can specify a set of probe collectors to collect input data, an ML model for generating inference data, and a northbound application to receive the inference data. The custom probe collectors can be compiled into a set of network analytics data probes that depict aggregated intelligence to serve the custom probe definition requested by the enterprise customer. For example, a 5G wireless network used for self-driving cars could use the probe-as-a-service to sell road condition data or provide better network services for the self-driving cars themselves. This allows an enterprise customer to monetize the insight data provided by the probe-as-a-service. The probe-as-a-service can also provide data to subject matter experts (SMEs) to analyze the slice data (or the entire cellular network) to improve operations of dedicated resources in the slice (or operations of the network resources of the entire cellular network). The probe-as-a-service can provide more than APIs to collect data, but rather insight data that can be leveraged for other applications, offers, details, or the like. For another example, a manufacturer could use the probe-as-a-service to obtain insight data for improving operations within a manufacturing facility using probe agents, sensors, and/or the underlying infrastructure resources.

In at least one embodiment, the probe-as-a-service is associated with a dedicated slice of the cellular network having dedicated resources. The slice can represent similar behavior for many other slices. One of the northbound applications 214 can use the observation data to optimize the dedicated slice and enforce policies associated with the dedicated resources. From this slice, behaviors of similar slices can be extrapolated. It should be noted that minimal slice resources can be used to give the customer insight for many slices. This slice can be an enabler for active holistic testing of slices in the cellular network.

In at least one embodiment, the probe-as-a-service could be used by a company store to obtain insight data regarding distances travelled by customers in a store. The insight data could be used to provide an alert, a notification, an offer, or the like, to an operator of the store, a customer of the store, or both. For example, the probe-as-a-service could receive a request, such as "how many customers currently in the store travelled more than 10 miles to the store?" The probe-as-a- service can retrieve location information from the underlying network services, and provide insights on the location information. In some cases, the probe-as-a-service could use sensors or devices that are external to the cellular network to provide the input data or to supplement the input data being collected. In some cases, the probe-as-a-service can be scheduled to run according to a specified schedule. As described above, the probe templates can specify different configurations of multiple probe collectors to provide a probe-as-a-service. An example of one configuration is illustrated and described below with respect to FIG. 3.

Figure 3:
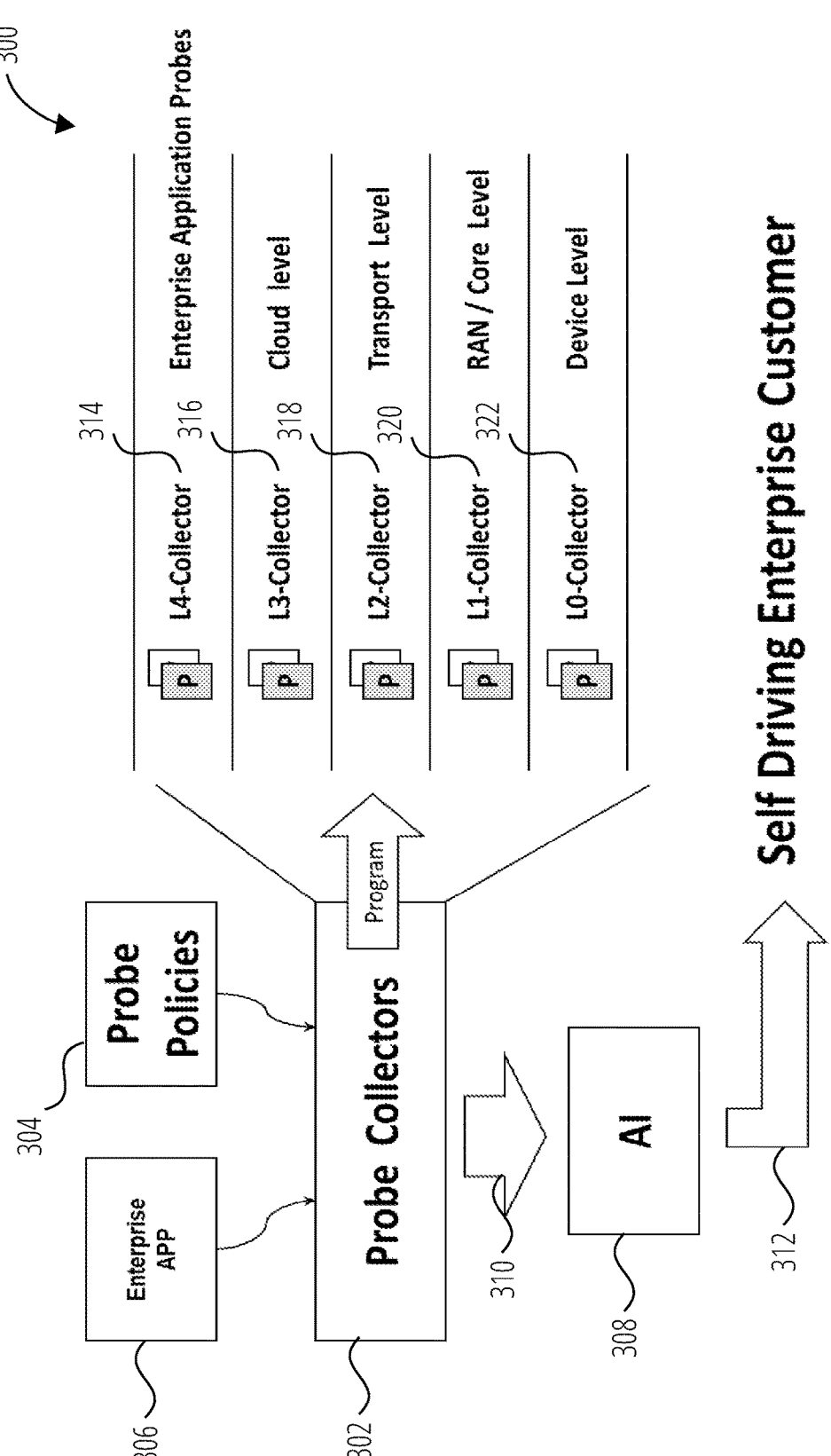
FIG. 3 is a block diagram of multiple probe collectors of a probe-as-a-service according to at least one embodiment.

FIG. 3 is a block diagram of multiple probe collectors 302 of a probe-as-a-service 300 according to at least one embodiment. The probe collectors 302 can be defined by a probe template 304 received from a customer (e.g., enterprise customer). The probe template 304 can specify probe policies for each of the multiple probe collectors 302. The probe template 304 can specify an enterprise application 306 from which to receive input data and/or send output data. The probe template 304 can specify one or more AI/ML model(s) 308. The AI/ML model(s) 308 can receive the input data 310 collected by the probe collectors 302 and generate observation data 312 (e.g., insight data) for the enterprise application 306 (e.g., a dashboard, an analytics engine, or the like).

In at least one embodiment, the probe collectors 302 can program different types of probe collectors, such as an enterprise application collector 314, a cloud-level collector 316, a transport-level collector 318, a radio access network level (RAN-level) collector or a core-level collector 320, and a device-level collector 322. The probe collectors 302 can include any combination of one or more of each of these different types of probe collectors. Each of the probe collectors can program a probe agent to specify what data to collect, how often to collect, how to aggregate data, or other collection parameters. In at least one embodiment, the probe collectors 302 includes a first probe collector that programs a first probe agent to collect first data according to certain probe policies of the probe template 304, and a second probe collector that programs a second probe agent to collect second data according to certain probe policies of the probe template 304. During operation, the first probe collector collects first data from the first probe agent, and the second probe collector collects the second data from the second probe agent. The probe agents can be scheduled to run at specific times, periodically, or continuously. The first and second probe collectors can collect data at the same rate or different rates. In at least one embodiment, the first data is collected at a first rate, and the second data is collected at a second rate different than the first rate. In a further embodiment, the first data collector can collect third data from a third probe agent (located at a different location than the first probe agent). The first data collector can be programmed to aggregate the first data and the third data. In another embodiment, the second data collector can aggregate the second data and the third data to obtain combined collected data. The first data collector can aggregate the first data and the combined collected data to obtain the input data 310. In at least one embodiment, program loops and collector loops can be specified to collect various data from various sources in various configurations, such as illustrated in the example of multi-layer application bindings of FIG. 4.

Figure 4:
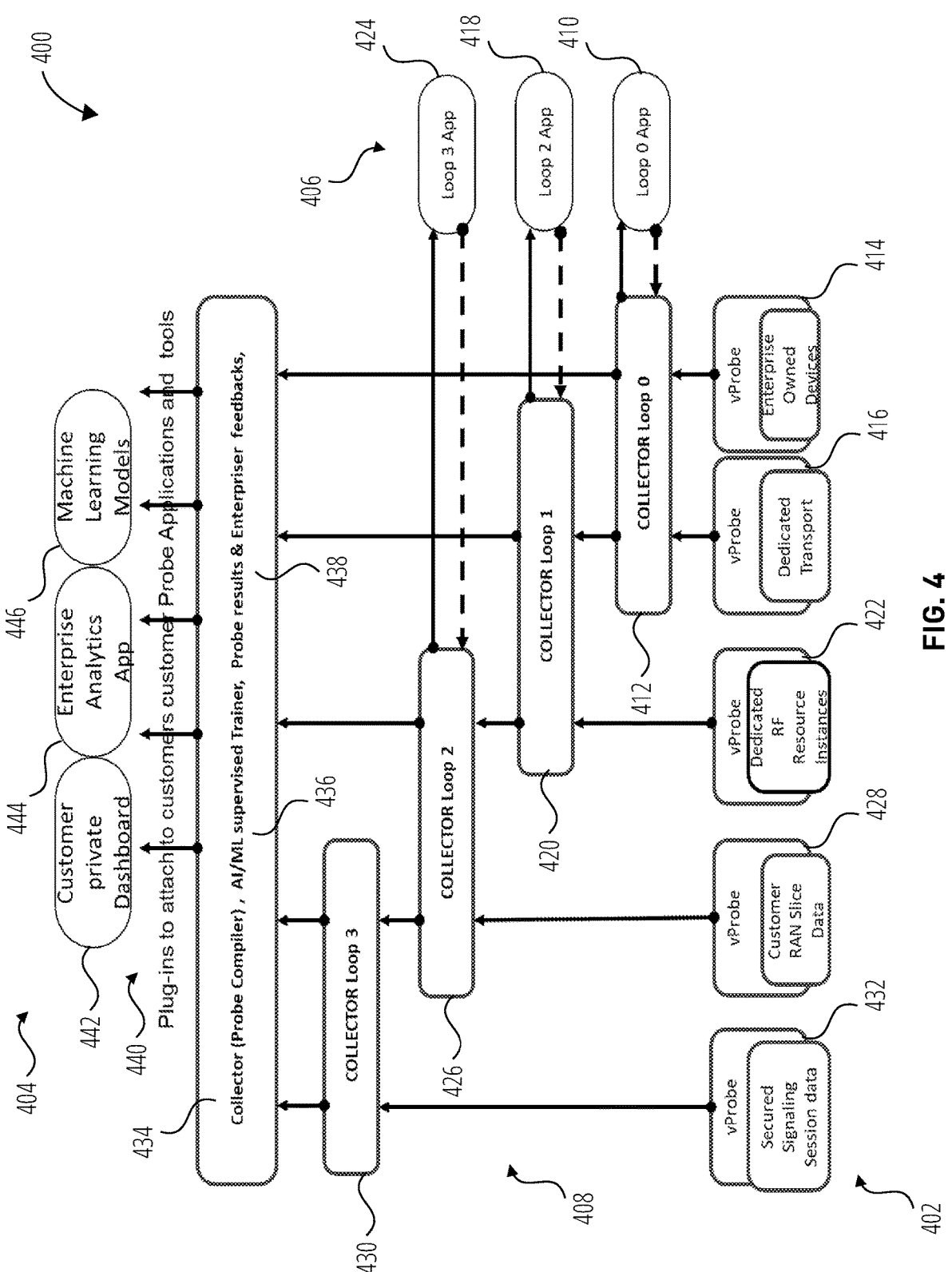
FIG. 4 is a flow diagram of multi-layer application bindings of probe collectors between virtual probes and northbound applications according to at least one embodiment.

FIG. 4 is a flow diagram of multi-layer application bindings 400 of probe collectors between virtual probes 402 and northbound applications 404 according to at least one embodiment. As described above, multiple program loops 406 and collector loops 408 can be specified to collect various data from various sources in various configurations. The program loops 406 and the collector loops 408 can be programmed by the respective probe collectors described above.

In the example illustrated in FIG. 4, a first program loop 410 is configured to cause a first collector loop 412 to collect first data from a first virtual probe agent 414 and second data from a second virtual probe agent 416. In this example, the first virtual probe agent 414 is located in an enterprise-owned device, and the second virtual probe agent 416 is located in a dedicated transport resource. The first collector loop 412 can provide the first data to a probe compiler 434 and the second data to a second collector loop 420. Alternatively, the collector loop 412 can aggregate the first data and the second data and provide the combined data to the probe compiler 434. The second collector loop 420 can be configured by a second program loop 418. The program loop 418 configures the collector loop 420 to collect third data from a third virtual probe agent 422. The third virtual probe agent 422 can be located at a dedicated RF resource. The second collector loop 420 can receive the second data from the first collector loop 412 and pass the second data to the probe compiler 434. Alternatively, the second collector loop 420 can aggregate the second data and the third data. The second collector loop 420 can provide the third data to a third collector loop 426. The third collector loop 426 can be configured by a third program loop 424. The third program loop 424 can configure the third collector loop 426 to collect fourth data from a fourth virtual probe agent 428. The fourth virtual probe agent 428 can be located at a customer RAN slice data source. The third collector loop 426 can provide the third data to the probe compiler 434 and the fourth data to a fourth collector loop 430. Unlike the first collector loop 412, second collector loop 420, and third collector loop 426, the fourth collector loop 430 is not controlled by a corresponding program loop. The fourth collector loop 430 can collect fifth data from a fifth virtual probe agent 432. The fifth virtual probe agent 432 can be located at a secured signaling session data source. The fourth collector loop 430 can provide the fifth data and/or the fourth data to the probe compiler 434. The fourth collector loop 430 can aggregate the fourth and fifth data and provide the combined data to the probe compiler 434. The program loops 406 can configure the collector loops to collect data at different rates, aggregate data from different sources, etc. In other embodiments, the collector loops 408 can perform operations on the collected data. The probe compiler 434 can receive the collected data from the various virtual probes 402. The collected data can be transformed into feature data for AI/ML supervised training 436 to train ML models or inputs into trained AI/ML models to provide probe results and enterprise feedback 438. The probe results and enterprise feedback 438 can be provided as observation data 440 to the northbound applications 404. As illustrated in FIG. 4, the northbound applications 404 can include a customer private dashboard 442, an enterprise analytics application 444, additional ML models 446, or the like. It should be noted that in other embodiments, the virtual probe agents can be located in other resources, other sensors, or other UEs associated with a cellular network. It should also be noted that although virtual probe agents are illustrated and described with respect to FIG. 4, in other embodiments, other probe agents can be used, such as hardware probe agents.

Figure 5:
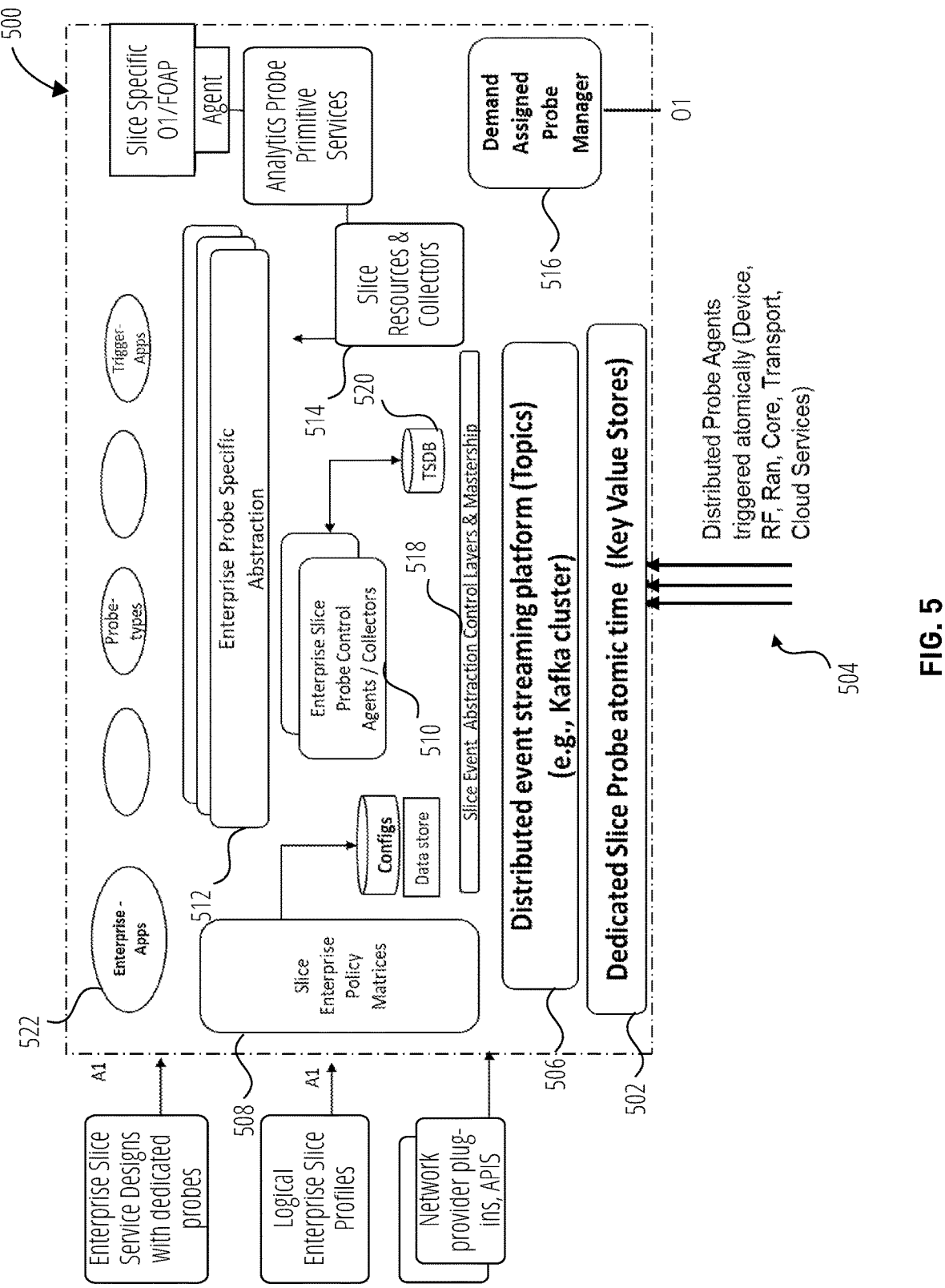
FIG. 5 is a block diagram of an Open Radio Access Network (O-RAN)-centric slices with dedicated probes as a service according to at least one embodiment.

FIG. 5 is a block diagram of an Open Radio Access Network (O-RAN) centric slices 500 with dedicated probes as services according to at least one embodiment. The dedicated probes-as-services can have various components to improve enterprise private 5G slice services. The key-value stores 502 can be populated with data collected from distributed probe agents 504. The distributed probe agents 504 can be triggered automatically or manually. The distributed probe agents 504 can be located in or at various locations, such as at devices, RF resources, RAN resources, core resources, transport resources, cloud services, or the like. The key-value stores 502 can operate according to dedicated slice probe atomic times. Atomic time provides a method for collecting data or actuating sensors at the same time. For example, the radio, baseband, core, and edge may all be doing their functions and the data can be collected atomically to learn their relevant measurements at time t, $t+1, \ldots t+n$. The distributed probe agents 504 can capture behaviors, locations, states, statistics, or the like. The O-RAN-centric slices 500 can include a distributed event streaming platform 506 (e.g., Kafka cluster) that can subscribe to various topics. For example, the data can be filtered using probe filters to distribute data to subscribers of that particular data. The O-RAN centric slices 500 can use enterprise slice probe control agents/collectors 510 to collect certain data from a time-series database 520. The enterprise slice probe control agents/collectors 510 can operate according to the different enterprise probe specific abstractions 512 and slice enterprise policy matrices 508. The slice enterprise policy matrices 508 can be stored in a configuration database or other data stores. The O-RAN-centric slices 500 can also include slice resources and probe collectors 514 to collect data from various slice resources. The O-RAN-centric slices 500 can include a demand assigned probe manager 516.

The O-RAN-centric slices 500 can provide a priority feedback loop for the 5G slices. The O-RAN-centric slices 500 can improve 5G slice resource utilization, as driven by enterprise customer applications 522. The O-RAN-centric slices 500 can be used for enhanced security and data monetization by the enterprise customers.

Figure 6:
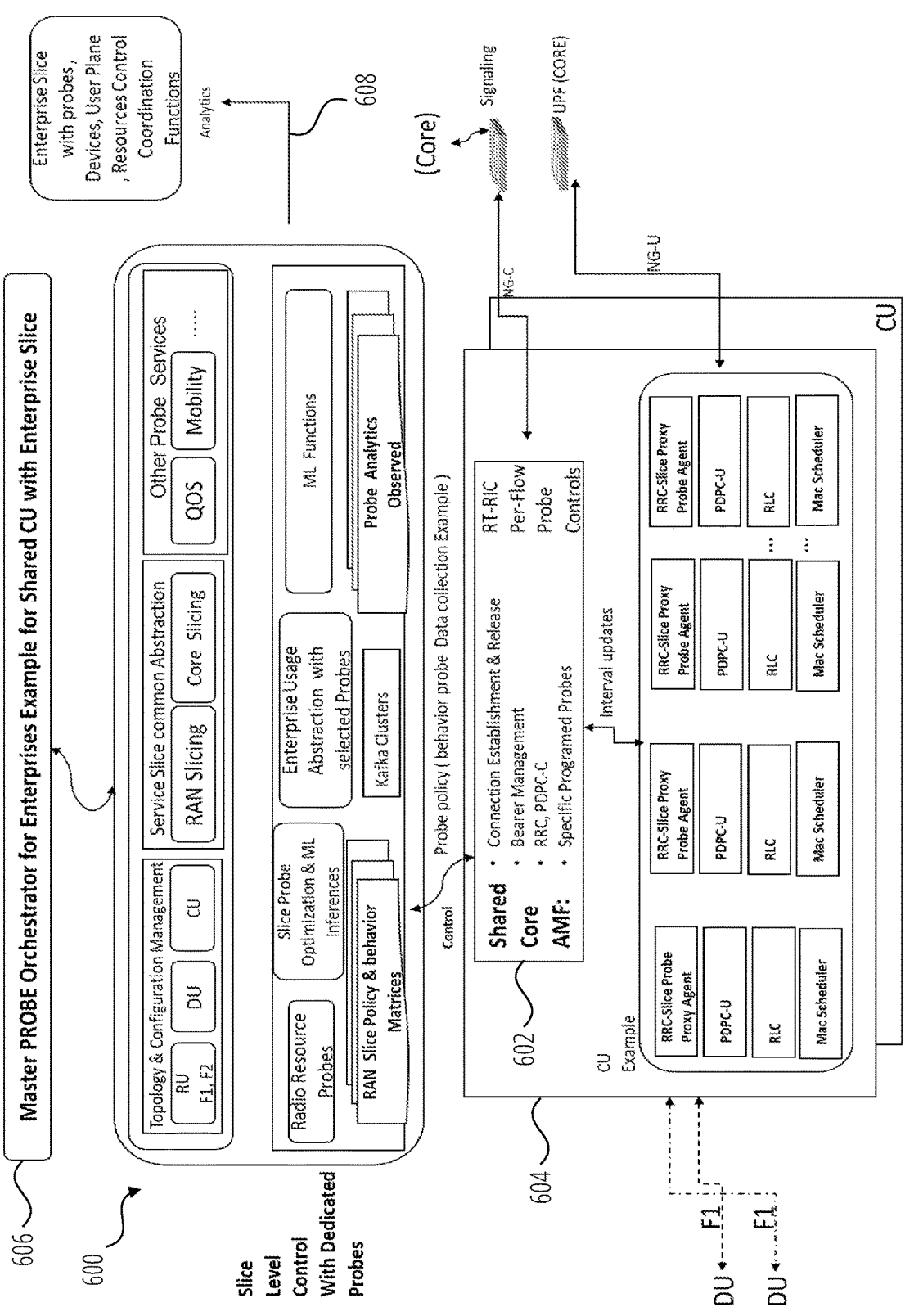
FIG. 6 is a block diagram of a slice-level controller with dedicated probes in an enterprise slice according to at least one embodiment.

FIG. 6 is a block diagram of a slice-level controller 600 with dedicated probes in an enterprise slice according to at least one embodiment. The slice-level controller 600 can be implemented in a shared core access and mobility management function (AMF) 602 of a centralized unit (CU) 604. Additional details of shared core AMF 602 and CU 604 are described below. The dedicated probes of the slice-level controller 600 can be controlled by a probe orchestrator 606 that manages probes in multiple enterprise slices. The slice-level controller 600 can have various functional blocks, such as radio resource probes, slice probe optimization and AI/ML inferences, enterprise usage abstraction with selected probes, AI/ML functions, RAN slice policy and behavior matrices, and probe analytics observed. The slice-level controller 600 can include a distributed event streaming platform (e.g., Kafka cluster). In this example, the probe policy is a behavior probe data collection example. The slice-level controller 600 can be implemented as part of the shared core AMF 602, as illustrated in FIG. 6. The shared core AMF 602 can manage connection establishment and release, bearer management, radio resource control (RRC), User plane data, as well as the specific programmed probes. For example, at interval updates, the RRC-slice probe agent (e.g., proxy probe agent), can collect data from the corresponding resources. The collected data can be stored in the RAN slice policy and behavior matrices for further processing by the slice probe optimization and ML inferences. For another example, a probe agent can be located at a MAC scheduler to collect data. The collected data can be directed to ML functions to obtain observation data. The collected data and/or the observation data can be provided as probe analytics 608. The probe analytics 608 observed can be provided to northbound applications, as described herein. The user of the slice-level controller 600 with dedicated probes can decide on the data that needs to be collected from each slice, the timing of the collection, the manner of the collection, etc. The user may set policies of what to collect, triggers to collect, how long to collect, etc. The user may also set what ML models can be used to generate insights or observations about the collected data before being provided to the northbound applications.

The slice-level controller 600 can have various other functional blocks, such as illustrated as a block for topology and configuration management, a block for service slice common abstractions, and a block for other probe services (e.g., QOS, mobility, etc.).

Figure 7:
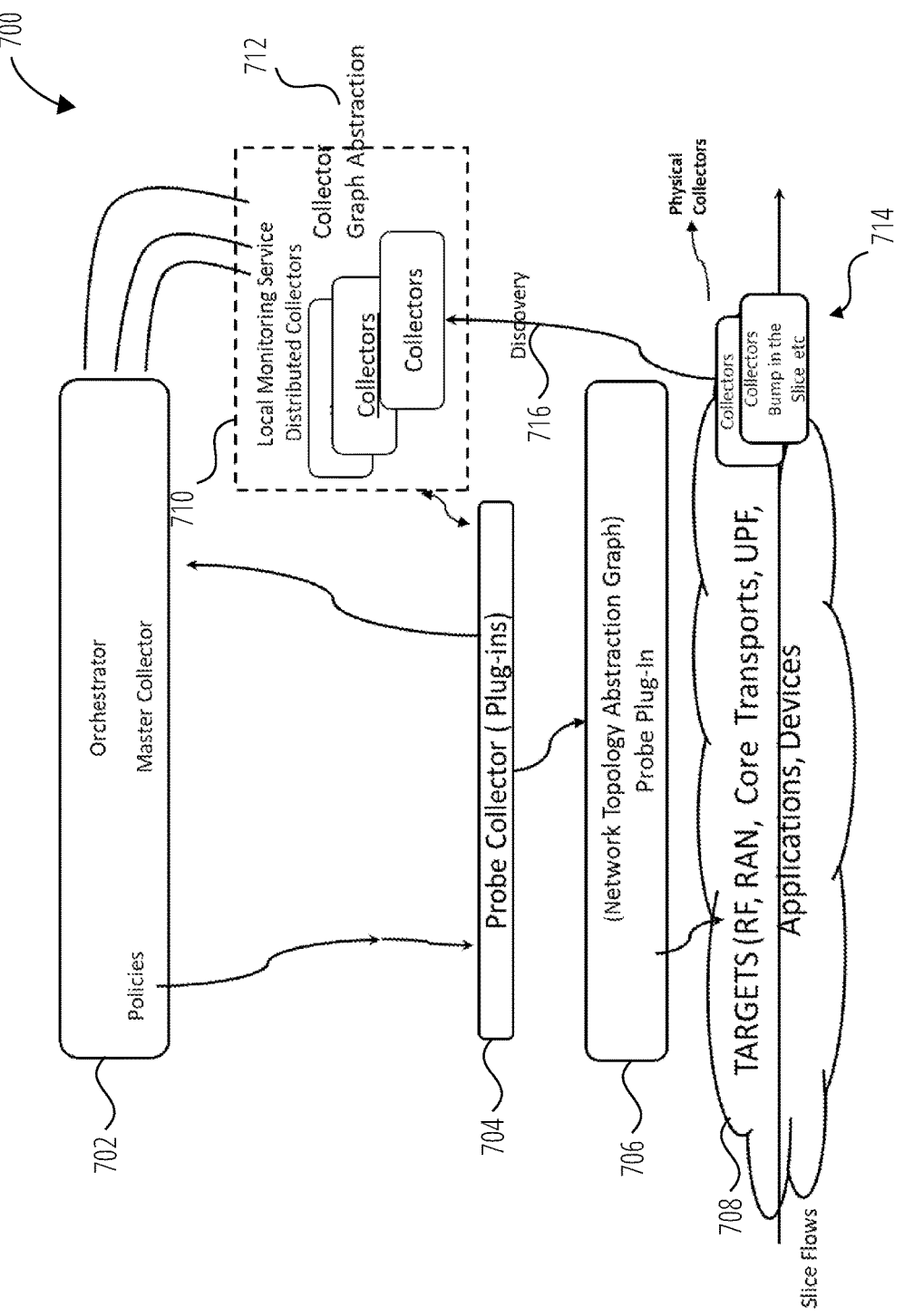
FIG. 7 is a flow diagram of a probe collector observability flow according to at least one embodiment.

FIG. 7 is a flow diagram of a probe collector observability flow 700 according to at least one embodiment. In the probe collector observability flow 700, a probe orchestrator 702 can manage probe collectors 704 (e.g., plug-ins in a network topology abstraction graph) and a local monitoring service 710. The local monitoring service 710 can perform discovery 716 to identify various distributed collectors (e.g., with corresponding probe agents) located at various targets 708 in one or more slice flows. The local monitoring service 710 can create a collector graph abstraction 712, such as the example illustrated in FIG. 4. The targets 708 can be various infrastructure resources, sensors, UEs, or the like. The probe collectors 704 can have probe agents 714 in the slice (e.g., collectors bump in the slice, bump in the wire, bump in the function, or the like) or physical collectors, such as devices or sensors located in an environment in which the cellular network is operating. The bump in the slice can be where test or dummy data is injected into the process for measuring, assessing, observing aspects of the underlying network resources. The collectors can inject data, turn on collection, turn off collection, to measure or assess activity of the network (or network slice). The collectors can tag data for active testing or passive monitoring of the network (or network slice). The probe plug-in (probe agents) 706 can be defined in the network topology abstraction graph. The probe collectors 704 can cause the probe plug-in (probe agents) 706 to collect data from the underlying probe agents in the slice flows or physical collectors and the probe collectors 704 according to the collector graph abstraction 712. Once collected, the input data can be fed as feature data into one or more AI/ML models to generate observation data based on the feature data. The observation data can be insight data, triggers, alarms, notifications, or the like. The observation data can be inputs to other processing pipelines and flows.

Figure 8:
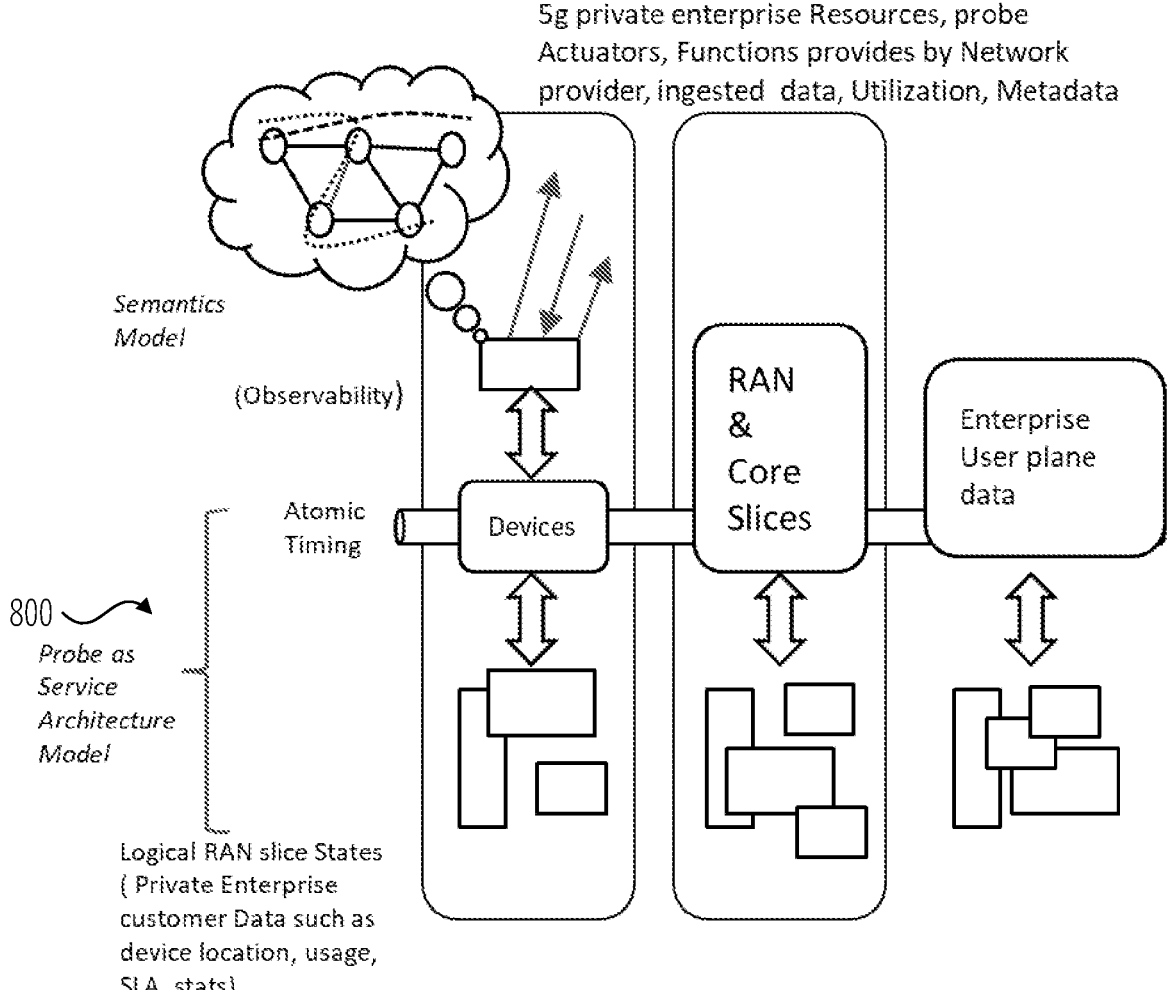
FIG. 8 is a block diagram of a probe-as-a-service architecture model according to at least one embodiment.

FIG. 8 is a block diagram of a probe-as-a-service architecture model 800 according to at least one embodiment. The probe-as-a-service architecture model 800 can determine logical RAN slice states from private enterprise customer data, such as device location, usage, service-level agreements (SLAs), statistics, or the like. The customer data can be collected according to atomic timing between devices, the RAN and core slices, and the enterprise user plane data. The probe-as-a-service architecture model 800 can generate observability data based on the logical RAN slice states for further functionality provided by northbound applications as described herein. The probe-as-a-service architecture model 800 can provide the ability to dynamically program probes by the enterprise customer as a service for their own dedicated physical and logical 5G resources and infrastructures. For example, an enterprise private 5G probe as a service can be defined for logical targets, such as private 5G RAN, core, transport resources, private customer-owned devices, enterprise WAN, satellite interconnects, cloud common components, customer plug-ins, or the like. The probe-as-a-service architecture model 800 can enable closed feedback control loops. An application example can include a customer tracking application for tracking the customer-owned devices of all types. The probe-as-a-service architecture model 800 can be used to collect data regarding throughput, delay, and/or flow and congestion statistics using one or more related probes. The probe-as-a-service architecture model 800 can also define security-related probes. These probes can trigger diagnostics through dedicated APIs, such as dedicated open APIs.

Figure 9:
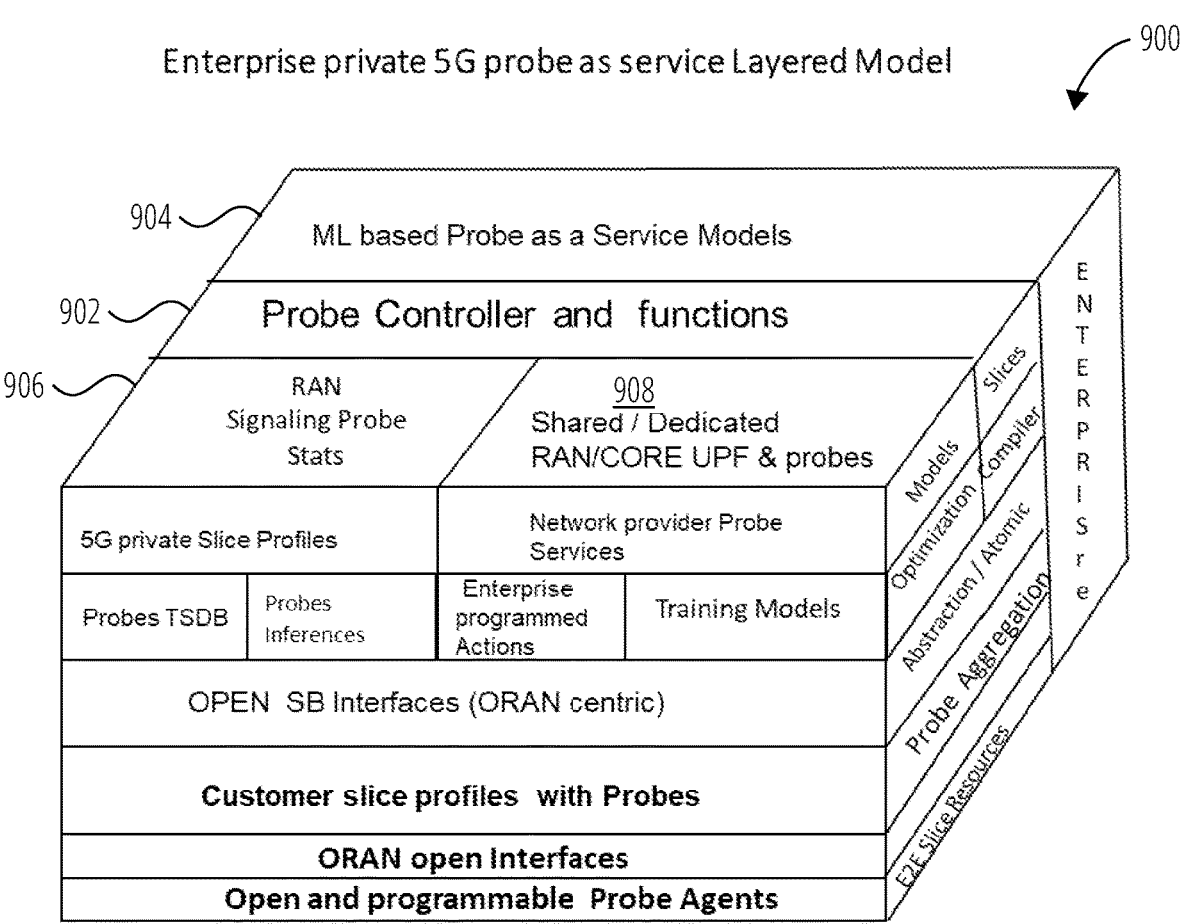
FIG. 9 illustrates a layered model of an enterprise private 5G probe-as-a-service according to at least one embodiment.

FIG. 9 illustrates a layered model 900 of an enterprise private 5G probe-as-a-service according to at least one embodiment. The layered model 900 includes probe controller and other functions 902 and ML-based probe-as-a-service models 904. The probe controller and other functions 902 can be implemented as part of the underlying slices. The ML-based probe-as-a-service models 904 can be implemented as part of the enterprise domain. The probe controller and other functions 902 can collect data from the underlying network resources, as described herein, aggregate and process the collected data to provide input data to the ML-based probe-as-a-service models 904. As part of collections, the probe controller, and other functions 902, can interact with RAN signaling probe statistics 906 and shared/dedicated RAN/core user plane function (UPF) and probes 908. The RAN signaling probe statistics 906 can be part of the 5G private slice profiles and the shared/dedicated RAN/core UPF and probes 908 can be part of the network provider's probe services. The 5G private slice profiles can be built on top of the probes TSDB and probe interfaces, which are built on top of the open SB interfaces (O-RAN-centric). Under the open SB interfaces can be the customer slice profiles with probes, which are on top of the O-RAN open interfaces. The O-RAN open interfaces can interact with the programmable probe agents below. The open and programmable probe agents can be implemented as slice resources (e.g., E2E slice resources). The customer slice profiles with probes can implement the probe aggregation of data. The different components of the layered model 900 can be implemented in other ways.

FIG. 10 is a flow diagram of a method 1000 of operating a probe-as-a-service associated with a customer of a cellular network according to at least one embodiment. The method 1000 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 1000 is performed by the probe-as-a-service platform 100 of FIG. 1. In one embodiment, the method 1000 is performed by the probe controller 102 of FIG. 1. In one embodiment, the method 1000 is performed by the probe-as-a-service stack 206 of FIG. 2. In one embodiment, the method 1000 is performed by the O-RAN centric slices 500 of FIG. 5. In one embodiment, the method 1000 is performed by the slice-level controller 600 of FIG. 6. In one embodiment, the method 1000 is performed by the probe-as-a-service architecture model 800 of FIG. 8. In one embodiment, the method 1000 is performed by the probe controller and other functions 902 of FIG. 9.

Referring to FIG. 10, the method 1000 begins with the processing logic receiving, from a customer, a request for a probe-as-a-service in the cellular network (block 1002). The request includes a probe template associated with the probeas-a-service. The probe template includes a set of programmable parameters. A first parameter of the set of programmable parameters specifies a set of one or more probe collectors. A second parameter of the set of programmable parameters specifies an ML model. A third parameter of the set of programmable parameters specifies a northbound application. At block 1004, the processing logic collects, using the set of probe collectors, input data from a set of probe agents programmed by the set of probe collectors, each probe agent located at least one of an infrastructure resource of the cellular network, a sensor associated with the cellular network, or a UE connected to the cellular network. At block 1006, the processing logic generates, using the ML model, observation data based on the input data. The observation data includes at least one of a KPI or a state of the at least one of the infrastructure resource, the sensor, or the UE. At block 1008, the processing logic provides the observation data to the northbound application.

In at least one embodiment, the probe template includes probe policies. The set of probe collectors can program each of the set of probe agents according to the probe policies.

In at least one embodiment, the set of probe collectors includes at least one of a device-level collector, a RAN-level collector, a core-level collector, a transport-level collector, a cloud-level collector, or an enterprise application collector.

In at least one embodiment, the infrastructure resource is at least one of a dedicated transport resource in a backhaul link or a fronthaul link, a dedicated RF resource instance, customer RAN data, a transport slice pipeline, secure signaling session data, a RU, a RAN resource, or another service in the cellular network.

In at least one embodiment, at block 1004, the processing logic collects the input data by collecting, using a first probe collector of the set of probe collectors, first data from a first probe agent of the set of probe agents, and collecting, using a second probe collector of the set of probe collectors, second data from a second probe agent of the set of probe agents. The processing logic can aggregate the first data and the second data to obtain the input data. In at least one embodiment, the first data is collected at a first rate, and the second data is collected at a second rate different than the first rate.

In at least one embodiment, at block 1004, the processing logic collects the input data by collecting, using the first probe collector, third data from a third probe agent of the set of probe agents. In at least one embodiment, collecting the second data includes aggregating the second data and the third data to obtain combined collected data. The processing logic can aggregate the first data and the combined collected data to obtain the input data.

In at least one embodiment, the northbound application is or includes at least one of a dashboard, a transfer function, an analytics application, or a second ML model.

In at least one embodiment, the probe template is received via a Northbound API, and the input data is received via a set of APIs, each API being associated with the respective probe agent. The input data can include at least one of counters, logs, events, metrics, traces, alarms, configuration data, flow data, state information, or error messages.

In at least one embodiment, the customer's request for custom probes can be compiled into a set of network analytics data probes that depicts aggregated intelligence to serve the custom probe definition requested by the customer. In at least one embodiment, the observation data can be associated with a logical radio resource abstraction for the northbound application of an enterprise using the cellular network. In at least one embodiment, the probe-as-a-service can be associated with an enterprise slice of the cellular network. The observation data can be associated with user data usage, events, metrics, counters, logs, traces, alarms, configuration data, flow data, state information, error messages, devices, or logical resources of the enterprise slice.

In at least one embodiment, the northbound application is an enterprise customer application for managing resource usage, security alerts, and controls. The observation data can be feedback data for the enterprise customer application. In at least one embodiment, the ML model can be trained to predict an alert. The observation data can include a notification in response to the alert being predicted. In at least one embodiment, the input data includes location information correlated to network-provided resources.

In at least one embodiment, the probe-as-a-service can be associated with a dedicated slice of the cellular network having dedicated resources. The slice can represent similar behavior for many other slices. The northbound application can use the observation data to optimize the dedicated slice and enforce policies associated with the dedicated resources. From this slice, behavior of similar slices can be extrapolated. In some cases, resources for a viable slice are sacrificed to give the customer insight for many similar operation slices. This slice can be considered as an enabler for active holistic testing.

The embodiments described herein can be implemented in a telecommunication network, such as a cellular network. The cellular network can be a 5G or 6G wireless network. Additional details of these cellular networks and where the probe controller can reside are described below with respect to FIGS. 11A-13D.

Figure 11A:
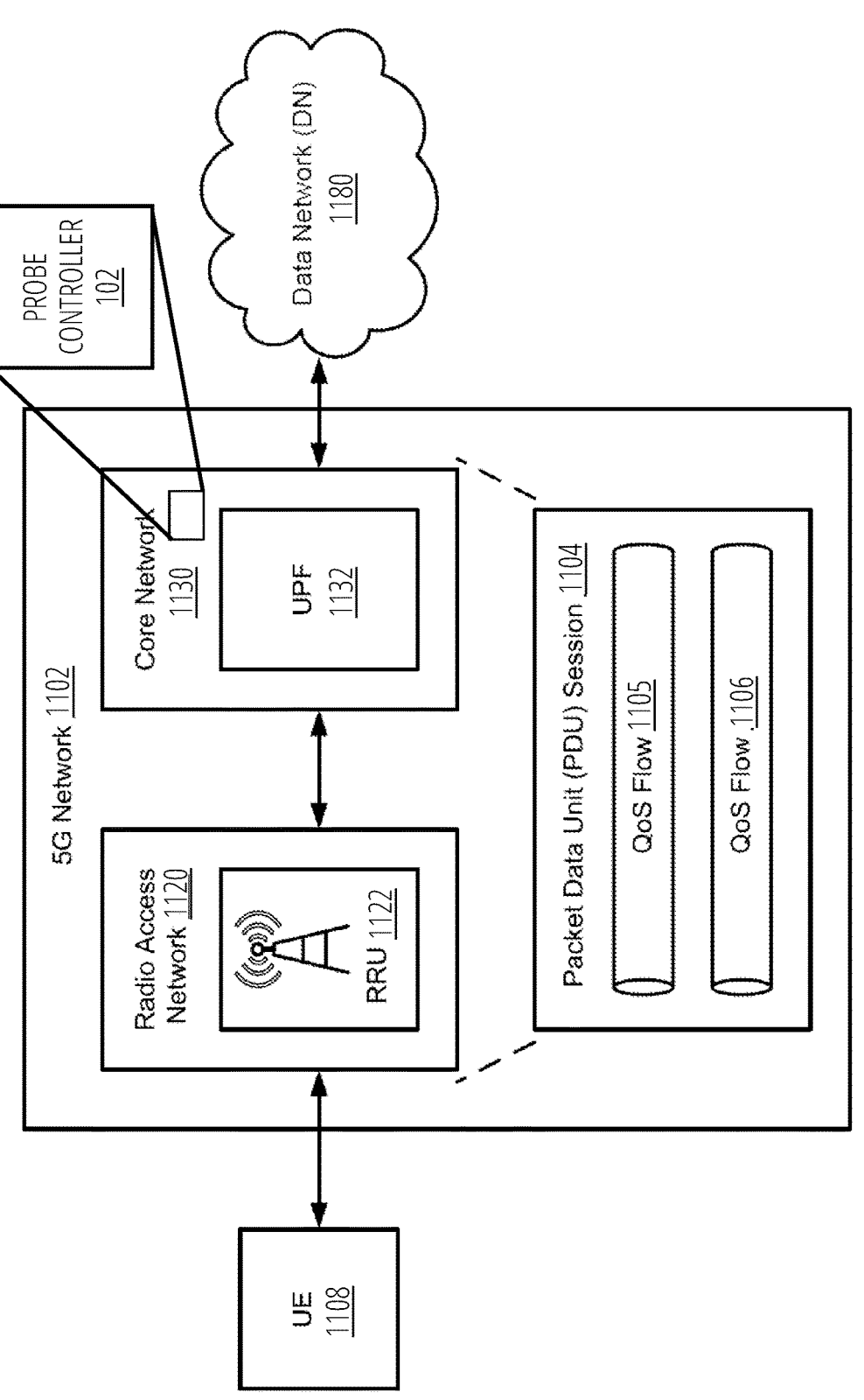
FIG. 11A depicts a 5G network including a radio access network (RAN) and a core network according to at least one embodiment.

FIG. 11A depicts a 5G network 1102 including a radio access network (RAN) 1120 and a core network 1130 according to at least one embodiment. In at least one embodiment, the probe controller 102 can be implemented in the core network 1130 to provide a probe-as-a-service as described herein. The RAN 1120 can include a new-generation radio access network (NG-RAN) that uses the 5G new radio interface (NR). The 5G network 1102 connects user equipment (UE) 1108 to the data network (DN) 1180 using the RAN 1120 and the core network 1130. The data network 1180 can include the Internet, a local area network (LAN), a wide area network (WAN), a private data network, a wireless network, a wired network, or a combination of networks. The UE 1108 can include an electronic device with wireless connectivity or cellular communication capability, such as a mobile phone or handheld computing device. In at least one example, the UE 1108 can include a 5G smartphone or a 5G cellular device that connects to the RAN 1120 via a wireless connection. The UE 1108 can include one of a number of UEs not depicted that are in communication with the RAN 1120. The UEs may include mobile and non-mobile computing devices. The UEs may include laptop computers, desktop computers, an Internet-of-Things (IoT) devices, and/or any other electronic computing device that includes a wireless communications interface to access the RAN 1120.

The RAN 1120 includes a remote radio unit (RRU) 1122 for wirelessly communicating with UE 1108. The remote radio unit (RRU) 1122 can include a Radio Unit (RU) and may include one or more radio transceivers for wirelessly communicating with UE 1108. The remote radio unit (RRU) 1122 may include circuitry for converting signals sent to and from an antenna of a Base Station into digital signals for transmission over packet networks. The RAN 1120 may correspond with a 5G radio Base Station that connects user equipment to the core network 1130. The 5G radio Base Station may be referred to as a generation Node B, a "gNodeB," or a "gNB." A Base Station may refer to a network element that is responsible for the transmission and reception of radio signals in one or more cells to or from user equipment, such as UE 1108.

The core network 1130 may utilize a cloud-native service-based architecture (SBA) in which different core network functions (e.g., authentication, security, session management, and core access and mobility functions) are virtualized and implemented as loosely coupled independent services that communicate with each other, for example, using HTTP protocols and APIs. In some cases, control plane (CP) functions 1140 may interact with each other using the service-based architecture. In at least one embodiment, the probe controller 102 can be implemented in the CP functions 1140. In at least one embodiment, a microservices-based architecture in which software is composed of small independent services that communicate over well-defined APIs may be used for implementing some of the core network functions. For example, control plane (CP) network functions for performing session management may be implemented as containerized applications or microservices. Although a microservice-based architecture does not necessarily require a container-based implementation, a container-based implementation may offer improved scalability and availability over other approaches. Network functions that have been implemented using microservices may store their state information using the unstructured data storage function (UDSF) that supports data storage for stateless network functions across the service-based architecture (SBA).

The primary core network functions can include the access and mobility management function (AMF), the session management function (SMF), and the user plane function (UPF). In at least one embodiment, the probe controller 102 can be implemented in the AMF 1134. The UPF (e.g., UPF 1132) may perform packet processing including routing and forwarding, quality of service (QOS) handling, and packet data unit (PDU) session management. The UPF may serve as an ingress and egress point for user plane traffic and provide anchored mobility support for user equipment. For example, the UPF 1132 may provide an anchor point between the UE 1108 and the data network 1180 as the UE 1108 moves between coverage areas. The AMF may act as a single-entry point for a UE connection and perform mobility management, registration management, and connection management between a data network and UE. The SMF may perform session management, user plane selection, and IP address allocation.

Other core network functions may include a network repository function (NRF) for maintaining a list of available network functions and providing network function service registration and discovery, a policy control function (PCF) for enforcing policy rules for control plane functions, an authentication server function (AUSF) for authenticating user equipment and handling authentication-related functionality, a network slice selection function (NSSF) for selecting network slice instances, and an application function (AF) for providing application services. Application-level session information may be exchanged between the AF and PCF (e.g., bandwidth requirements for QoS). In some cases, when user equipment requests access to resources, such as establishing a PDU session or a QoS flow, the PCF may dynamically decide if the user equipment should grant the requested access based on a location of the user equipment.

A network slice can include an independent end-to-end logical communications network that includes a set of logically separated virtual network functions. Network slicing may allow different logical networks or network slices to be implemented using the same compute and storage infrastructure. Therefore, network slicing may allow heterogeneous services to coexist within the same network architecture via allocation of network computing, storage, and communication resources among active services. In some cases, the network slices may be dynamically created and adjusted over time based on network requirements. For example, some networks may require ultra-low-latency or ultra-reliable services. To meet ultra-low-latency requirements, components of the RAN 1120, such as a Distributed Unit (DU) and a centralized unit (CU), may need to be deployed at a cell site or in a local data center (LDC) that is in close proximity to a cell site such that the latency requirements are satisfied (e.g., such that the one-way latency from the cell site to the DU component or CU component is less than 1.2 ms).

In some embodiments, the Distributed Unit (DU) and the centralized unit (CU) of the RAN 1120 may be co-located with the remote radio unit (RRU) 1202. In other embodiments, the Distributed Unit (DU) and the remote radio unit (RRU) 1202 may be co-located at a cell site and the centralized unit (CU) may be located within a local data center (LDC).

The 5G network 1102 may provide one or more network slices, where each network slice may include a set of network functions that are selected to provide specific telecommunications services. For example, each network slice can include a configuration of network functions, network applications, and underlying cloud-based compute and storage infrastructure. In some cases, a network slice may correspond with a logical instantiation of a 5G network, such as an instantiation of the 5G network 1102. In some cases, the 5G network 1102 may support customized policy configuration and enforcement between network slices per service level agreements (SLAs) within the radio access network (RAN) 1120. User equipment, such as UE 1108, may connect to multiple network slices at the same time (e.g., eight different network slices). In one embodiment, a PDU session, such as PDU session 1104, may belong to only one network slice instance.

In some cases, the 5G network 1102 may dynamically generate network slices to provide telecommunications services for various use cases, such as the enhanced Mobile Broadband (eMBB), Ultra-Reliable and Low-Latency Communication (URLCC), and massive Machine Type Communication (mMTC) use cases.

A cloud-based compute and storage infrastructure can include a networked computing environment that provides a cloud computing environment. Cloud computing may refer to Internet-based computing, where shared resources, software, and/or information may be provided to one or more computing devices on-demand via the Internet (or other network). The term "cloud" may be used as a metaphor for the Internet, based on the cloud drawings used in computer networking diagrams to depict the Internet as an abstraction of the underlying infrastructure it represents.

The core network 1130 may include a set of network elements that are configured to offer various data and telecommunications services to subscribers or end users of user equipment, such as UE 1108. Examples of network elements include network computers, network processors, networking hardware, networking equipment, routers, switches, hubs, bridges, radio network controllers, gateways, servers, virtualized network functions, and network functions virtualization infrastructure. A network element can include a real or virtualized component that provides wired or wireless communication network services.

Virtualization allows virtual hardware to be created and decoupled from the underlying physical hardware. One example of a virtualized component is a virtual router (or a vRouter). Another example of a virtualized component is a virtual machine. A virtual machine can include a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications used by the virtual machine may be stored using the virtual disk. The virtual machine may be stored as a set of files including a virtual disk file for storing the contents of a virtual disk and a virtual machine configuration file for storing configuration settings for the virtual machine. The configuration settings may include the number of virtual processors (e.g., four virtual CPUs), the size of a virtual memory, and the size of a virtual disk (e.g., a 64 GB virtual disk) for the virtual machine. Another example of a virtualized component is a software container or an application container that encapsulates an application's environment.

In some embodiments, applications and services may be run using virtual machines instead of containers in order to improve security. A common virtual machine may also be used to run applications and/or containers for a number of closely related network services.

The 5G network 1102 may implement various network functions, such as the core network functions and radio access network functions, using a cloud-based compute and storage infrastructure. A network function may be implemented as a software instance running on hardware or as a virtualized network function. Virtual network functions (VNFs) can include implementations of network functions as software processes or applications. In at least one example, a virtual network function (VNF) may be implemented as a software process or application that is run using virtual machines (VMs) or application containers within the cloud-based compute and storage infrastructure. Application containers (or containers) allow applications to be bundled with their own libraries and configuration files, and then executed in isolation on a single operating system (OS) kernel. Application containerization may refer to an OS-level virtualization method that allows isolated applications to be run on a single host and access the same OS kernel. Containers may run on bare-metal systems, cloud instances, and virtual machines. Network functions virtualization may be used to virtualize network functions, for example, via virtual machines, containers, and/or virtual hardware that runs processor readable code or executable instructions stored in one or more computer-readable storage mediums (e.g., one or more data storage devices).

As depicted in FIG. 11A, the core network 1130 includes a user plane function (UPF) 1132 for transporting IP data traffic (e.g., user plane traffic) between the UE 1108 and the data network 1180 and for handling packet data unit (PDU) sessions with the data network 1180. The UPF 1132 can include an anchor point between the UE 1108 and the data network 1180. The UPF 1132 may be implemented as a software process or application running within a virtualized infrastructure or a cloud-based compute and storage infrastructure. The 5G network 1102 may connect the UE 1108 to the data network 1180 using a PDU session 1104, which can include part of an overlay network.

The PDU session 1104 may utilize one or more quality of service (QOS) flows, such as QoS flows 1105 and 1106, to exchange traffic (e.g., data and voice traffic) between the UE 1108 and the data network 1180. The one or more QoS flows can include the finest granularity of QoS differentiation within the PDU session 1104. The PDU session 1104 may belong to a network slice instance through the 5G network 1102. To establish user plane connectivity from the UE 1108 to the data network 1180, an AMF that supports the network slice instance may be selected and a PDU session via the network slice instance may be established. In some cases, the PDU session 1104 may be of type IPv4 or IPv6 for transporting IP packets. The RAN 1120 may be configured to establish and release parts of the PDU session 1104 that cross the radio interface.

The RAN 1120 may include a set of one or more remote radio units (RRUs) that includes radio transceivers (or combinations of radio transmitters and receivers) for wirelessly communicating with UEs. The set of RRUs may correspond with a network of cells (or coverage areas) that provide continuous or nearly continuous overlapping service to UEs, such as UE 1108, over a geographic area. Some cells may correspond with stationary coverage areas and other cells may correspond with coverage areas that change over time (e.g., due to movement of a mobile RRU).

In some cases, the UE 1108 may be capable of transmitting signals to and receiving signals from one or more RRUs within the network of cells over time. One or more cells may correspond with a cell site. The cells within the network of cells may be configured to facilitate communication between UE 1108 and other UEs and/or between UE 1108 and a data network, such as data network 1180. The cells may include macrocells (e.g., capable of reaching 18 miles) and small cells, such as microcells (e.g., capable of reaching 1.2 miles), picocells (e.g., capable of reaching 0.12 miles), and femtocells (e.g., capable of reaching 32 feet). Small cells may communicate through macrocells. Although the range of small cells may be limited, small cells may enable mmWave frequencies with high-speed connectivity to UEs within a short distance of the small cells. Macrocells may transit and receive radio signals using multiple-input multiple-output (MIMO) antennas that may be connected to a cell tower, an antenna mast, or a raised structure.

Referring to FIG. 11A, the UPF 1132 may be responsible for routing and forwarding user plane packets between the RAN 1120 and the data network 1180. Uplink packets arriving from the RAN 1120 may use a general packet radio service (GPRS) tunneling protocol (or GTP) to reach the UPF 1132. The GPRS tunneling protocol for the user plane may support multiplexing of traffic from different PDU sessions by tunneling user data over the interface between the RAN 1120 and the UPF 1132.

The UPF 1132 may remove the packet headers belonging to the GTP tunnel before forwarding the user plane packets towards the data network 1180. As the UPF 1132 may provide connectivity towards other data networks in addition to the data network 1180, the UPF 1132 must ensure that the user plane packets are forwarded towards the correct data network. Each GTP tunnel may belong to a specific PDU session, such as PDU session 1104. Each PDU session may be set up towards a specific data network name (DNN) that uniquely identifies the data network to which the user plane packets should be forwarded. The UPF 1132 may keep a record of the mapping between the GTP tunnel, the PDU session, and the DNN for the data network to which the user plane packets are directed.

Downlink packets arriving from the data network 1180 are mapped onto a specific QoS flow belonging to a specific PDU session before forwarded towards the appropriate RAN 1120. A QoS flow may correspond with a stream of data packets that have equal quality of service (QOS). A PDU session may have multiple QoS flows, such as the QoS flows 1105 and 1106 that belong to PDU session 1104. The UPF 1132 may use a set of service data flow (SDF) templates to map each downlink packet onto a specific QoS flow. The UPF 1132 may receive the set of SDF templates from a session management function (SMF), such as the SMF 1133 depicted in FIG. 11B, during setup of the PDU session 1104. The SMF may generate the set of SDF templates using information provided from a policy control function (PCF), such as the PCF 1135 depicted in FIG. 11C. The UPF 1132 may track various statistics regarding the volume of data transferred by each PDU session, such as PDU session 1104, and provide the information to an SMF.

Figure 11B:
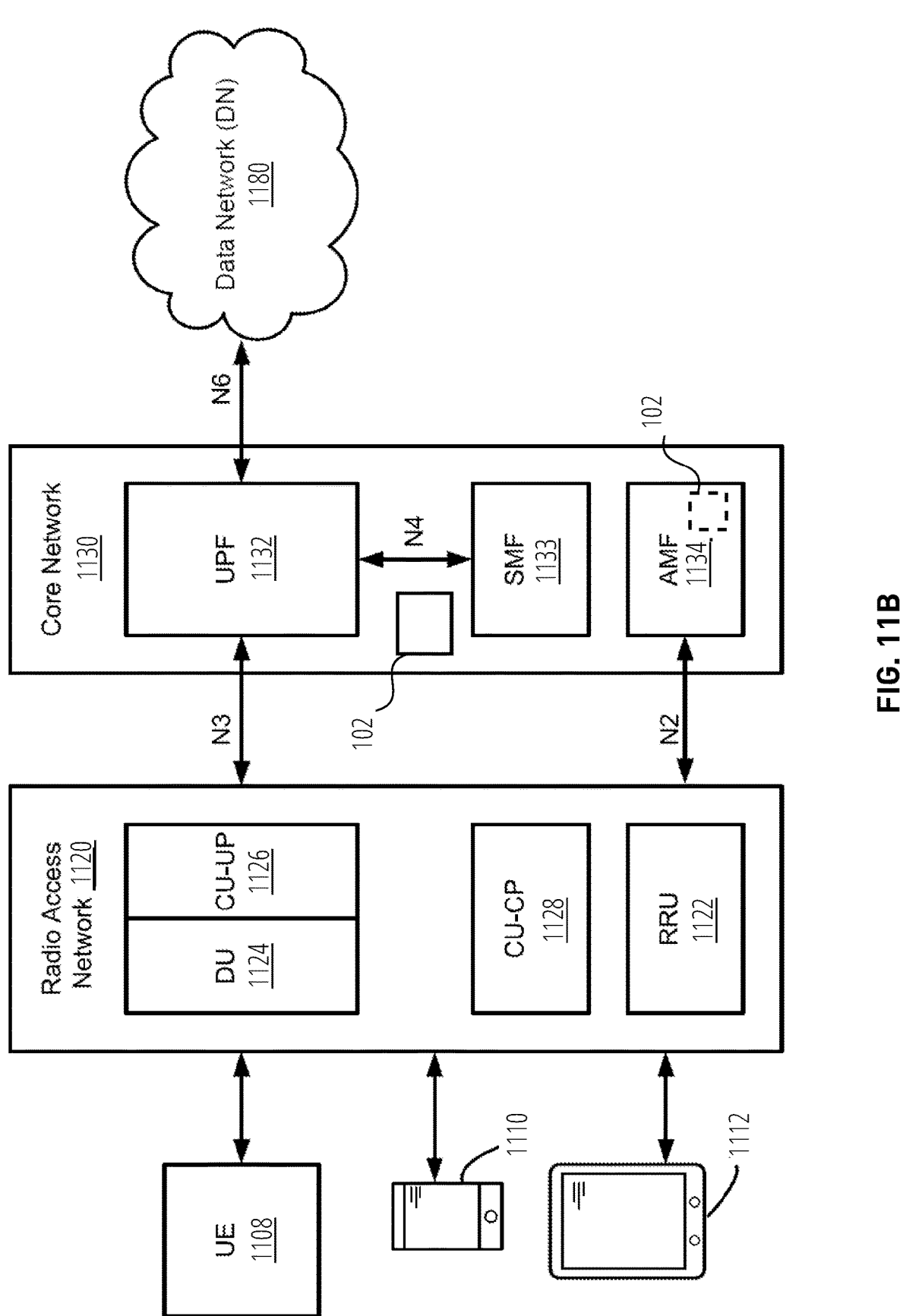
FIG. 11B-FIG. 11C depict a radio access network and a core network for providing a communications channel (or channel) between user equipment and a data network according to various embodiments.

FIG. 11B depicts a RAN 1120 and a core network 1130 for providing a communications channel (or channel) between user equipment and data network 1180 according to at least one embodiment. In at least one embodiment, the probe controller 102 can be implemented in the core network 1130 to provide a probe-as-a-service as described herein. The communications channel can include a pathway through which data is communicated between the UE 1108 and the data network 1180. The user equipment in communication with the RAN 1120 includes UE 1108, mobile phone 1110, and mobile computing device 1112. The user equipment may include a set of electronic devices, including mobile computing device and non-mobile computing device.

The core network 1130 includes network functions such as an access and mobility management function (AMF) 1134, a session management function (SMF) 1133, and a user plane function (UPF) 1132. The AMF may interface with user equipment and act as a single-entry point for a UE connection. The AMF may interface with the SMF to track user sessions. The AMF may interface with a network slice selection function (NSSF) not depicted to select network slice instances for user equipment, such as UE 1108. When user equipment is leaving a first coverage area and entering a second coverage area, the AMF may be responsible for coordinating the handoff between the coverage areas whether the coverage areas are associated with the same radio access network or different radio access networks.

The UPF 1132 may transfer downlink data received from the data network 1180 to user equipment, such as UE 1108, via the RAN 1120 and/or transfer uplink data received from user equipment to the data network 1180 via the RAN 1120. An uplink can include a radio link though which user equipment transmits data and/or control signals to the RAN 1120. A downlink can include a radio link through which the RAN 1120 transmits data and/or control signals to the user equipment.

The RAN 1120 may be logically divided into a remote radio unit (RRU) 1202, a Distributed Unit (DU) 1204, and a centralized unit (CU) that is partitioned into a CU user plane portion (CU-UP) 1216 and a CU control plane portion (CU-CP) 1128. The CU-UP 1216 may correspond with the centralized unit for the user plane and the CU-CP 1128 may correspond with the centralized unit for the control plane. The CU-CP 1128 may perform functions related to a control plane, such as connection setup, mobility, and security. The CU-UP 1216 may perform functions related to a user plane, such as user data transmission and reception functions. Additional details of radio access networks are described in reference to FIG. 12A. Decoupling control signaling in the control plane from user plane traffic in the user plane may allow the UPF 1132 to be positioned in close proximity to the edge of a network compared with the AMF 1134. In at least one embodiment, the probe controller 102 can be implemented in the AMF 1134. As a closer geographic or topographic proximity may reduce the electrical distance, this means that the electrical distance from the UPF 1132 to the UE 1108 may be less than the electrical distance of the AMF 1134 to the UE 1108. The RAN 1120 may be connected to the AMF 1134, which may allocate temporary unique identifiers, determine tracking areas, and select appropriate policy control functions (PCFs) for user equipment, via an N2 interface. The N3 Interface may be used for transferring user data (e.g., user plane traffic) from the RAN 1120 to the user plane function UPF 1132 and may be used for providing low-latency services using edge computing resources. The electrical distance from the UPF 1132 (e.g., located at the edge of a network) to user equipment, such as UE 1108, may impact the latency and performance services provided to the user equipment. The UE 1108 may be connected to the SMF 1133 via an N1 interface not depicted, which may transfer UE information directly to the AMF 1134. The UPF 1132 may be connected to the data network 1180 via an N6 interface. The N6 interface may be used for providing connectivity between the UPF 1132 and other external or internal data networks (e.g., to the Internet). The RAN 1120 may be connected to the SMF 1133, which may manage UE context and network handovers between Base Stations, via the N2 interface. The N2 interface may be used for transferring control plane signaling between the RAN 1120 and the AMF 1134.

The RRU 1202*a* (1202*b*, 1202*c*) may perform physical layer functions, such as employing orthogonal frequency-division multiplexing (OFDM) for downlink data transmission. In some cases, the DU 1204 may be located at a cell site (or a cellular Base Station) and may provide real-time support for lower layers of the protocol stack, such as the radio link control (RLC) layer and the medium access control (MAC) layer. The CU may provide support for higher layers of the protocol stack, such as the service data adaptation protocol (SDAP) layer, the packet data convergence control (PDCP) layer, and the radio resource control (RRC) layer. The SDAP layer can include the highest L2 sublayer in the 5G NR protocol stack. In some embodiments, a radio access network may correspond with a single CU that connects to multiple DUs (e.g., 10 DUs), and each DU may connect to multiple RRUs (e.g., 18 RRUs). In this case, a single CU may manage 10 different cell sites (or cellular Base Stations) and 180 different RRUs.

In some embodiments, the RAN 1120 or portions of the RAN 1120 may be implemented using multi-access edge computing (MEC) that allows computing and storage resources to be moved closer to user equipment. Allowing data to be processed and stored at the edge of a network that is located close to the user equipment may be necessary to satisfy low-latency application requirements. In at least one example, the DU 1204 and CU-UP 1216 may be executed as virtual instances within a data center environment that provides single-digit millisecond latencies (e.g., less than 2 ms) from the virtual instances to the UE 1108.

Figure 11C:
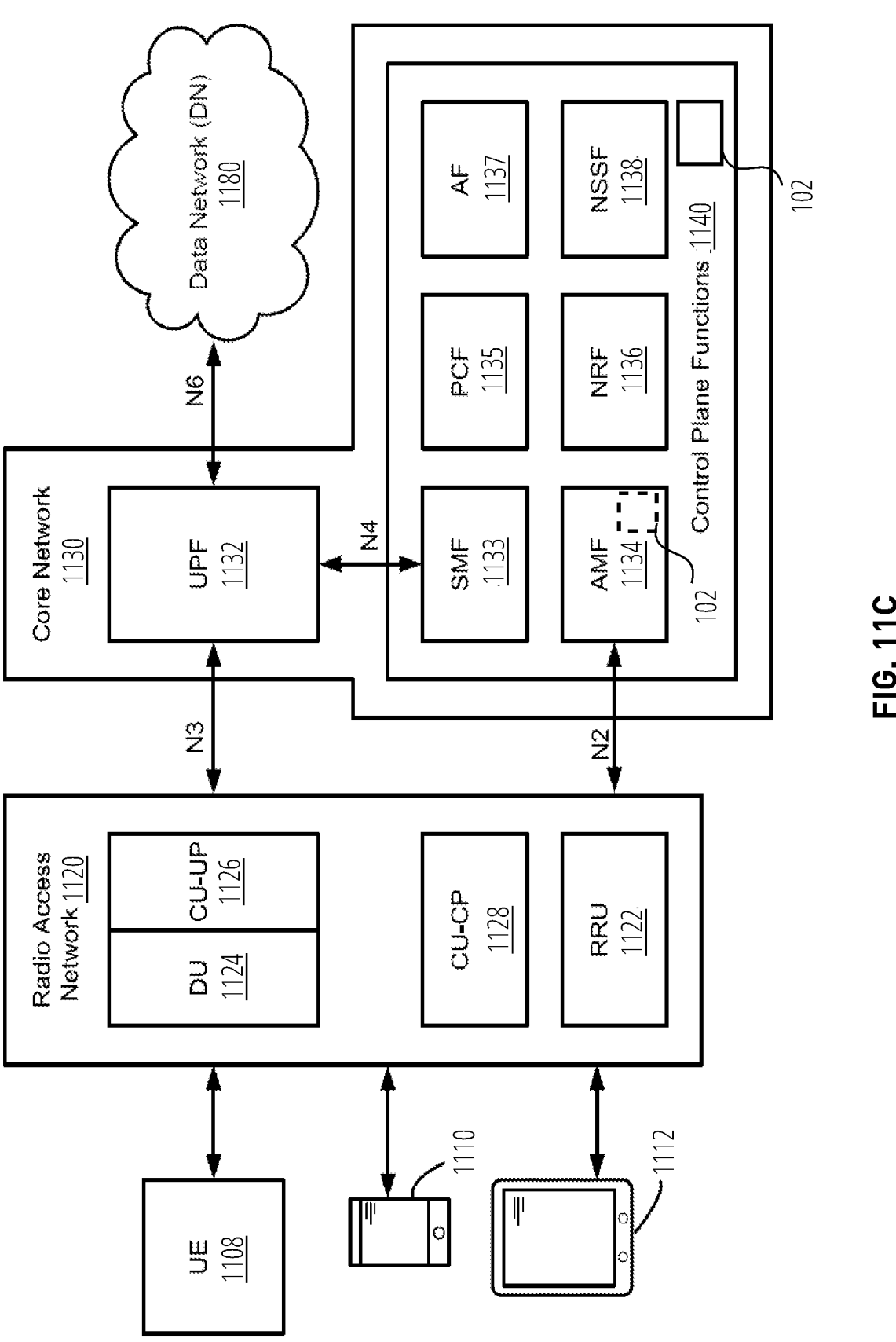

FIG. 11C depicts a RAN 1120 and a core network 1130 for providing a communications channel (or channel) between user equipment and data network 1180 according to at least one embodiment. The core network 1130 includes UPF 1132 for handling user data in the core network 1130. Data is transported between the RAN 1120 and the core network 1130 via the N3 Interface. The data may be tunneled across the N3 Interface (e.g., IP routing may be done on the tunnel header IP address instead of using end user IP addresses). This may allow for maintaining a stable IP anchor point even though UE 1108 may be moving around a network of cells or moving from one coverage area into another coverage area. The UPF 1132 may connect to external data networks, such as the data network 1180 via the N6 interface. The data may not be tunneled across the N6 interface as IP packets may be routed based on end user IP addresses. The UPF 1132 may connect to the SMF 1133 via the N4 interface.

As depicted, the core network 1130 includes a group of control plane functions 1140 including SMF 1133, AMF 1134, PCF 1135, NRF 1136, AF 1137, and NSSF 1138. In at least one embodiment, the probe controller 102 can be implemented in the control plane functions 1140 to provide a probe-as-a-service as described herein. The SMF 1133 may configure or control the UPF 1132 via the N4 interface. For example, the SMF 1133 may control packet forwarding rules used by the UPF 1132 and adjust QoS parameters for QoS enforcement of data flows (e.g., limiting available data rates). In some cases, multiple SMF/UPF pairs may be used to simultaneously manage user plane traffic for a particular user device, such as UE 1108. For example, a set of SMFs may be associated with UE 1108, where each SMF of the set of SMFs corresponds with a network slice. The SMF 1133 may control the UPF 1132 on a per end user data session basis, in which the SMF 1133 may create, update, and remove session information in the UPF 1132.

In some cases, the SMF 1133 may select an appropriate UPF for a user plane path by querying the NRF 1136 to identify a list of available UPFs and their corresponding capabilities and locations. The SMF 1133 may select the UPF 1132 based on a physical location of the UE 1108 and a physical location of the UPF 1132 (e.g., corresponding with a physical location of a data center in which the UPF 1132 is running). The SMF 1133 may also select the UPF 1132 based on a particular network slice supported by the UPF 1132 or based on a particular data network that is connected to the UPF 1132. The ability to query the NRF 1136 for UPF information eliminates the need for the SMF 1133 to store and update the UPF information for every available UPF within the core network 1130.

In some embodiments, the SMF 1133 may query the NRF 1136 to identify a set of available UPFs for a packet data unit (PDU) session and acquire UPF information from a variety of sources, such as the AMF 1134 or the UE 1108. The UPF information may include a location of the UPF 1132, a location of the UE 1108, the UPF's dynamic load, the UPF's static capacity among UPFs supporting the same data network, and the capability of the UPF 1132.

The RAN 1120 may provide separation of the centralized unit for the control plane (CU-CP) 1214 and the centralized unit for the user plane (CU-UP) 1216 functionalities while supporting network slicing. The CU-CP 1214 may obtain resource utilization and latency information from the DU 1204 and/or the CU-UP 1216, and select a CU-UP to pair with the DU 1204 based on the resource utilization and latency information in order to configure a network slice. Network slice configuration information associated with the network slice may be provided to the UE 1108 for purposes of initiating communication with the UPF 1132 using the network slice.

Figure 11D:
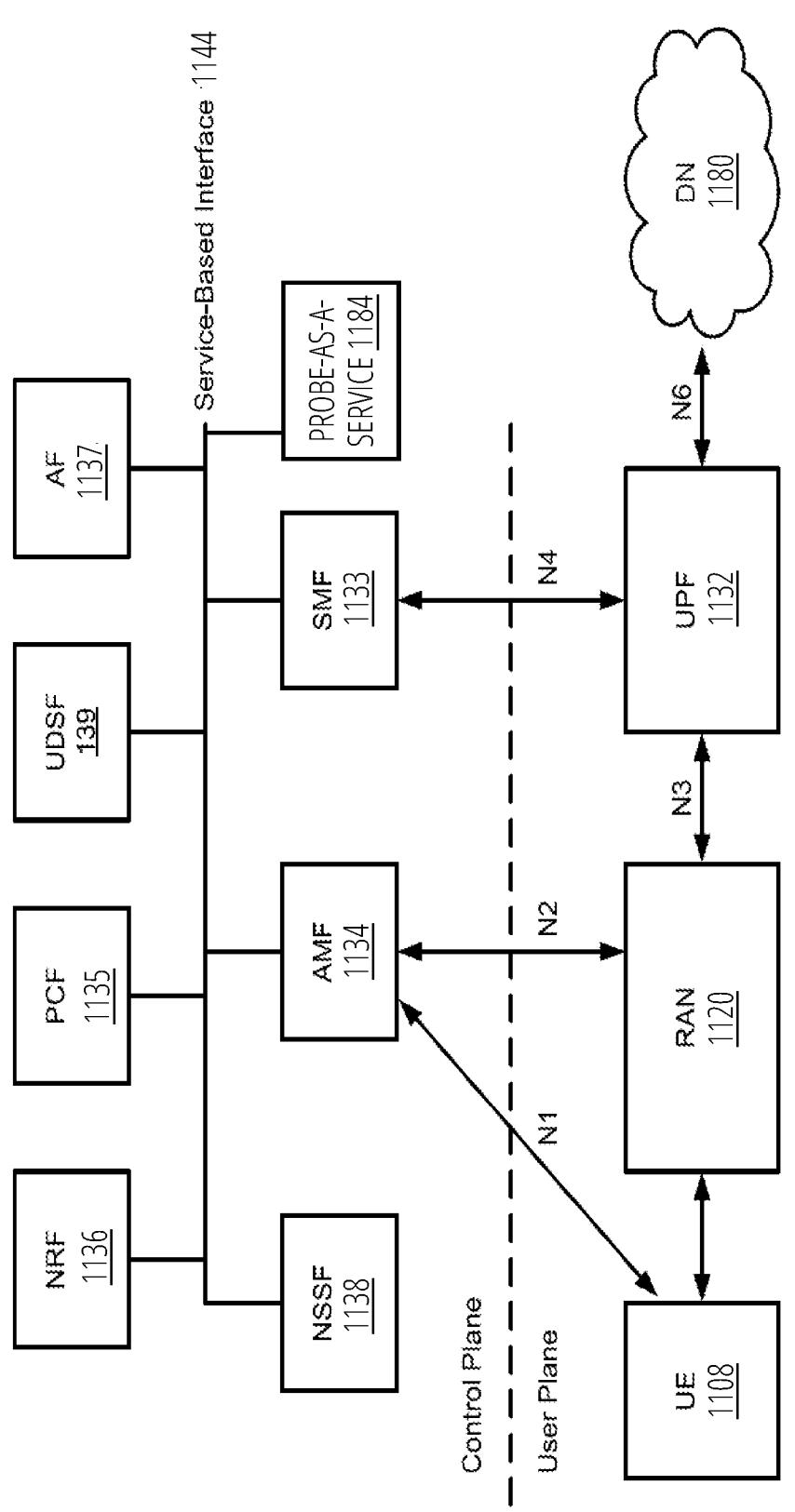
FIG. 11D depicts network functions interacting between user and control planes according to at least one embodiment.

FIG. 11D depicts network functions interacting between user and control planes according to at least one embodiment. The logical connections between the network functions depicted in FIG. 11D should not be interpreted as direct physical connections. The RAN 1120 is connected to the user plane function UPF 1132 via interface N3. The UPF 1132 is connected to the data network 1180 via the N6 interface. In some cases, the data network 1180 may represent an edge computing network or resources, such as a mobile edge computing (MEC) network. UE 1108 connects to the AMF 1134, which is responsible for authentication and authorization of access requests, as well as mobility management functions via the N1 interface.

In a service-based view, the AMF 1134 may communicate with other network functions through a service-based interface 1144 using application programming interfaces (APIs). The SMF 1133 can include a network function that is responsible for the allocation and management of IP addresses that are assigned to the UE 1108, as well as the selection of the UPF 1132 for traffic associated with a particular PDU session for the UE 1108. The SMF 1133 may also communicate with other network functions through the service-based interface 1144 using application programming interfaces (APIs). Each of the network functions NRF 1136, PCF 1135, UDSF 139, AF 1137, NSSF 1138, AMF 1134, and SMF 1133 may communicate with each other via the service-based interface 1144 using application programming interfaces (APIs). The unstructured data storage function (UDSF) 139 may provide service interfaces to store, update, read, and delete network function data. Using the UDSF 139, network functions such as the PCF 1135, SMF 1133, and AMF 1134 may remain stateless or primarily stateless. In at least one embodiment, a probe-as-a-service 1184 can communication with other network functions through the service-based interface 1144. The probe-as-a-service 1184 can be provided by the probe controller 102 as described herein.

Figure 11E:
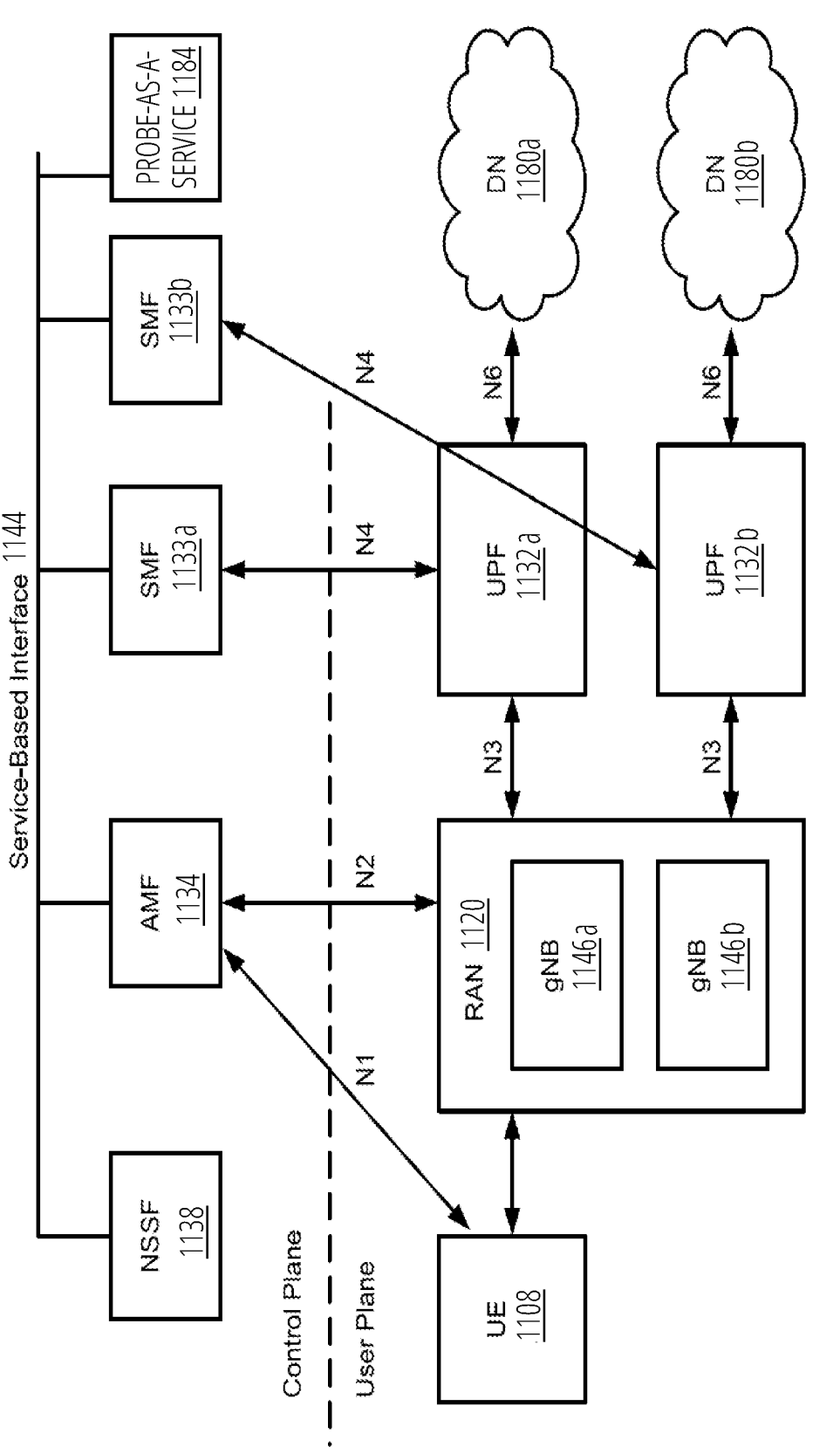
FIG. 11E depicts network functions interacting between user and control planes according to at least one embodiment.

FIG. 11E depicts network functions interacting between user and control planes according to at least one embodiment. As depicted, UPFs 1132a-1132b (also referred to as UPFs 1132) are in communication with data networks (DNS) 1180a-1180b (also referred to as DNs 1180). In some cases, a set of UPFs 1132 may be connected in series between the RAN 1120 and a set of DNs 1180. The RAN 1120 may include gNBs 1146a-1146b (also referred to as gNBs 1146). Each gNB 1146 can include at least a DU 1204, a CU-UP 1216, and a CU-CP 1214.

Multiple PDU sessions to different data networks may be accommodated through the use of multiple UPFs in parallel. For the sake of clarity, some of the network functions depicted in FIG. 11D have been omitted, however it should be understood that the omitted network functions may interact with the network functions depicted in FIG. 11E. Each UPF 1132a-1132b may be associated with a PDU session, and may connect to a corresponding SMF 1133a-1133b over an N4 interface to receive session control information. If the UE 1108 has multiple PDU sessions active, then each PDU session may be supported by a different UPF 1132, each of which may be connected to an SMF 1133 over an N4 interface. It should also be understood that any of the network functions may be virtualized within a network, and that the network itself may be provided as a network slice.

Figure 11F:
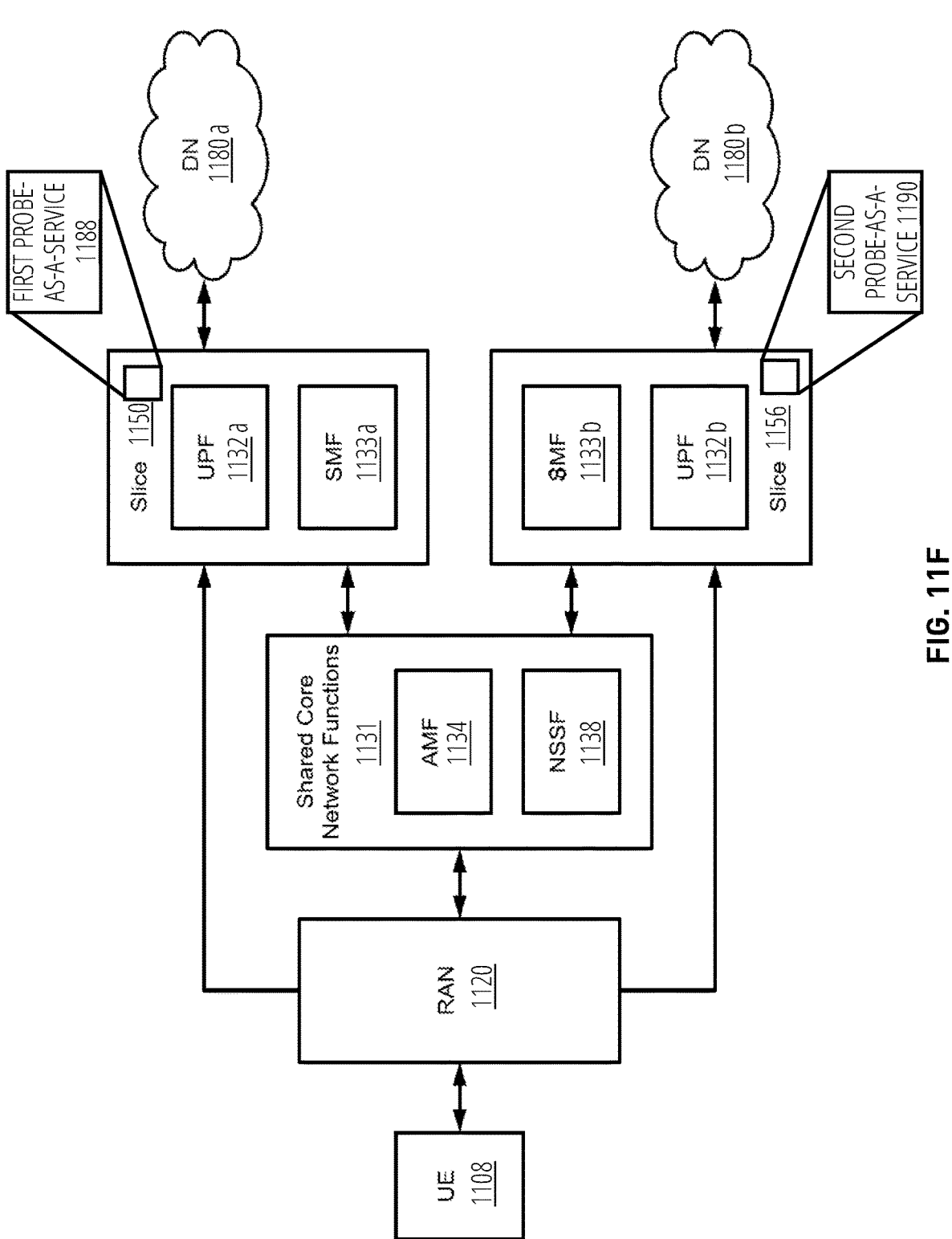
FIG. 11F depicts network slices sharing a set of shared core network functions according to at least one embodiment.

FIG. 11F depicts network slices 1150 and 1156 (also referred to as network slices) sharing a set of shared core network functions 1131 according to at least one embodiment. The set of shared core network functions 1131 includes AMF 1134 and NSSF 1138. The radio access network (RAN) 1120 may support differentiated handling of traffic between isolated network slices 1150 and 1156 for the UE 1108. The network slice selection function (NSSF) 1138 within the shared core network functions 1131 may support the selection of network slice instances to serve the UE 1108. In some cases, network slice selection may be determined by the network (e.g., using either NSSF 1138 or AMF 1134) based on network slice policy. The UE 1108 may simultaneously connect to data networks 1180*a* and 1180*b* via the network slices 1150 and 1156 to support different latency requirements. In at least one embodiment, a first probe-as-a-service 1188 can operate in a first slice 1150, and a second probe-as-a-service 1190 can operate in a second slice 1156.

Figure 11G:
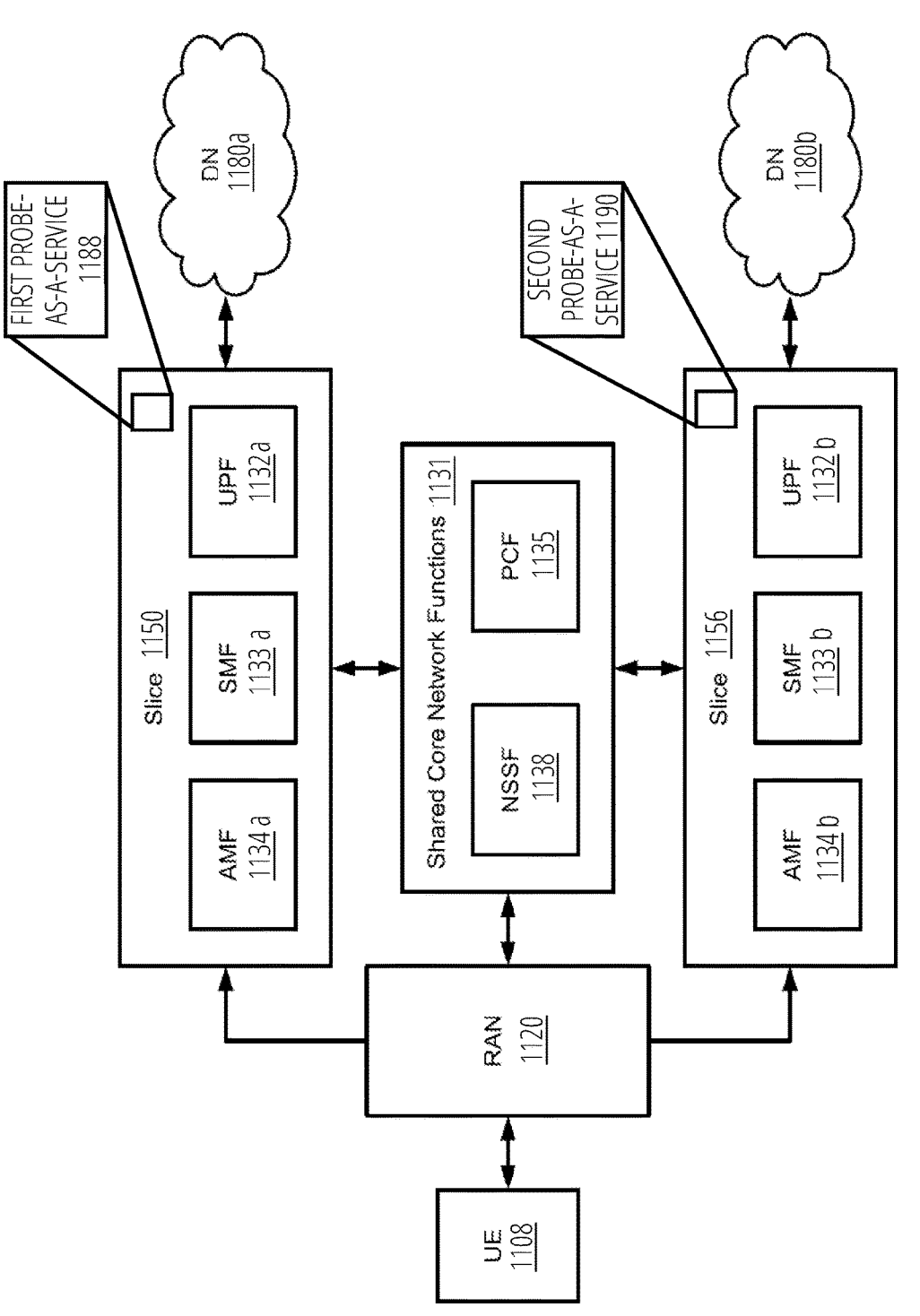
FIG. 11G-FIG. 11H depict network slices after updates have been made based on changes to the network slice policy according to various embodiments.

FIG. 11G depicts network slices 1150 and 1156 after updates have been made based on changes to the network slice policy according to at least one embodiment. As depicted, the network slices 1150 and 1156 share a set of shared core network functions 1131 that includes PCF 1135 and NSSF 1138. Each network slice includes an AMF 1134, an SMF 1133, and a UPF 1132.

Figure 11H:
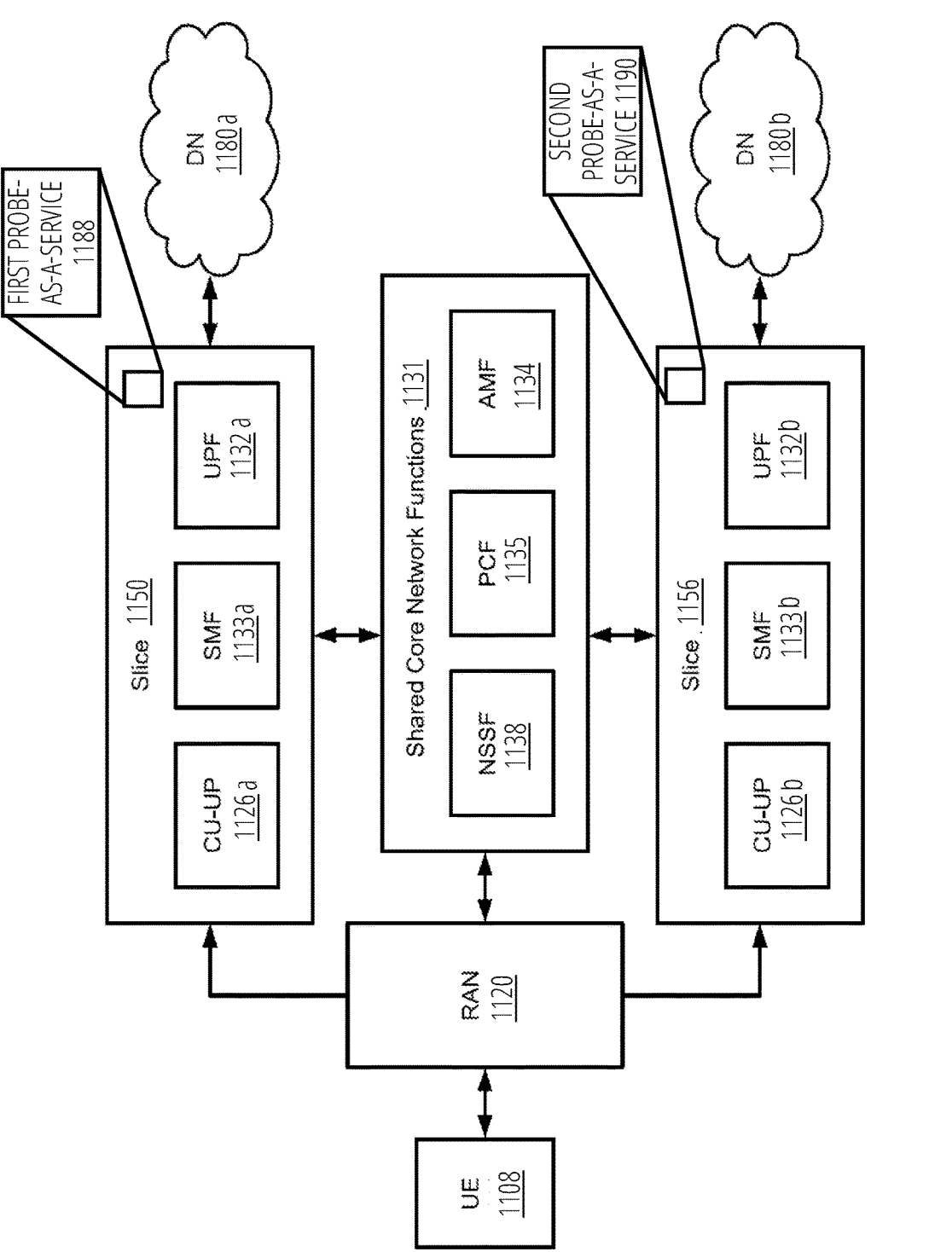

FIG. 11H depicts network slices 1150 and 1156 after updates have been made based on changes to the network slice policy according to at least one embodiment. As depicted, the network slices 1150 and 1156 share a set of shared core network functions 1131 that includes AMF 1134, PCF 1135, and NSSF 1138. Each network slice includes a CU-UP 1216, SMF 1133, and a UPF 1132; accordingly, network slice 1150 includes CU-UP 1216*a*, SMF 1133*a*, and UPF 1132*a*, and network slice 1156 includes CU-UP 1216*b*, SMF 1133*b*, and UPF 1132*b*.

Figure 12A:
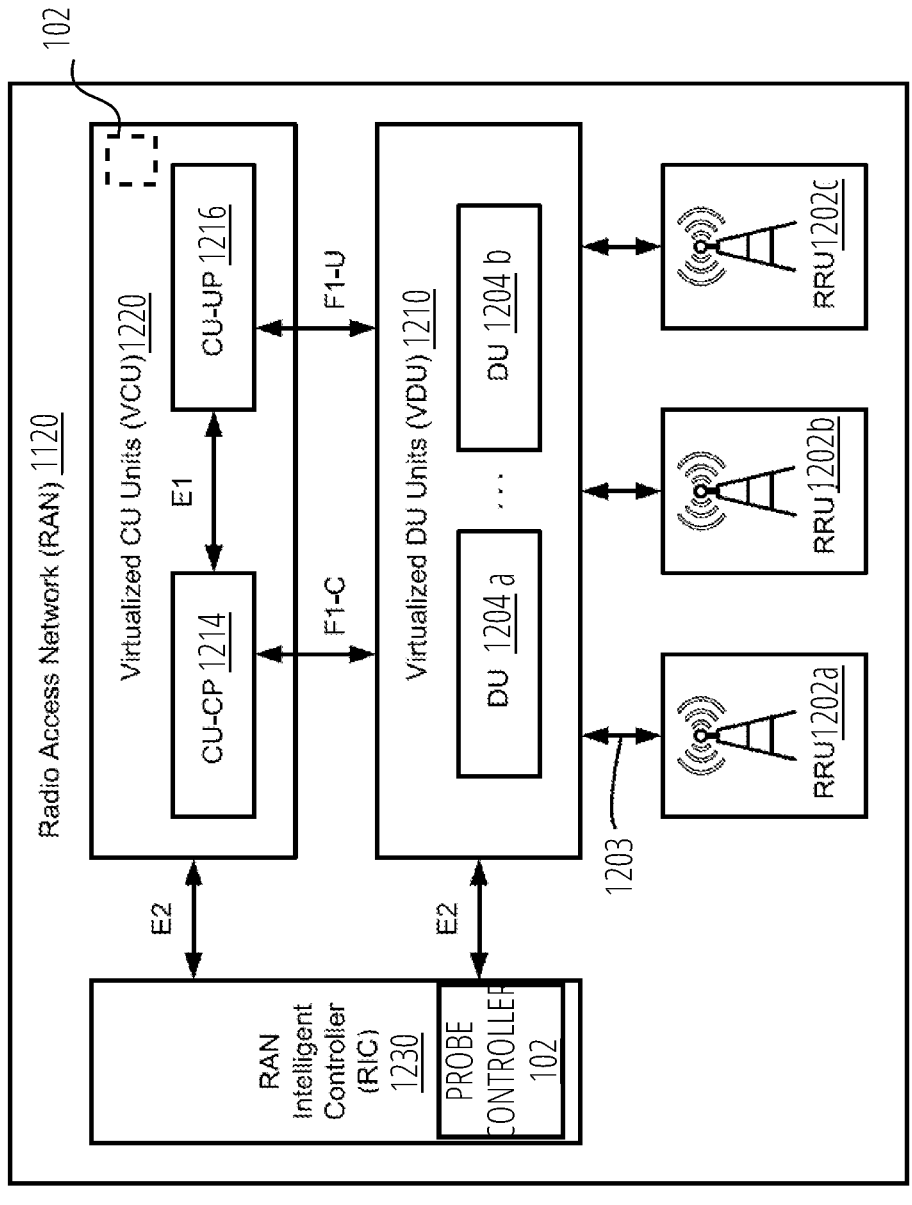
FIG. 12A-FIG. 12D depict a radio access network according to various embodiments.

FIG. 12A depicts a RAN 1120 according to at least one embodiment. The RAN 1120 includes virtualized CU units (VCU) 1220, virtualized DU units (VDU) 1210, remote radio units (RRUs) 1202*a*-1202*c*, and a RAN intelligent controller (RIC) 1230. In at least one embodiment, the probe controller 102 can be implemented in the RIC 1230 to provide a probe-as-a-service as described herein. The virtualized DU units 1210 can include virtualized versions of distributed units (DUs) 1204. The distributed unit (DU) 1204 can include a logical node configured to provide functions for the radio link control (RLC) layer, the medium access control (MAC) layer, and the physical layer (PHY) layers. The virtualized CU units 1220 can include virtualized versions of centralized units (CUs) including a centralized unit for the user plane CU-UP 1216 and a centralized unit for the control plane CU-CP 1214. In one example, the centralized units (CUs) can include a logical node configured to provide functions for the radio resource control (RRC) layer, the packet data convergence control (PDCP) layer, and the service data adaptation protocol (SDAP) layer. The centralized unit for the control plane CU-CP 1214 can include a logical node configured to provide functions of the control plane part of the RRC and PDCP. The centralized unit for the user plane CU-UP 1216 can include a logical node configured to provide functions of the user plane part of the SDAP and PDCP. Virtualizing the control plane and user plane functions allows the centralized units (CUs) to be consolidated in one or more data centers on RAN-based open interfaces. In at least one embodiment, the probe controller 102 can be implemented in the VCU 1220 to provide a probe-as-a-service as described herein.

The remote radio units (RRUs) 1202*a*-1202*c* may correspond with different cell sites. A single DU may connect to multiple RRUs via a fronthaul interface 1203. The fronthaul interface 1203 may provide connectivity between DUs and RRUs. For example, DU 1204*a* may connect to 18 RRUs via the fronthaul interface 1203. Centralized units (CUs) may control the operation of multiple DUs via a midhaul F1 Interface that includes the F1-C and F1-U interfaces. The F1 Interface may support control plane and user plane separation, and separate the Radio Network Layer and the Transport Network Layer. In one example, the centralized unit for the control plane CU-CP 1214 may connect to ten different DUs within the virtualized DU units 1210. In this case, the centralized unit for the control plane CU-CP 1214 may control ten DUs and 180 RRUs. A single Distributed Unit (DU) 1204 may be located at a cell site or in a local data center. Centralizing the Distributed Unit (DU) 1204 at a local data center or a single cell site location instead of distributing it across multiple cell sites, may result in reduced implementation costs.

The centralized unit for the control plane CU-CP 1214 may host the radio resource control (RRC) layer and the control plane part of the packet data convergence control (PDCP) layer. The E1 Interface may separate the Radio Network Layer and the Transport Network Layer. The CU-CP 1214 terminates the E1 Interface connected with the centralized unit for the user plane CU-UP 1216 and the F1-C interface connected with the distributed units (DUs) 1204. The centralized unit for the user plane CU-UP 1216 hosts the user plane part of the packet data convergence control (PDCP) layer and the service data adaptation protocol (SDAP) layer. The CU-UP 1216 terminates the E1 Interface connected with the centralized unit for the control plane CU-CP 1214 and the F1-U interface connected with the distributed units (DUs) 1204. The distributed units (DUs) 1204 may handle the lower layers of the baseband processing up through the packet data convergence control (PDCP) layer of the protocol stack. The interfaces F1-C and E1 may carry signaling information for setting up, modifying, relocating, and/or releasing a UE context.

The RAN intelligent controller (RIC) 1230 may control the underlying RAN elements via the E2 Interface. The E2 Interface connects the RAN intelligent controller (RIC) 1230 to the distributed units (DUs) 1204 and the centralized units CU-CP 1214 and CU-UP 1216. The RAN intelligent controller (RIC) 1230 can include a near-real-time RIC. A non-real-time RIC (NRT-RIC) not depicted can include a logical node allowing non-real-time control rather than near-real-time control and the near-real-time RIC 1230 can include a logical node allowing near-real-time control and optimization of RAN elements and resources on the bases of information collected from the distributed units (DUs) 1204 and the centralized units CU-CP 1214 and CU-UP 1216 via the E2 Interface.

The virtualization of the distributed units (DUs) 1204 and the centralized units CU-CP 1214 and CU-UP 1216 allows various deployment options that may be adjusted over time based on network conditions and network slice requirements. In at least one example, both a Distributed Unit (DU) 1204 and a corresponding centralized unit CU-UP 1216 may be implemented at a cell site. In another example, a Distributed Unit (DU) 1204 may be implemented at a cell site and the corresponding centralized unit CU-UP 1216 may be implemented at a local data center (LDC). In another example, both a Distributed Unit (DU) 1204 and a corresponding centralized unit CU-UP 1216 may be implemented at a local data center (LDC). In another example, both a Distributed Unit (DU) 1204 and a corresponding centralized unit CU-UP 1216 may be implemented at a cell site, but the corresponding centralized unit CU-CP 1214 may be implemented at a local data center (LDC). In another example, a Distributed Unit (DU) 1204 may be implemented at a local data center (LDC) and the corresponding centralized units CU-CP 1214 and CU-UP 1216 may be implemented at an edge data center (EDC).

In some embodiments, network slicing operations may be communicated via the E1, F1-C, and F1-U interfaces of the RAN 1120. For example, CU-CP 1214 may select the appropriate DU 1204 and CU-UP 1216 entities to serve a network slicing request associated with a particular service level agreement (SLA).

Figure 12B:
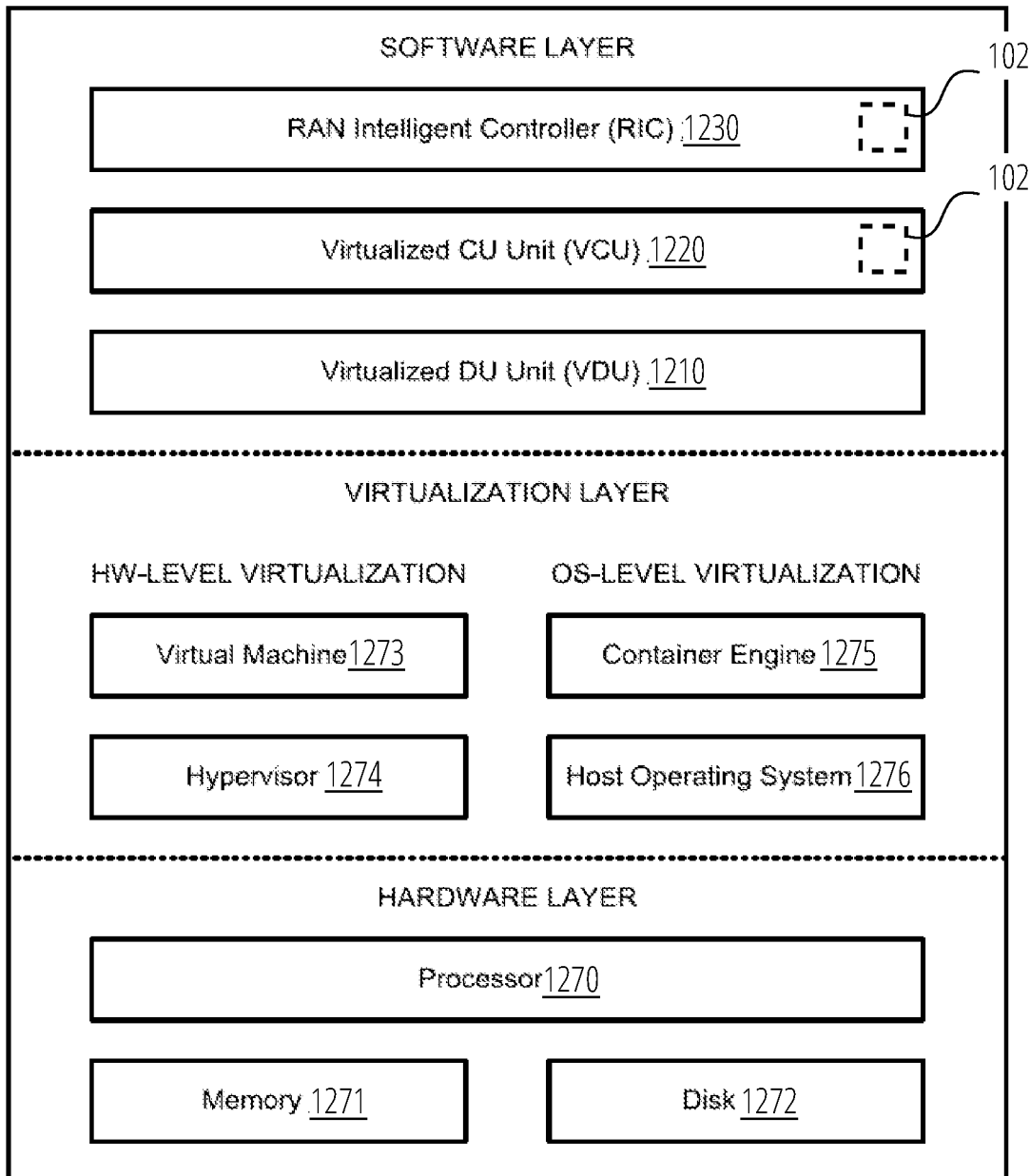

FIG. 12B depicts a RAN 1120 according to at least one embodiment. As depicted, the RAN 1120 includes hardware-level components and software-level components. The hardware-level components include one or more processors 1270, one or more memory 1271, and one or more disks 1272. The one or more memory 1271 can be communicatively coupled with and readable by the one or more processors 1270 (or processing devices). The one or more memory 1271 can have stored therein processor-readable instructions that, when executed by the one or more processors 1270, cause the one or more processors 1270 to perform operations described herein. The software-level components include software applications, such as a RAN intelligent controller (RIC) 1230, virtualized CU unit (VCU) 1220, and virtualized DU unit (VDU) 1210. The software-level components may be run using the hardware-level components or executed using processor and storage components of the hardware-level components. In one example, one or more of the RIC 1230, VCU 1220, and VDU 1210 may be run using the processor 1270, memory 1271, and disk 1272. In another example, one or more of the RIC 1230, VCU 1220, and VDU 1210 may be run using a virtual processor and a virtual memory that are themselves executed or generated using the processor 1270, memory 1271, and disk 1272.

The software-level components also include virtualization layer processes, such as virtual machine 1273, hypervisor 1274, container engine 1275, and host operating system 1276. The hypervisor 1274 can include a native hypervisor (or bare-metal hypervisor) or a hosted hypervisor (or type 2 hypervisor). The hypervisor 1274 may provide a virtual operating platform for running one or more virtual machines, such as virtual machine 1273. A hypervisor can include software that creates and runs virtual machine instances. Virtual machine 1273 may include a set of virtual hardware devices, such as a virtual processor, a virtual memory, and a virtual disk. The virtual machine 1273 may include a guest operating system that has the capability to run one or more software applications, such as the RAN intelligent controller (RIC) 1230. The virtual machine 1273 may run on the host operating system 1276 upon which the container engine 1275 may run. A virtual machine, such as virtual machine 1273, may include one or more virtual processors.

A container engine 1275 may run on top of the host operating system 1276 in order to run multiple isolated instances (or containers) on the same operating system kernel of the host operating system 1276. Containers may perform virtualization at the operating system level and may provide a virtualized environment for running applications and their dependencies. The container engine 1275 may acquire a container image and convert the container image into running processes. In some cases, the container engine 1275 may group containers that make up an application into logical units (or pods). A pod may contain one or more containers, and all containers in a pod may run on the same node in a cluster. Each pod may serve as a deployment unit for the cluster. Each pod may run a single instance of an application.

In order to scale an application horizontally, multiple instances of a pod may be run in parallel. A "replica" may refer to a unit of replication employed by a computing platform to provision or deprovision resources. Some computing platforms may run containers directly and therefore a container can include the unit of replication. Other computing platforms may wrap one or more containers into a pod, and therefore a pod can include the unit of replication.

A replication controller may be used to ensure that a specified number of replicas of a pod are running at the same time. If fewer than the specified number of pods are running (e.g., due to a node failure or pod termination), then the replication controller may automatically replace a failed pod with a new pod. In some cases, the number of replicas may be dynamically adjusted based on a prior number of node failures. For example, if it is detected that a prior number of node failures for nodes in a cluster running a particular network slice has exceeded a threshold number of node failures, then the specified number of replicas may be increased (e.g., increased by one). Running multiple pod instances and keeping the specified number of replicas constant may prevent users from losing access to their application in the event that a particular pod fails or becomes inaccessible.

In some embodiments, a virtualized infrastructure manager not depicted may run on the RAN 1120 in order to provide a centralized platform for managing a virtualized infrastructure for deploying various components of the RAN 1120. The virtualized infrastructure manager may manage the provisioning of virtual machines, containers, and pods. The virtualized infrastructure manager may also manage a replication controller responsible for managing a number of pods. In some cases, the virtualized infrastructure manager may perform various virtualized infrastructure related tasks, such as cloning virtual machines, creating new virtual machines, monitoring the state of virtual machines, and facilitating backups of virtual machines. In at least one embodiment, the probe controller 102 can be implemented in the RIC 1230 or the VCU 1220 to provide a probe-as-a-service as described herein.

Figure 12C:
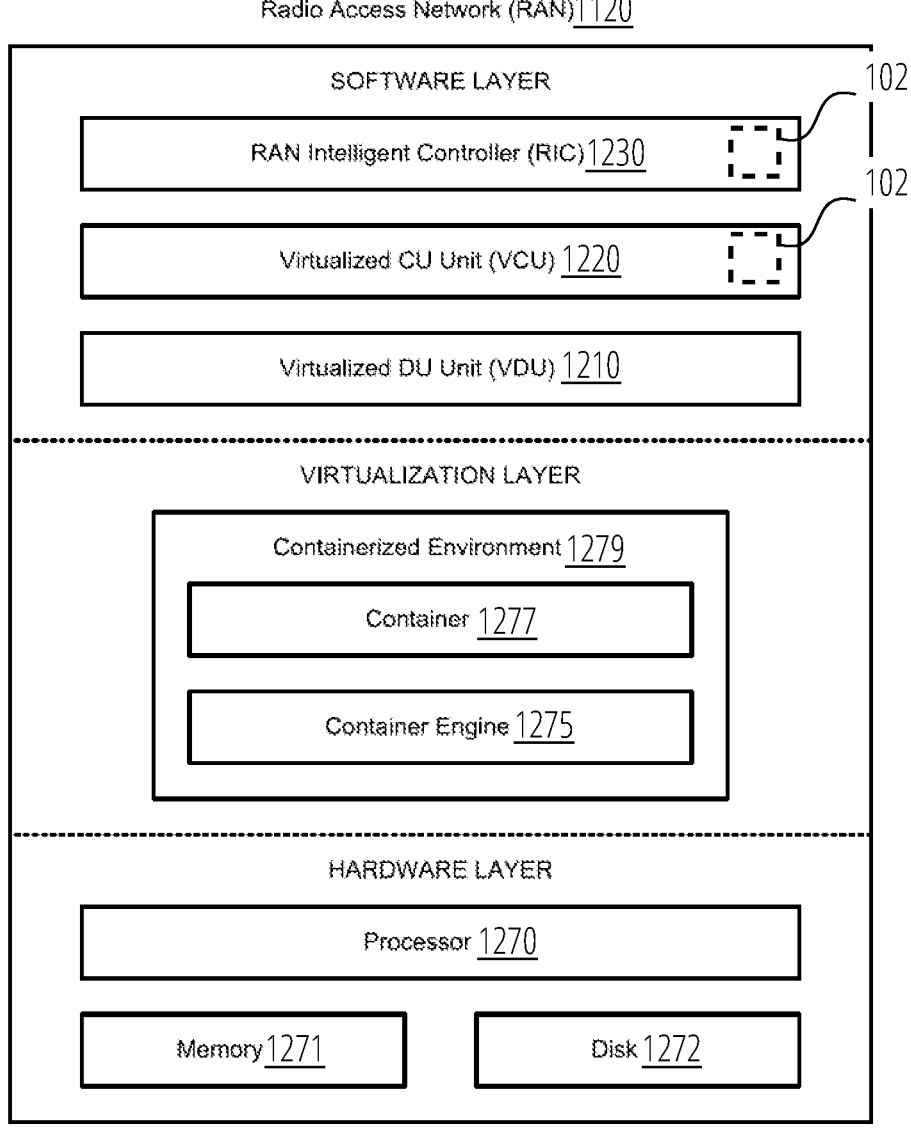

FIG. 12C depicts the RAN 1120 of FIG. 12B in which the virtualization layer includes a containerized environment 1279 according to at least one embodiment. The containerized environment 1279 includes a container engine 1275 for instantiating and managing application containers, such as container 1277. Containerized applications can include applications that run in isolated runtime environments (or containers). The containerized environment 1279 may include a container orchestration service for automating the deployments of containerized applications. The container 1277 may be used to deploy microservices for running network functions. The container 1277 may run DU components and/or CU components of the RAN 1120. The containerized environment 1279 may be executed using hardware-level components or executed using processor and storage components of the hardware-level components. In one example, the containerized environment 1279 may be run using the processor 1270, memory 1271, and disk 1272. In another example, the containerized environment 1279 may be run using a virtual processor and a virtual memory that are themselves executed or generated using the processor 1270, memory 1271, and disk 1272. In at least one embodiment, the probe controller 102 can be implemented in the RIC 1230 or the VCU 1220 to provide a probe-as-a-service as described herein.

Figure 12D:
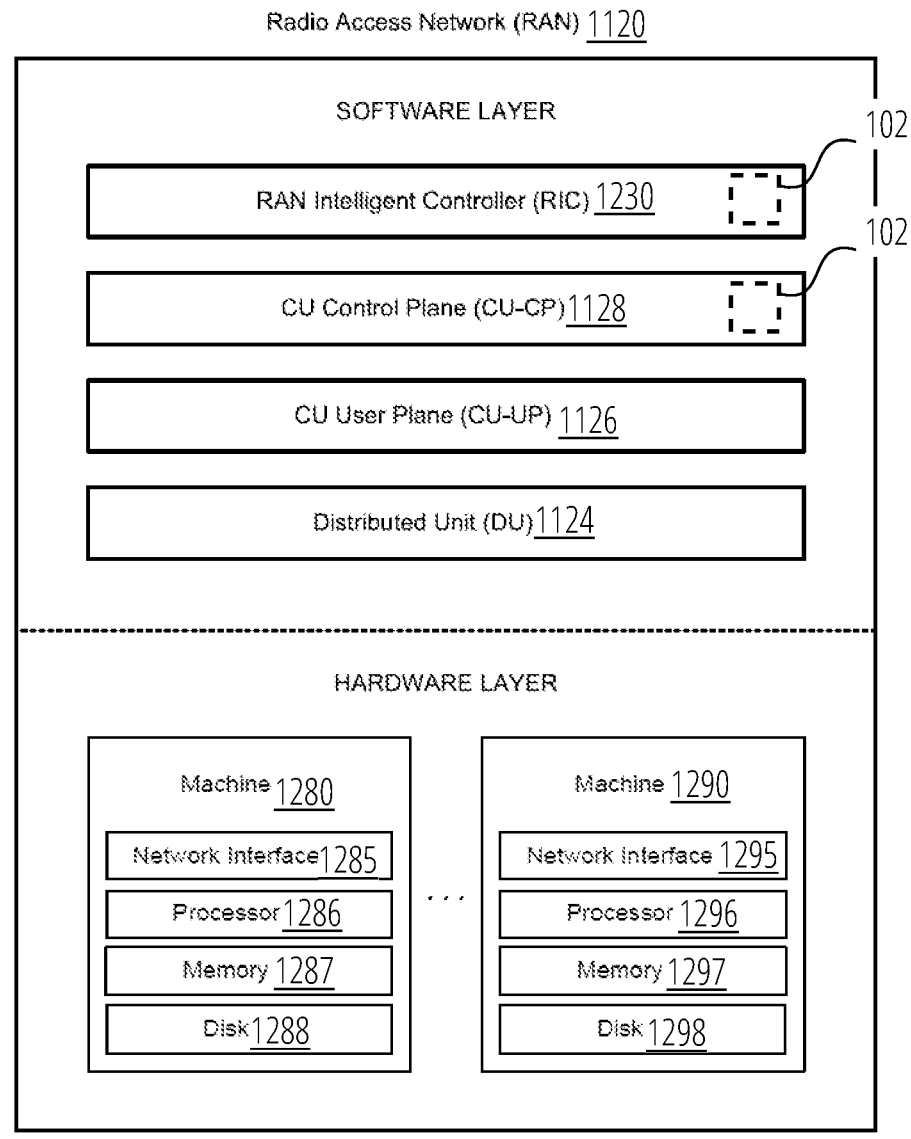

FIG. 12D depicts a RAN 1120 according to at least one embodiment. As depicted, the RAN 1120 includes hardware-level components and software-level components. The hardware-level components include a set of machines (e.g., physical machines) that may be grouped together and presented as a single computing system or a cluster. Each machine of the set of machines can include a node in a cluster (e.g., a failover cluster).

As depicted, the set of machines includes machine 1280 and machine 1290. The machine 1280 includes a network interface 1285, processor 1286, memory 1287, and disk 1288 all in communication with each other. Processor 1286 allows machine 1280 to execute computer readable instructions stored in memory 1287 to perform processes described herein. Processor 1286 may include one or more processing units, such as one or more CPUs and/or one or more GPUs. Memory 1287 can include one or more types of memory (e.g., RAM, SRAM, DRAM, ROM, EEPROM, or Flash). The disk 1288 can include a hard disk drive and/or a solid-state drive. Similarly, the machine 1290 includes a network interface 1295, processor 1296, memory 1297, and disk 1298 all in communication with each other. Processor 1296 allows machine 1290 to execute computer readable instructions stored in memory 1297 to perform processes described herein. In some embodiments, the set of machines may be used to implement a failover cluster. In some cases, the set of machines may be used to run one or more virtual machines or to execute or generate a containerized environment, such as the containerized environment 1279 depicted in FIG. 12C.

The software-level components include a RAN intelligent controller (RIC) 1230, CU control plane (CU-CP) 1214, CU user plane (CU-UP) 1216, and Distributed Unit (DU) 1204. In one embodiment, the software-level components may be run using a dedicated hardware server. In another embodiment, the software-level components may be run using a virtual machine running or containerized environment running on the set of machines. In another embodiment, the software-level components may be run from the cloud (e.g., the software-level components may be deployed using a cloud-based compute and storage infrastructure). In at least one embodiment, the probe controller 102 can be implemented in the RIC 1230 or the VCU 1220 to provide a probe-as-a-service as described herein.

Figure 12E:
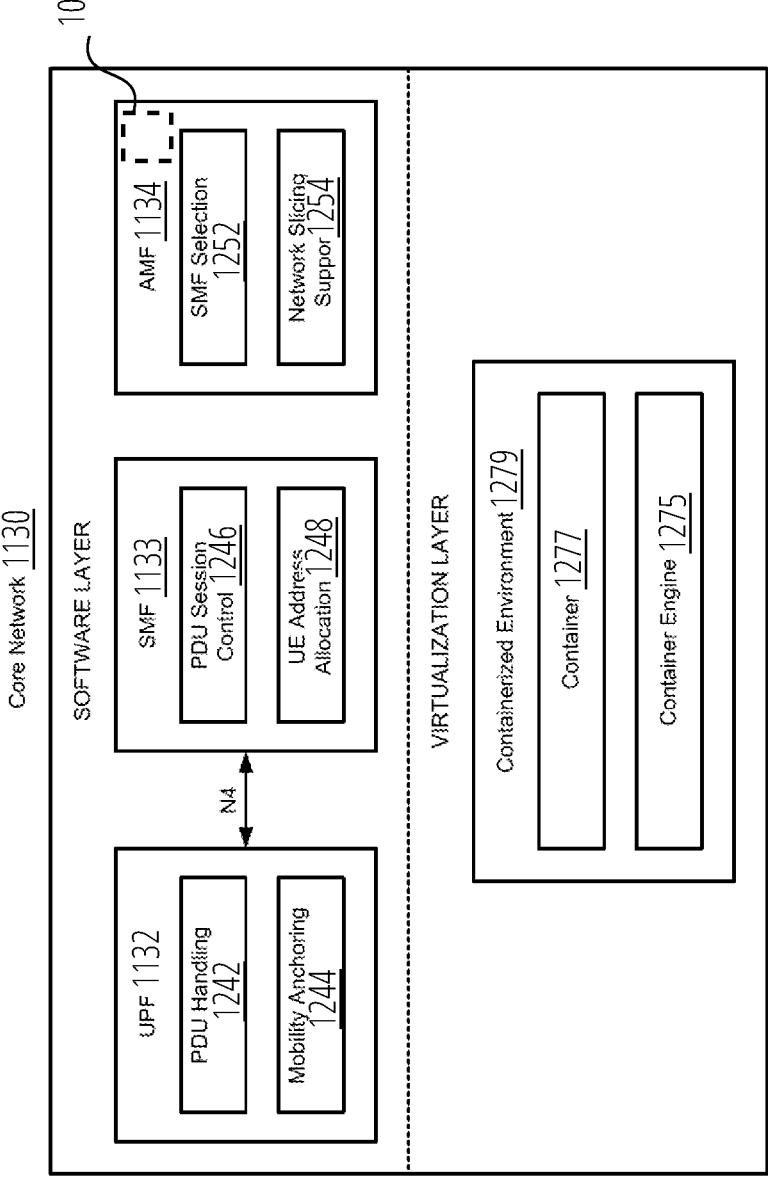
FIG. 12E depicts a core network according to at least one embodiment.

FIG. 12E depicts a core network 1130 according to at least one embodiment. As depicted, the core network 1130 includes implementation for core network functions UPF 1132, SMF 1133, and AMF 1134. The core network 1130 may be used to provide Internet access for user equipment via a radio access network, such as the RAN 1120 in FIG. 12C. The AMF 1134 may be configured to host various functions including SMF selection 1252 and network slicing support 1254. The UPF 1132 may be configured to host various functions including mobility anchoring 1244, packet data unit (PDU) handling 1242, and QoS handling for the user plane. The SMF 1133 may be configured to host various functions including UE IP address allocation and management 1248, selection and control of user plane functions, and PDU session control 1246. The core network functions may be run using containers within the containerized environment 1279 that includes a container engine 1275 for instantiating and managing application containers, such as container 1277. In some embodiments, the containerized environment 1279 may be executed or generated using a set of machines as depicted in FIG. 12D or may be executed or generated using hardware-level components, such as the processor 1270, memory 1271, and disk 1272 depicted in FIG. 12C. In at least one embodiment, the probe controller

102 can be implemented in the AMF 1134 to provide a probe-as-a-service as described herein.

Figure 12F:
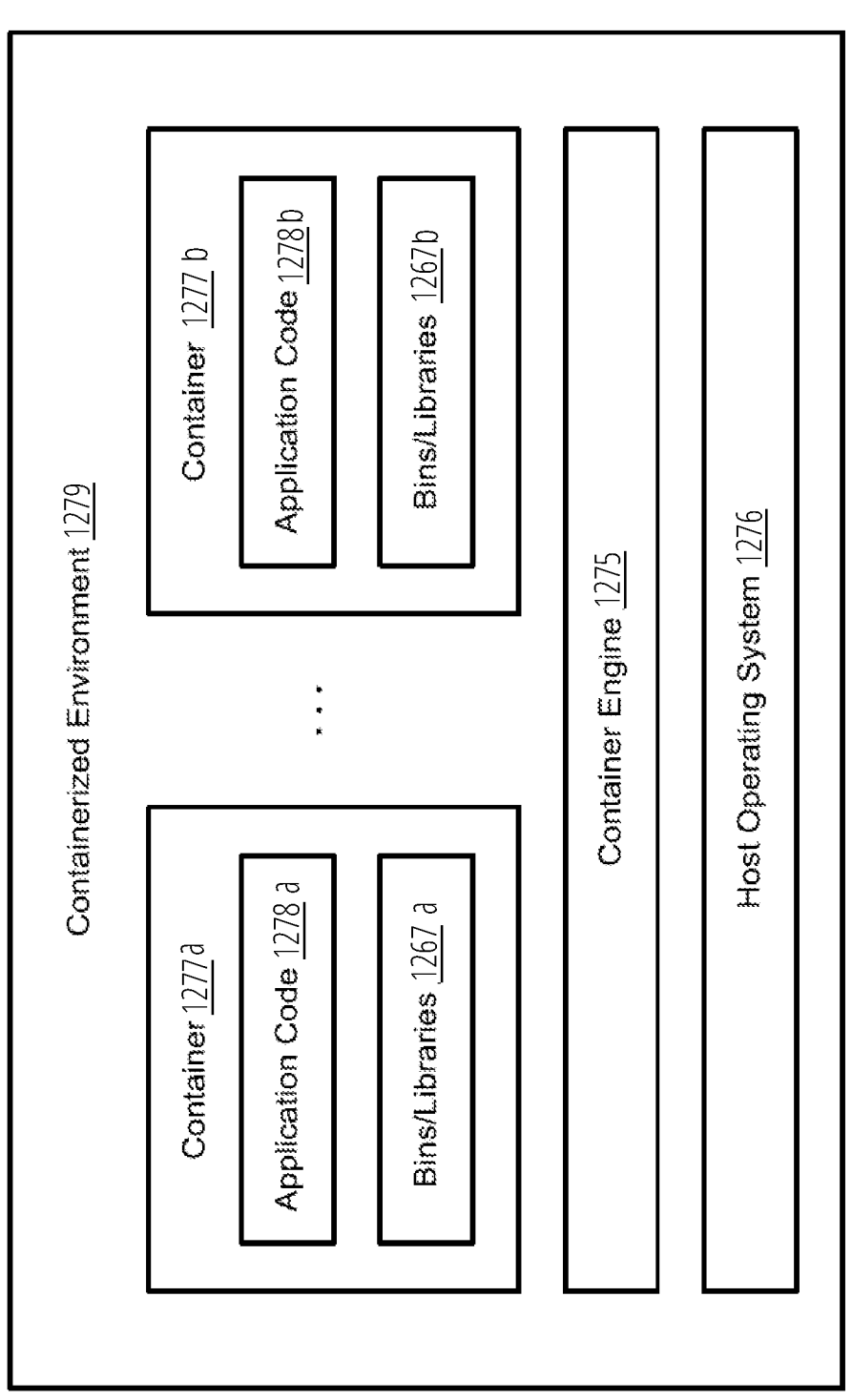
FIG. 12F depicts a containerized environment that includes a container engine running on top of a host operating system according to at least one embodiment.

FIG. 12F depicts a containerized environment 1279 that includes a container engine 1275 running on top of a host operating system 1276 according to at least one embodiment. The container engine 1275 may manage or run containers 1277 on the same operating system kernel of the host operating system 1276. The container engine 1275 may acquire a container image and convert the container image into one or more running processes. In some cases, the container engine 1275 may group containers that make up an application into logical units (or pods). A pod may contain one or more containers, and all containers in a pod may run on the same node in a cluster. Each container 1277 may include application code 1278 and application dependencies 1267, such as operating system libraries, required to run the application code 1278. Containers allow portability by encapsulating an application within a single executable package of software that bundles application code 1278 together with the related configuration files, binaries, libraries, and dependencies required to run the application code 1278.

Figure 13A:
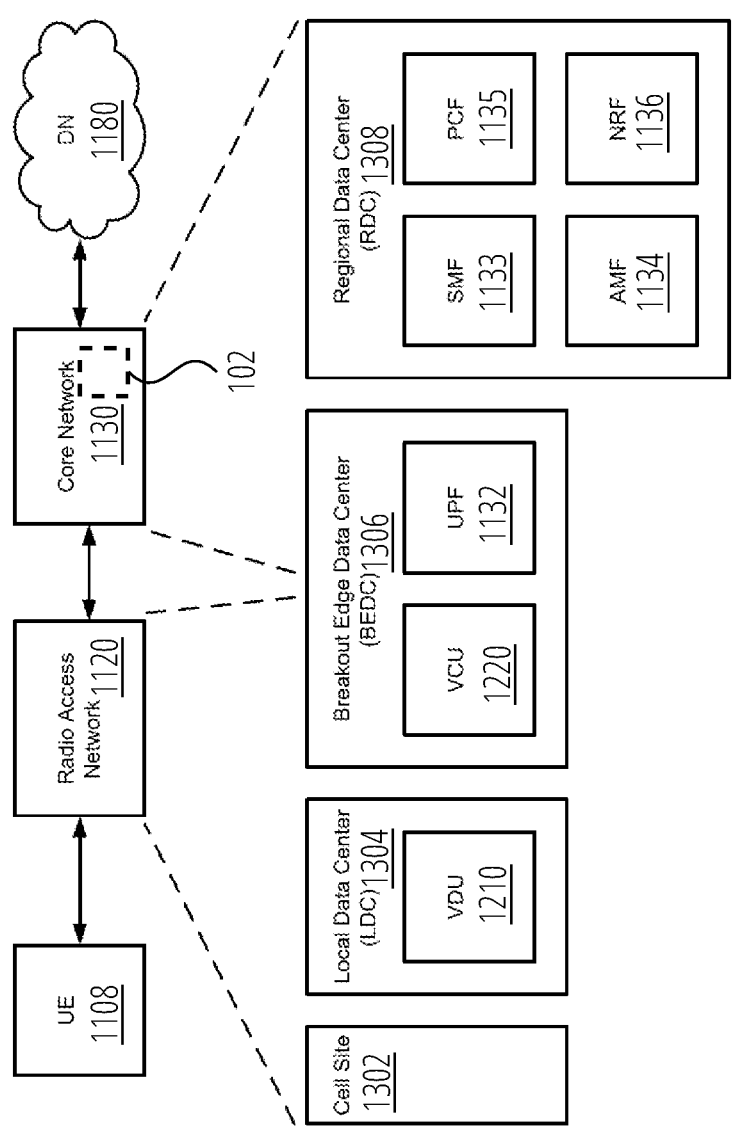
FIG. 13A-FIG. 13D depict a 5G network including implementations of a radio access network and a core network with virtualized network functions arranged within a data center hierarchy according to various embodiments.

FIG. 13A depicts a 5G network including a RAN 1120 and a core network 1130 according to at least one embodiment. In at least one embodiment, the probe controller 102 can be implemented in the core network 1130 to provide a probe-as-a-service as described herein. The RAN 1120 and the core network 1130 allow user equipment UE 1108 to transfer data to the data network 1180 and/or to receive data from the data network 1180. As depicted, the VDU 1210 and VCU 1220 components of the RAN 1120 may be implemented using different data centers within a data center hierarchy that includes a local data center (LDC) 1304 that is a first electrical distance away from the cell site 1302, a breakout edge data center (BEDC) 1306 that is a second electrical distance greater than the first electrical distance away from the cell site 1302, and a regional data center (RDC) 1308 that is a third electrical distance greater than the second electrical distance away from the cell site 1302. The local data center (LDC) 1304 may correspond with a first one-way latency from the cell site 1302. The breakout edge data center (BEDC) 1306 may correspond with a second one-way latency greater than the first one-way latency from the cell site 1302. The regional data center (RDC) 1308 may correspond with a third one-way latency greater than the second one-way latency from the cell site 1302. The cell site 1302 may include a cell tower or one or more remote radio units (RRUs) for sending and receiving wireless data transmissions. In some cases, the cell site 1302 may correspond with a macrocell site or a small cell site, such as a microcell site.

In some cases, a data center may refer to a networked group of computing and storage devices that may run applications and services. The data center may include hardware servers, storage systems, routers, switches, firewalls, application-delivery controllers, cooling systems, and power subsystems. A data center may refer to a collection of computing and storage resources provided by on-premises physical servers and/or virtual networks that support applications and services across pools of physical infrastructure. Within a data center, a set of services may be connected together to provide a computing and storage resource pool upon which virtualized entities may be instantiated. Multiple data centers may be interconnected to form larger networks consisting of pooled computing and storage resources connected by connectivity resources. The connectivity resources may take the form of physical connections, such as Ethernet or optical communications links, and may include wireless communication channels as well. If two different data centers are connected by a set of different communication channels, the links may be combined using various techniques, including the formation of link aggregation groups (LAGs). A LAG can include a logical interface that uses the link aggregation control protocol (LACP) to aggregate multiple connections at a single direct connect endpoint.

As depicted in FIG. 13A, the VDU 1210 is running within the local data center (LDC) 1304 and the VCU 1220 is running within the breakout edge data center (BEDC) 1306. The core network functions SMF 1133, AMF 1134, PCF 1135, and NRF 1136 are running within the regional data center (RDC) 1308. The user plane function UPF 1132 is running within the breakout edge data center (BEDC) 1306. In some embodiments, the breakout edge data center (BEDC) 1306 can include an edge data center at an edge of a network managed by a cloud service provider.

One technical benefit of utilizing edge computing to move network functions closer to user equipment is that data communication latency may be reduced. The reduced latency may enable real-time interactivity between user equipment, such as UE 1108 in FIG. 11A, and cloud-based services. Edge computing, including mobile edge computing, may refer to the arrangement of computing and associated storage resources at locations closer to the "edge" of a network in order to reduce data communication latency to and from user equipment (e.g., end user mobile phones). Some technical benefits of positioning edge computing resources closer to UEs include low-latency data transmissions (e.g., under 5 ms), real-time (or near-real-time) operations, reduced network backhaul traffic, and reduced energy consumption. The edge computing resources may be located within on-premises data centers (on-prem), near or on cell towers, and at network aggregation points within the radio access networks and core networks. Examples of applications and services that may be executed using edge computing include virtual network functions and 5G-enabled network services. The virtual network functions can include software-based network functions that are executed using the edge computing resources.

Technical benefits of dynamically assigning one or more virtualized network functions (e.g., a user plane function) to different locations or servers for execution within a data center hierarchy is that latency, power, and availability requirements may be optimized for multiple network slices over time. Technical benefits of adjusting the server location or the data center location of one or more virtualized network functions (e.g., a user plane function) for a network slice over time is that the network slice may be dynamically reconfigured to adapt to changes in latency, power, and availability requirements. In one example, a network slice may have a first configuration corresponding with a low-latency configuration in which a user plane function is deployed at a cell site and then subsequently be reconfigured to a second configuration corresponding with a low-power configuration in which the user plane function is redeployed at a breakout edge data center location.

The location of the UPF 1132 (e.g., whether the UPF 1132 is deployed at the local data center 1304 or the breakout edge data center 1306) places constraints on the transport network not depicted connecting the UPF 1132 with the core network 1130. For example, depending on the UPF placement location, the transport network for the backhaul (the N3 Interface) may either be minimized if the UPF is placed closer to the VCU 1220 (or closer to the RAN edge) or maximized if the UPF is placed farther away from the VCU 1220.

The applications and services running on the edge computing resources may communicate with a large number of UEs that may experience connectivity failures (e.g., due to battery life limitations or latency issues) over time. The applications and services may utilize heartbeat tracking techniques to manage device connectivity to the UEs.

Figure 13B:
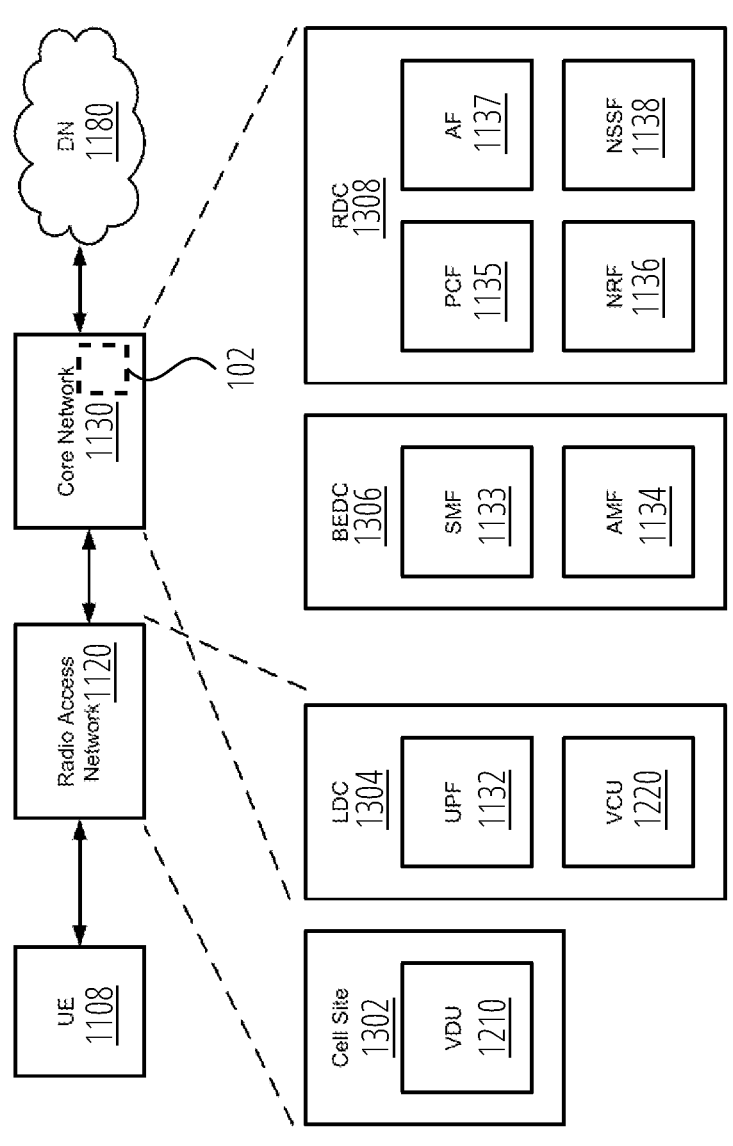

FIG. 13B depicts the 5G network depicted in FIG. 13A in which the VDU 1210 has been moved to run at the cell site 1302, the VCU 1220 and the UPF 1132 have been moved to run at the local data center (LDC) 1304, and the SMF 1133 and the AMF 1134 have been moved to run in the breakout edge data center (BEDC) 1306 according to at least one embodiment. A virtualized network function may be moved from a first data center to a second data center within a data center hierarchy by transferring an application or program code for the virtualized network function from a first server within the first data center to a second server within the second data center. In some embodiments, a second virtual processor that is instantiated and run within the second data center may acquire instructions or program code associated with a virtualized network function prior to a first virtual processor that previously ran the virtualized network function within the first data center being deleted. The shifting of network functions closer to the cell site 1302 and/or closer to user equipment may have been performed in response to changes in a service level agreement (SLA) or a request to establish a lower-latency network connection from user equipment to a data network. A service level agreement (SLA) may correspond with a service obligation in which penalties may apply if the SLA is violated. In some cases, SLA service metrics may include key performance indicators (KPIs), such as packet loss, latency, and guaranteed bit rate.

In some embodiments, network slices may be reconfigured in order to satisfy traffic isolation requirements, end-to-end latency requirements (e.g., the round-trip time between two end points in a network slice), and throughput requirements for each slice of the network slices. In some cases, the traffic isolation, end-to-end latency, and throughput requirements may vary as a function of a priority level assigned to a given network slice (e.g., whether a network slice has been assigned a high priority or a low priority).

In some embodiments, a first data center and a second data center within a data center hierarchy may both have the same applications or program code stored thereon such that both data centers can run one or more of the same virtualized network functions. In at least one such embodiment, a virtualized network function may be moved from the first data center to the second data center by transferring control or execution of the virtualized network function from the first data center to the second data center without transferring applications or program code.

Figure 13C:
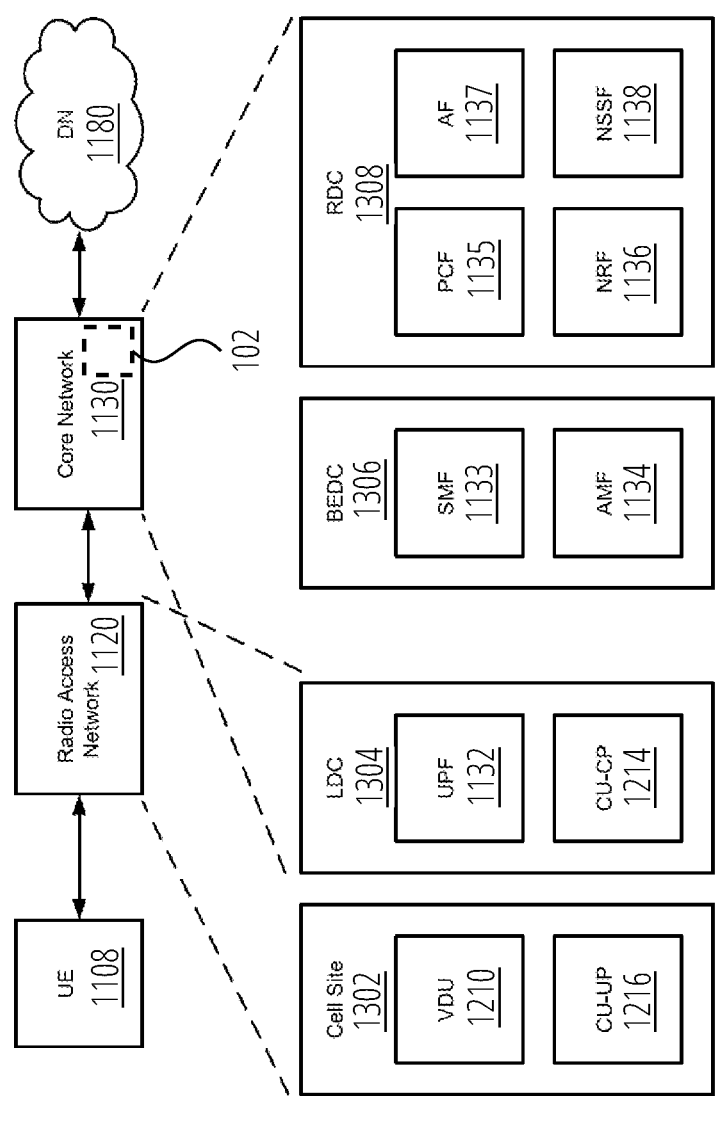

FIG. 13C depicts the 5G network depicted in FIG. 13B in which the VCU 1220 has been partitioned such that the CU-CP 1214 may run at the local data center (LDC) 1304 and the CU-UP 1216 may be moved to run at the cell site 1302 according to at least one embodiment. The cell site 1302 may include computing and storage resources for running containerized applications.

Figure 13D:
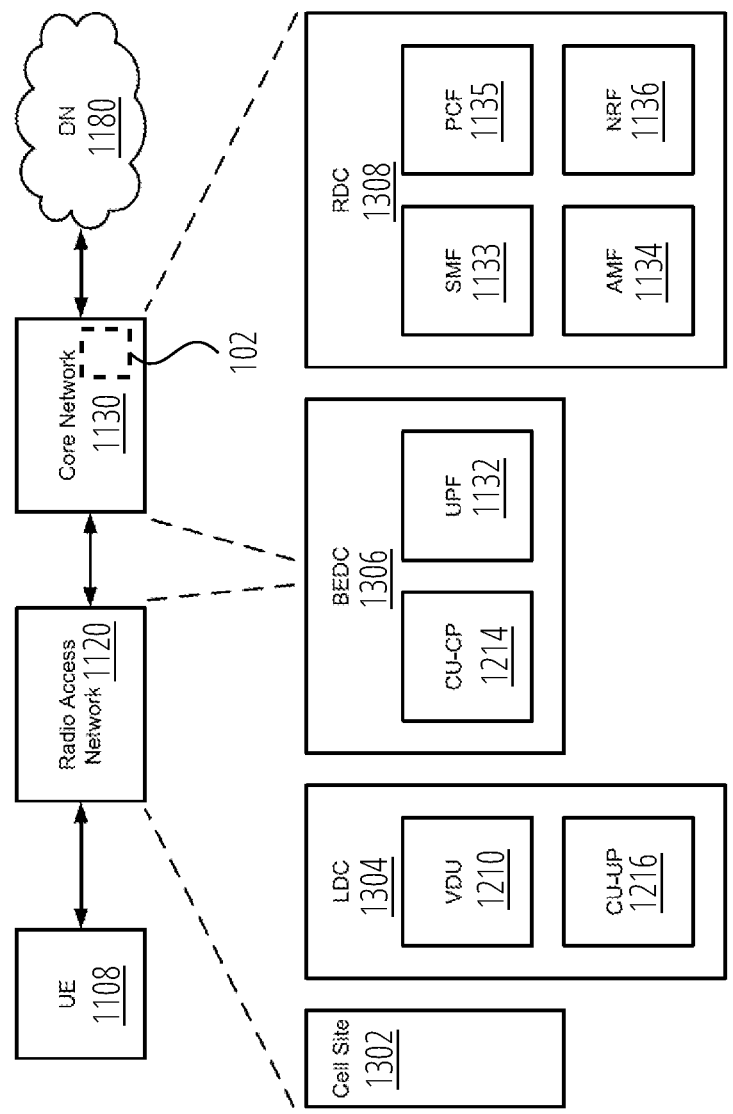

FIG. 13D depicts the 5G network depicted in FIG. 13C in which the CU-CP 1214 and the UPF 1132 have been moved to run in the breakout edge data center (BEDC) 1306, the VDU 1210 and the CU-UP 1216 have been moved to run at the local data center (LDC) 1304, and the SMF 1133 and the AMF 1134 have been moved to run in the regional data center (RDC) 1308 according to at least one embodiment. Deploying the VDU 1210 and the CU-UP 1216 in the local data center (LDC) 1304 may allow the VDU 1210 to more efficiently support a number of cell sites, including the cell site 1302.

A data center hierarchy may include a set of data centers that span across different geographic regions. A region may correspond with a large geographical area in which multiple data centers are deployed to provide different cloud services. Each data center within the region may include a server cluster. A server cluster (or cluster) can include a set of physical machines that are connected via a network. The cluster may be used to process and store data and to run applications and services in a distributed manner. Applications and data associated with the applications may be replicated or mirrored over a set of machines within a cluster to improve fault tolerance. Each machine in a cluster can include a node in the cluster. In at least one example, the cluster can include a failover cluster.

Geo-redundancy may be achieved by running applications or services across two or more availability zones within the same region. Geo-redundancy may refer to the physical placement of servers or server clusters within geographically diverse data centers to safeguard against catastrophic events and natural disasters.

An availability zone can include a smaller geographical area that is smaller than the large geographical area of the region. Multiple availability zones may reside within a region. An availability zone can include one or more data centers with redundant power, networking, and connectivity within a region.

Each region can include a separate geographical area that does not overlap with any other regions. A logical grouping of one or more data centers within a region may correspond with an availability zone. Each region may include multiple availability zones that can include multiple isolated geographical areas within the region. The data centers within the availability zones of a region may be physically isolated from each other inside the region to improve fault tolerance.

Each availability zone inside a geographical region may utilize its own power, cooling, and networking connections. An application may be deployed across two or more availability zones in order to ensure high availability. In this case, if a first availability zone goes down (e.g., due to a power failure) within a geographical region, then the application may still be accessible and running within a second availability zone. Each availability zone within the geographical region may be connected to each other with high-bandwidth, low-latency network connections to enable synchronous replication of applications and services across the two or more availability zones.

A local zone may correspond with a small geographical region where one or more data centers are deployed to provide low-latency (e.g., single-digit millisecond) applications and services. User equipment that is located within the small geographical region or that is located within a threshold distance (e.g., within two miles) of the small geographical region may be able to provide low latency services. A data center within a local zone may allow a direct private connection to compute and storage resources without requiring access to the Internet. The direct private connection may utilize fiber optic cables to allow a server within the local zone to privately connect to other data centers without requiring access to the Internet.

As described above, the probe-as-a-service can be used for various use cases. In at least one embodiment, the probe-as-a-service 108 can be used to spin up "probe services" for enterprise slices, user data usages, events, devices, and logic resources of the cellular network 106. In at least one embodiment, the probe-as-a-service 108 can be used for accepting feedback from customer applications for more efficient resource usage, security alerts, and controls in the cellular network 106 (e.g., private 5G wireless network). In at least one embodiment, the probe-as-a-service 108 can be used for enhanced notifications to an enterprise utilizing predictive planning alerts and/or algorithms with the network provider's AI/ML models. In at least one embodiment, the probe-as-a-service 108 can be used for optimizing customers' dedicated slices and enforcing their policies for their own dedicated resources. In at least one embodiment, the probe-as-a-service 108 can be used for providing priority for users (e.g., emergency responders) in the event their devices misbehave based on measured probes. The users can be users, devices, robots, drones, etc. Certain devices, like robots and drones, may need to be monitored for appropriate behavior. In at least one embodiment, the probe-as-a-service 108 can be used for device-level probes such as for location and behavior boundaries correlated with network-provided resources. The probe-as-a-service 108 can be used for other similar and dissimilar use cases that are not necessarily described herein. A few examples are described below with respect to FIG. 14 to FIG. 16.

FIG. 14 is a flow diagram of a method 1400 of operating a probe-as-a-service associated with a customer of a cellular network according to at least one embodiment. The method 1400 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 1400 is performed by the probe-as-a-service platform 100 of FIG. 1. In one embodiment, the method 1400 is performed by the probe controller 102 of FIG. 1. In one embodiment, the method 1400 is performed by the probe-as-a-service stack 206 of FIG. 2. In one embodiment, the method 1400 is performed by the O-RAN centric slices 500 of FIG. 5. In one embodiment, the method 1400 is performed by the slice-level controller 600 of FIG. 6. In one embodiment, the method 1400 is performed by the probe-as-a-service architecture model 800 of FIG. 8. In one embodiment, the method 1400 is performed by the probe controller and other functions 902 of FIG. 9.

Referring to FIG. 14, the method 1400 begins with the processing logic receiving, from a customer, a request for a probe-as-a-service in a slice of the cellular network, the slice being associated with the customer (block 1402). At block 1404, the processing logic generates a set of probe collectors to collect network analytic data associated with the slice of the cellular network. At block 1406, the processing logic collects, using the set of probe collectors, input data from each of a set of data sources in the cellular network. The input data includes at least one of user data usage, events, metrics, counters, logs, traces, alarms, configuration data, flow data, state information, error messages, device data, or logical resource data of one or more network resources of the slice. At block 1408, the processing logic aggregates the input data from each of the set of data sources in the cellular network to obtain combined data (e.g., aggregated intelligence data or insight data). At block 1410, the processing logic generates, using at least one AI/ML model, the network analytic data based on the combined data. At block 1412, the processing logic provides the network analytic data to an application associated with the customer.

In at least one embodiment, the network analytic data includes a KPI of the one or more network resources. In at least one embodiment, at block 1406, the processing logic collects, using a first probe collector of the set of probe collectors, first data from a first network resource. The first network resource is at least one of a dedicated transport resource, a dedicated RF resource instance, customer RAN data, a transport slice pipeline, secure signaling session data, a RU, a RAN resource, or another service in the cellular network. The processing logic collects, using a second probe collector of the set of probe collectors, second data from a sensor located in an environment of the cellular network. In at least one embodiment, at least one of the set of data sources includes a probe agent programmed by a respective one of the set of probe collectors.

In at least one embodiment, the application is at least one of a northbound application, a dashboard, a transfer function, an analytics application, or a second AI/ML model. The cellular network can be a 5G wireless network. The customer can be an enterprise customer of the 5G wireless network. The slice can be an enterprise slice of the cellular network. The application can be a northbound application of the 5G wireless network. In at least one embodiment, the application can be a northbound application that manages at least one of resource usage, security alerts, or controls of the one or more network resources. The input data can be associated with a logical radio resource. The network analytic data can be a logical radio resource abstraction for the northbound application. In at least one embodiment, the application can be an enterprise customer application that manages at least one of resource usage, security alerts, or controls of the one or more network resources. The input data can be feedback data received from a second application associated with the customer. The enterprise customer application can manage resource usage, security alerts, and controls. The enterprise customer application can use the observation data as feedback data for managing the resource usage, security alerts, and controls.

In at least one embodiment, the processing logic generates an alert based on the network analytic data. The processing logic provides the alert to at least one of the application or a notification system associated with the customer. In this embodiment, a notification can be sent to the customer in response to the alert being predicted. The notification system can be a separate mechanism from the application, such as a messaging system or the like.

FIG. 15 is a flow diagram of a method 1500 of operating a probe-as-a-service associated with a customer of a cellular network according to at least one embodiment. The method 1500 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 1500 is performed by the probe-as-a-service platform 100 of FIG. 1. In one embodiment, the method 1500 is performed by the probe controller 102 of FIG. 1. In one embodiment, the method 1500 is performed by the probe-as-a-service stack 206 of FIG. 2. In one embodiment, the method 1500 is performed by the O-RAN centric slices 500 of FIG. 5. In one embodiment, the method 1500 is performed by the slice-level controller 600 of FIG. 6. In one embodiment, the method 1500 is performed by the probe-as-a-service architecture model 800 of FIG. 8. In one embodiment, the method 1500 is performed by the probe controller and other functions 902 of FIG. 9.

Referring to FIG. 15, the method 1500 begins with the processing logic receiving, from a customer, a request for a probe-as-a-service in a dedicated slice of the cellular network having dedicated resources (block 1502). The dedicated slice is associated with the customer and represents a behavior for other slices of the cellular network. At block 1504, the processing logic collects, using a set of probe collectors, input data from each of a set of data sources in the cellular network. The input data can include at least one of user data usage, events, metrics, counters, logs, traces, alarms, configuration data, flow data, state information, error messages, device data, or logical resource data of one or more network resources of the dedicated slice. At block 1506, the processing logic aggregates the input data from each of the set of data sources in the cellular network to obtain combined data. At block 1508, the processing logic generates, using at least one AI/ML model, observation data based on the combined data. At block 1510, the processing logic provides the observation data to a northbound application associated with the customer. At block 1512, the processing logic receives, from the northbound application, a policy associated with the dedicated resource to be enforced to modify operation of the dedicated slice.

In at least one embodiment, the processing logic provides the observation data to a second northbound application associated with a second slice of the cellular network. For example, the behavior from the slice can be used to extrapolate behavior for similar slices, such as the second slice. In at least one embodiment, a northbound application uses the observation data to optimize the dedicated slice and enforce policies associated with the dedicated resources. The minimum resources for one slice can be used to give a customer insight for many similar operations of other slices. This slice can be considered as an enabler for active holistic testing.

In at least one embodiment, at least one of the set of data sources includes a probe agent programmed by a respective one of the set of probe collectors. In at least one embodiment, the application is at least one of a northbound application, a dashboard, a transfer function, an analytics application, or a second AI/ML model. The cellular network can be a 5G wireless network. The customer can be an enterprise customer of the 5G wireless network. The slice can be an enterprise slice of the cellular network. The application can be a northbound application of the 5G wireless network.

FIG. 16 is a flow diagram of a method 1600 of operating a probe-as-a-service associated with a customer of a cellular network according to at least one embodiment. The method 1600 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 1600 is performed by the probe-as-a-service platform 100 of FIG. 1. In one embodiment, the method 1600 is performed by the probe controller 102 of FIG. 1. In one embodiment, the method 1600 is performed by the probe-as-a-service stack 206 of FIG. 2. In one embodiment, the method 1600 is performed by the O-RAN centric slices 500 of FIG. 5. In one embodiment, the method 1600 is performed by the slice-level controller 600 of FIG. 6. In one embodiment, the method 1600 is performed by the probe-as-a-service architecture model 800 of FIG. 8. In one embodiment, the method 1600 is performed by the probe controller and other functions 902 of FIG. 9.

Referring to FIG. 16, the method 1600 begins with the processing logic receiving, from a customer, a request for a probe-as-a-service in a cellular network having network resources (block 1602). At block 1604, the processing logic collects, using a set of probe collectors, input data from each of a set of data sources in the cellular network. The input data includes at least one of location information or behavior information correlated to the network resources. At block 1606, the processing logic generates, using at least one AI/ML model, observation data based on the input data. At block 1608, the processing logic provides the observation data to a northbound application associated with the customer.

In at least one embodiment, at least one of the set of probe collectors is a device-level collector. These device-level collectors can be used for location and behavior boundaries correlated with network-provided resources. In at least one embodiment, the observation data includes a state of the network resources. In at least one embodiment, at block 1604, the processing logic collects, using a first probe collector of the set of probe collectors, first data from a first network resource. The first network resource can be at least one of dedicated transport resource, a dedicated RF resource instance, customer RAN data, a transport slice pipeline, secure signaling session data, a RU, a RAN resource, or another service in the cellular network. The processing logic can collect, using a second probe collector of the set of probe collectors, second data from a sensor located in an environment of the cellular network.

In at least one embodiment, at least one of the set of data sources includes a probe agent programmed by a respective one of the set of probe collectors. In at least one embodiment, the application is at least one of a northbound application, a dashboard, a transfer function, an analytics application, or a second AI/ML model. The cellular network can be a 5G wireless network. The customer can be an enterprise customer of the 5G wireless network. The slice can be an enterprise slice of the cellular network. The application can be a northbound application of the 5G wireless network.

In the above description, numerous details are set forth. It will be apparent, however, to one of ordinary skill in the art having the benefit of this disclosure, that embodiments may be practiced without these specific details. In some instances, well-known structures and devices are shown in block diagram form rather than in detail in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein and is generally conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, Read-Only Memories (ROMs), compact disc ROMs (CD-ROMs), and magnetic-optical disks, Random Access Memories (RAMs), EPROMs, EEPROMs, magnetic or optical cards, or any type of media suitable for storing electronic instructions. One or more non-transitory, computer-readable storage media can have computer-readable instructions stored thereon which, when executed by one or more processing devices, cause the one or more processing devices to perform the operations described herein.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method of operating a probe controller that provides a probe-as-a-service in a cellular network, the method comprising:

receiving, from a customer, a request for a probe-as-a-service in a slice of the cellular network, the slice being associated with the customer;

generating a set of probe collectors to collect network analytic data associated with the slice of the cellular network;

collecting, using the set of probe collectors, input data from each of a plurality of data sources in the cellular network, wherein the input data comprises at least one of user data usage, events, metrics, counters, logs, traces, alarms, configuration data, flow data, state information, error messages, device data, or logical resource data of one or more network resources of the slice;

aggregating the input data from each of the plurality of data sources in the cellular network to obtain combined data;

generating, using at least one artificial intelligence (AI)/machine learning (ML) model, the network analytic data based on the combined data; and providing the network analytic data to an application associated with the customer.

2. The method of claim 1, wherein the network analytic data comprises a key performance indicator (KPI) of the one or more network resources.

3. The method of claim 1, wherein collecting the input data further comprises:

collecting, using a first probe collector of the set of probe collectors, first data from a first network resource, wherein the first network resource is at least one of a dedicated transport resource, a dedicated radio frequency (RF) resource instance, customer radio access network (RAN) data, a transport slice pipeline, secure signaling session data, a Radio Unit (RU), a radio access network (RAN) resource, or another service in the cellular network; and collecting, using a second probe collector of the set of probe collectors, second data from a sensor located in an environment of the cellular network.

4. The method of claim 1, wherein at least one of the plurality of data sources comprises a probe agent programmed by a respective one of the set of probe collectors.

5. The method of claim 1, wherein the application is at least one of a northbound application, a dashboard, a transfer function, an analytics application, or a second AI/ML model.

6. The method of claim 1, wherein the cellular network is a 5G wireless network, wherein the customer is an enterprise customer of the 5G wireless network, wherein the slice is an enterprise slice of the cellular network, and wherein the application is a northbound application of the 5G wireless network.

7. The method of claim 1, wherein the application is a northbound application that manages at least one of resource usage, security alerts, or controls of the one or more network resources, wherein the input data is associated with a logical radio resource, wherein the network analytic data is a logical radio resource abstraction for the northbound application.

8. The method of claim 1, wherein the application is an enterprise customer application that manages at least one of resource usage, security alerts, or controls of the one or more network resources, wherein the input data is feedback data received from a second application associated with the customer.

9. The method of claim 1, further comprising:

generating an alert based on the network analytic data; and providing the alert to at least one of the application or a notification system associated with the customer.

10. A method of operating a probe controller that provides a probe-as-a-service in a cellular network, the method comprising:

receiving, from a customer, a request for a probe-as-a-service in a dedicated slice of the cellular network having dedicated resources, wherein the dedicated slice is associated with the customer and represents a behavior for other slices of the cellular network;

collecting, using a set of probe collectors, input data from each of a plurality of data sources in the cellular network, wherein the input data comprises at least one of user data usage, events, metrics, counters, logs, traces, alarms, configuration data, flow data, state information, error messages, device data, or logical resource data of one or more network resources of the dedicated slice;

aggregating the input data from each of the plurality of data sources in the cellular network to obtain combined data;

generating, using at least one artificial intelligence (AI)/machine learning (ML) model, observation data based on the combined data;

providing the observation data to a northbound application associated with the customer; and receiving, from the northbound application, a policy associated with the dedicated resources to be enforced to modify operation of the dedicated slice.

11. The method of claim 10, further comprising providing the observation data to a second northbound application associated with a second slice of the cellular network.

12. The method of claim 10, wherein at least one of the plurality of data sources comprises a probe agent programmed by a respective one of the set of probe collectors.

13. The method of claim 10, wherein the cellular network is a 5G wireless network, wherein the customer is an enterprise customer of the 5G wireless network, and wherein the dedicated slice is an enterprise slice of the cellular network.

14. A method of operating a probe controller that provides a probe-as-a-service in a cellular network, the method comprising:

receiving, from a customer, a request for a probe-as-a-service in a cellular network having network resources;

collecting, using a set of probe collectors, input data from each of a plurality of data sources in the cellular network, wherein the input data comprises at least one of location information or behavior information correlated to the network resources;

aggregating the input data from each of the plurality of data sources to obtain combined data;

generating, using at least one artificial intelligence (AI)/machine learning (ML) model, observation data based on the combined data; and providing the observation data to a northbound application associated with the customer.

15. The method of claim 14, wherein at least one of the set of probe collectors is a device-level collector.

16. The method of claim 14, wherein the observation data comprises a state of the network resources.

17. The method of claim 14, wherein collecting the input data further comprises:

collecting, using a first probe collector of the set of probe collectors, first data from a first network resource, wherein the first network resource is at least one of a dedicated transport resource, a dedicated radio frequency (RF) resource instance, customer radio access network (RAN) data, a transport slice pipeline, secure signaling session data, a Radio Unit (RU), a radio access network (RAN) resource, or another service in the cellular network; and collecting, using a second probe collector of the set of probe collectors, second data from a sensor located in an environment of the cellular network.

18. The method of claim 14, wherein at least one of the plurality of data sources comprises a probe agent programmed by a respective one of the set of probe collectors.

19. The method of claim 14, wherein the northbound application is at least one of a dashboard, a transfer function, an analytics application, or a second AI/ML model.

20. The method of claim 14, wherein the cellular network is a 5G wireless network, and wherein the customer is an enterprise customer of the 5G wireless network.

* * * * *